US011218723B2

(12) United States Patent
Chen et al.

(10) Patent No.: US 11,218,723 B2
(45) Date of Patent: Jan. 4, 2022

(54) MOTION VECTOR PREDICTION

(71) Applicant: QUALCOMM Incorporated, San Diego, CA (US)

(72) Inventors: Yi-Wen Chen, San Diego, CA (US); Wei-Jung Chien, San Diego, CA (US); Yu-Chen Sun, Bellevue, WA (US); Li Zhang, San Diego, CA (US); Sungwon Lee, Huntington Beach, CA (US); Xiang Li, Saratoga, CA (US); Hsiao-Chiang Chuang, San Diego, CA (US); Jianle Chen, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/819,955

(22) Filed: Mar. 16, 2020

(65) Prior Publication Data

US 2020/0221116 A1  Jul. 9, 2020

Related U.S. Application Data

(63) Continuation of application No. 16/003,269, filed on Jun. 8, 2018, now Pat. No. 10,602,180.

(Continued)

(51) Int. Cl.
*H04N 19/52* (2014.01)
*H04N 19/70* (2014.01)
(Continued)

(52) U.S. Cl.
CPC .......... *H04N 19/52* (2014.11); *H04N 19/176* (2014.11); *H04N 19/44* (2014.11); *H04N 19/54* (2014.11); *H04N 19/70* (2014.11); *H04N 19/593* (2014.11)

(58) Field of Classification Search
CPC ........ H04N 19/52; H04N 19/54; H04N 19/70; H04N 19/44; H04N 19/176; H04N 19/593
See application file for complete search history.

(56) References Cited

U.S. PATENT DOCUMENTS 9,204,147 B2  12/2015  Takehara et al.
9,571,833 B2   2/2017  Bici et al.
(Continued)

FOREIGN PATENT DOCUMENTS

EP  2800370 A1  11/2014
WO  2019107548 A1  6/2019

OTHER PUBLICATIONS

Alshina E., et al., "Description of Exploration Experiments on Coding Tools," Joint Video Exploration Team (JVET) of ITU-T SG 16 WP 3 and ISO/IEC JTC 1/SC 29/WG 11; 6th Meeting: Hobard, AU, Mar. 31-Apr. 7, 2017, JVET-F1011, Apr. 29, 2017, 10 pages.

(Continued)

*Primary Examiner* — Tracy Y. Li
(74) *Attorney, Agent, or Firm* — Shumaker & Sieffert, P.A.

(57) ABSTRACT

A video coder may determine a motion vector of a non-adjacent block of a current picture of the video data. The non-adjacent block is non-adjacent to a current block of the current picture. Furthermore, the video coder determines, based on the motion vector of the non-adjacent block, a motion vector predictor (MVP) for the current block. The video coder may determine a motion vector of the current (Continued)

block. The video coder may also determine a predictive block based on the motion vector of the current block.

18 Claims, 36 Drawing Sheets

Related U.S. Application Data

(60) Provisional application No. 62/519,007, filed on Jun. 13, 2017.

(51) Int. Cl.
*H04N 19/44* (2014.01)
*H04N 19/176* (2014.01)
*H04N 19/54* (2014.01)
*H04N 19/593* (2014.01)

(56) References Cited

U.S. PATENT DOCUMENTS

| | | | |
|---|---|---|---|
| 2004/0028133 | A1 | 2/2004 | Subramaniyan et al. |
| 2011/0194609 | A1 | 8/2011 | Rusert et al. |
| 2011/0211640 | A1 | 9/2011 | Kim et al. |
| 2013/0343459 | A1 | 12/2013 | Bici et al. |
| 2014/0023144 | A1 | 1/2014 | Park et al. |
| 2015/0163508 | A1* | 6/2015 | Bici ............... H04N 19/593 375/240.16 |
| 2015/0208074 | A1 | 7/2015 | Takahashi et al. |
| 2016/0173885 | A1 | 6/2016 | Cote et al. |
| 2018/0109814 | A1 | 4/2018 | Chuang et al. |
| 2018/0176596 | A1* | 6/2018 | Jeong ............... H04N 19/523 |
| 2018/0324437 | A1* | 11/2018 | Kim ............... H04N 19/513 |
| 2018/0359483 | A1 | 12/2018 | Chen et al. |
| 2019/0058896 | A1 | 2/2019 | Huang et al. |

OTHER PUBLICATIONS

An et al., "Enhanced Merge Mode based on JEM7.0," Joint Video Exploration Team (JVET) of ITU-SG16 WP3 and ISO/IEC JTC1/SC29/WG11, 10th Meeting: San Diego, CA; Apr. 10-20, 2018, No. JVET-J0059_v1, Apr. 3, 2018, 9 pp.
Bossen F., et al., "HM Software Manual," Joint Collaborative Team on Video Coding (JCT-VC) of ITU-T SG16 WP3 and ISO/IEC JTC1/SC29/WG11, Document: JCTVC—Software Manual, Retrieved on Jun. 18, 2015, pp. 1-27.
Chen et al., "Decoder-Side Motion Vector Refinement Based on Bilateral Template Matching", JVET Meeting, Joint Video Exploration Team {JVET) of ITU-T SG 16 WP 3 and ISO/IEC JTC 1/SC 29/WG 11, JVET-D0029, 4th Meeting; Chengdu, CN, Oct. 15-21, 2016, 4 pp.
Chen, et al., "Enhanced Motion Vector Difference Coding," JVET Meeting; (The Joint Video Exploration Team of ISO/IEC JTC1/SC29/WG11 and ITU-T SG.16), 4th Meeting: Chengdu, CN, Oct. 15-21, 2016, No. JVET-D0123_v3, 3 pp.
Chen J., et al., "Algorithm Description of Joint Exploration Test Model 5 (JEM 5)," Joint Video Exploration Team (JVET) of ITU-T SG 16 WP 3 and ISO/IEC JTC 1/SC 29/WG 11, 5th Meeting: Geneva, Jan. 12-20, 2017, JVET-E1001-v2, 44 Pages, URL: http://phenix.int-evry.fr/jvet/, Feb. 11, 2017 (Feb. 11, 2017), XP030150648, section 2.2.1.1.
Chen J., et al., "Algorithm Description of Joint Exploration Test Model 6 (JEM 6)," Joint Video Exploration Team, JVET-F1001-v2, Mar. 31-Apr. 7, 2017, 48 Pages.
Chen X., et al., "EE3: Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-E0052, pp. 1-4.
Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet, pp. 1-43.
Chuang, et al., "EE2-related: A simplified gradient filter for Bi-directional optical flow (BIO)," Joint Video Exploration Team (JVET) of ITU-T SG 16 WP 3 and ISO/IEC JTC 1/SC 29/WG 11; 7th Meeting; Jul. 13-21, 2017, document No. JVET-G0083, Jul. 14, 2017, 5 pp.
"ClangFormat," accessed on Apr. 2, 2018, accessed from https://clang.llvm.org/docs/ClangFormat.html, pp. 1-4.
"CMAKE AMA (ask Me Anything)," accessed on Apr. 14, 2018, accessed from https://cmake.org/, 7 pp.
Coban A., et al., "AHG8: Adjusted Cubemap Projection for 360-degree Video," JVET-F0025, 6th Meeting, Mar. 31-Apr. 7, 2017, Joint Video Exploration Team (JVET) of ITU-T SG 16 WP 3 and ISO/IEC JTC 1/SC 29/WG 11, Mar. 24, 2017, XP030150674, 5 Pages.
Coban M., et al., "AHG8: Reference Picture Extension of ACP format 360-degree video," Joint Video Exploration Team (JVET) of ITU-T SG 16 WP 3 and ISO/IEC JTC 1/SC 29/WG 11; 7th Meeting; Torino, IT, Jul. 13-21, 2017, No. JVET-G0058, URL: http://phenix.int-evry.fr/jvet/,,No. JVET-G0058, XP030150839, 4 pp.
"Euclidean Distance," Wikipedia, Accessed on Apr. 14, 2018, accessed from https://en.wikipedia.org/wiki/Euclidean_distance, 4 pp.
Han, et al., "Improvements to Intra Prediction Mode Coding," Joint Video Exploration Team (JVET) of ITU-T SG16 WP3 and ISO/IEC JTC1/SC29/WG11; 7th Meeting; Torino, IT, Jul. 13-21, 2017, document No. JVET-G0060, Jul. 5, 2017, 4 pp.
He Y., et al., "360Lib Software Manual," Joint Collaborative Team on Video coding (JCT-VC) of ITU-T SG16 WP3 and SO/IEC JTC 1/SC29/WG11, Document: JVET 360Lib, Software Manual, Nov. 1, 2017, pp. 1-26.
Henry F., et al., "Residual Coefficient Sign Prediction", 4th JVET Meeting; Oct. 15, 2016-Oct. 21, 2016; Chengdu; (The Joint Video Exploration Team of ISO/IEC JTC1/SC29/WG11 and ITU-T SG.16 WG 3); URL: http://phenix.int-evry.fr/jvet/, No. JVET-D0031-v4, Oct. 20, 2016 (Oct. 20, 2016), XP030150258, pp. 1-6.
International Search Report and Written Opinion—PCT/US2018/036883—ISA/EPO—dated Nov. 14, 2018.
"ITU-H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.
Li et al., "Description of SDR Video coding Technology Proposal by Tencent", Joint Video Exploration Team (JVET) of ITU-SG16 WP3 and ISO/IEC JTC1/SC29/WG11, 10th Meeting: San Diego, CA; Apr. 10-20, 2018, No. JVET-J0029_v1, Apr. 3, 2018, 34 pp.
Lin, et al., "Enhanced Template Matching in FRUC Mode," Joint Video Exploration Team (JVET) of ITU-T SG 16 WP 3 and ISO/IEC JTC 1/SC 29/WG 11, No. JVET-E0035, Jan. 12-20, 2017, 5th Meeting; Geneva, CH, Jan. 2, 2017, 4 pp.
Lin J.-L., et al., "Motion Vector Coding in the HEVC Standard," IEEE Journal of Selected Topics in Signal Processing, vol. 7, No. 6, Dec. 2013, pp. 957-968.
Lorcy V., et al., "Proposed Improvements to the Adaptive Multiple Core Transform", 3rd JVET Meeting, Joint Video Exploration Team (JVET) of ITU-T SG 16 WP 3 and ISO/IEC JTC 1/SC 29/WG 11, JVET-00022-v4, May 26, 2016-Jun. 1, 2016, May 27, 2016, URL: http://phenix.int-evry.fr/jvet/,No. JVET-C0022-v4, XP030150104, 4 pages.
Segall A., et al., "Joint Call for Proposals on Video Compression with Capability Beyond HEVC," Joint Video Exploration Team (JVET) of ITU-T SG 16 WP 3 and ISO/IEC JTC 1/SC 29/WG 11, 8th Meeting: Macao, CN, Oct. 18-24, 2017, No. JVET-H1002, Oct. 23, 2017, 27 pp.
Partial International Search Report—PCT/US2018/036883—ISA/EPO—dated Sep. 5, 2018.
Said A., et al., "Arithmetic Coding with Context-Dependent Double-Window Adaptation Response", 7. JVET Meeting, Jul. 13, 2017-Jul.

(56) References Cited

OTHER PUBLICATIONS 21, 2017, Torino (The Joint Video Exploration Team of ISO/IEC JTC1/SC29/WG11 and ITU-T SG.16); URL: http://phenix.int-evry.fr/jvet/, No. JVET-G0112-v2, Jul. 14, 2017 (Jul. 14, 2017), XP030150916, pp. 1-4.
Said et al., "Binary arithmetic coding with small table or short multiplications," Jan. 12-20, 2017 {Joint Video Exploration Team (JVET) of ITU-T SG 16 WP 3 and ISO/IEC JTC 1/SC 29/WG 11) document No. JVET-E0119, Jan. 12, 2017, 4 pp.
Segall A., et al., "Joint Call for Proposals on Video Compression with Capability Beyond HEVC," Joint Video Exploration Team (JVET) of ITU-T SG 16 WP 3 and ISO/IEC JTC 1/SC 29/WG 11, 8th Meeting: Macao, CN, Oct. 18-24, 2017; URL: http://phenix.int-evry.fr/jvet/, No. JVET-H1002, Version 6, Nov. 8, 2017, 27 pages.
Seregin et al., "Combined Results on Intra Methods," (The Joint Video Exploration Team of ISO/IEC JTC11 SC29/WG11 and ITU-T SG.16), 4th Meeting; Chengdu, CN, Oct. 15-21, 2016, No. JVET-D0115r2, 2 pp.
Seregin V., et al., "Block Shape Dependent Intra Mode Coding", 4 JVET Meeting, Chengdu, (The Joint Video Exploration Team of ISO/IEC JTC1/SC29/WG11 and ITU-T SG.16), URL: http://phenix.int-evry.fr/jvet/,,No. JVET-D0114-v3, Oct. 15, 2016, XP030150362, 3 pages.
Seregin V., et al., "Variable Number of Intra Modes", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/ , No. JVET-D0113, Oct. 6, 2016 (Oct. 6, 2016), XP030150359, pp. 1-2.
Sjoberg et al., "Description of SDR and HDR Video Coding Technology Proposal by Ericsson and Nokia," Joint Video Exploration Team (JVET) of ITU-SG16 WP3 and ISO/IEC JTC1/SC29/WG11, 10th Meeting: San Diego, CA; Apr. 10-20, 2018, No. JVET-J0012 v1, Apr. 12, 2018, 32 pp.
Suhring, et al., "HEVC Software Guidelines", JVET Meeting; (The Joint Video Exploration Team of ISO/IEC JTC1/SC29/WG11 and ITU-T SG.16), 8th Meeting; San Jose, CA; Feb. 1-10, 2012, No. JCTVC-H1001, 8 pp.

Sullivan G.J., et al., "Overview of the High Efficiency Video Coding (HEVC) Standard", IEEE Transactions on Circuits and Systems for Video Technology, vol. 22, No. 12, Dec. 1, 2012 (Dec. 1, 2012), XP055388661, USA ISSN: 1051-8215, DOI: 10.1109/TCSVT.2012.2221191, pp. 1649-1668, p. 1662, Paragraph 3) Merge Mode.
"Taxicab Geometry," Wikipedia, accessed on May 11, 2018, accessed on https://en.wikipedia.org/wiki/Taxicab_geometry, 4 pp.
Yang H., et al., "Description of Core Experiment 4 (CE4): Inter Prediction and Motion Vector Coding", 10. JVET Meeting; Oct. 4, 2018-Oct. 20, 2018; San Diego, No. JVET-J1024, Apr. 20, 2018 (Apr. 20, 2018), pp. 1-44, XP030151318.
Ye et al., "Merge Mode Modification on Top of Tencent's Software in Response to CfP," Joint Video Exploration Team (JVET) of ITU-SG16 WP3 and ISO/IEC JTC1/SC29/WG11, 10th Meeting: San Diego, CA; Apr. 10-20, 2018, No. JVET-J0058_v1, Apr. 13, 2018, 3 pp.
Zhang K., et al., "Enhanced Cross-component Linear Model Intra-prediction", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/, No. JVET-D0110, Oct. 6, 2016 (Oct. 6, 2016), XP030150354, 5 Pages.
Zhao, et al., "Improvements on AMT for Inter Prediction Residuals," JVET Meeting; (The Joint Video Exploration Team of ISO/IEC JTC1/SC29/WG11 and ITU-T SG.16), 4th Meeting: Chengdu, CN, Oct. 15-21, 2016, No. JVET-D0126, 3 pp.
Zhao et al., "Six Tap Intra Interpolation Filter," JVET Meeting; 4th Meeting; Chengdu, CN, (The Joint Video Exploration Team of ISO/IEC JTC1/SC29/WG11 and ITU-T SG.16); Oct. 15-21, 2016, No. JVET-D0119r1, 3 pp.
Prosecution History from U.S. Appl. No. 16/003,269, dated Jun. 8, 2018 through Mar. 5, 2020, 428 pp.
Zhang L., et al., "CE4-Related: History-based Motion Vector Prediction", JVET-K0104_r1, Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0104-v2, pp. 1-6.

* cited by examiner

MOTION VECTOR PREDICTION

This application is a continuation of U.S. patent application Ser. No. 16/003,269, filed Jun. 8, 2018, which claims the benefit of U.S. provisional patent application No. 62/519,007, filed Jun. 13, 2017, the entire content of each of which is incorporated by reference.

TECHNICAL FIELD

This disclosure relates to devices configured to perform video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), or ITU-T H.265, High Efficiency Video Coding (HEVC), and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

SUMMARY

In general, this disclosure describes techniques related to motion vector prediction. The techniques of this disclosure may be applied to any of the existing video codecs, such as HEVC (High Efficiency Video Coding) or any future video coding standards.

In one example, this disclosure describes a method of decoding video data, the method comprising: determining, by a video decoder, a motion vector of a non-adjacent block of a current picture of the video data, the non-adjacent block being non-adjacent to a current block of the current picture; determining, by the video decoder, based on the motion vector of the non-adjacent block, a motion vector predictor (MVP) for the current block; determining, by the video decoder, based on the MVP for the current block, a motion vector of the current block; determining, by the video decoder, a predictive block based on the motion vector of the current block; reconstructing, by the video decoder, based on the predictive block, sample values of the current picture.

In another example, this disclosure describes a method of encoding video data, the method comprising: determining, by a video encoder, a motion vector of a non-adjacent block of a current picture of the video data, the non-adjacent block being non-adjacent to a current block of the current picture; determining, by the video encoder, based on the motion vector of the non-adjacent block, a motion vector predictor (MVP) for the current block; determining, by the video encoder, a motion vector of the current block, wherein the motion vector is equal to a motion vector of the MVP for the current block or is equal to the motion vector of the MVP for the current block plus a motion vector difference (MVD) signaled in a bitstream; determining, by the video encoder, a predictive block based on the motion vector of the current block; and generating, by the video encoder, based on the predictive block, residual sample values.

In another example, this disclosure describes an apparatus for decoding video data, the apparatus comprising: one or more storage media configured to store video data; and one or more processors configured to: determine a motion vector of a non-adjacent block of a current picture of the video data, the non-adjacent block being non-adjacent to a current block of the current picture; determine, based on the motion vector of the non-adjacent block, a motion vector predictor (MVP) for the current block; determine, based on the MVP for the current block, a motion vector of the current block; determine a predictive block based on the motion vector of the current block; and reconstruct, based on the predictive block, sample values of the current picture.

In another example, this disclosure describes an apparatus for encoding video data, the method comprising: determining, by a video encoder, a motion vector of a non-adjacent block of a current picture of the video data, the non-adjacent block being non-adjacent to a current block of the current picture; determining, by the video encoder, based on the motion vector of the non-adjacent block, a motion vector predictor (MVP) for the current block; determining, by the video encoder a motion vector of the current block, wherein the motion vector is equal to a motion vector of the MVP for the current block or is equal to the motion vector of the MVP for the current block plus a motion vector difference (MVD) signaled in a bitstream; determining, by the video encoder, a predictive block based on the motion vector of the current block; and generating, by the video encoder, based on the predictive block, residual sample values.

In another example, this disclosure describes an apparatus for decoding video data, the apparatus comprising: means for determining a motion vector of a non-adjacent block of a current picture of the video data, the non-adjacent block being non-adjacent to a current block of the current picture; means for determining, based on the motion vector of the non-adjacent block, a motion vector predictor (MVP) for the current block; means for determining, based on the MVP for the current block, a motion vector of the current block; means for determining a predictive block based on the motion vector of the current block; and means for reconstructing, based on the predictive block, sample values of the current picture.

In another example, this disclosure describes an apparatus for encoding video data, the apparatus comprising: means for determining a motion vector of a non-adjacent block of a current picture of the video data, the non-adjacent block being non-adjacent to a current block of the current picture; means for determining, based on the motion vector of the non-adjacent block, a motion vector predictor (MVP) for the current block; means for determining a motion vector of the current block, wherein the motion vector is equal to a motion vector of the MVP for the current block or is equal to the motion vector of the MVP for the current block plus a motion vector difference (MVD) signaled in a bitstream; means for determining a predictive block based on the motion vector of the current block; and means for generating, based on the predictive block, residual sample values.

In another example, this disclosure describes a computer-readable storage medium storing instructions that, when executed, cause one or more processors to: determine a motion vector of a non-adjacent block of a current picture of the video data, the non-adjacent block being non-adjacent to a current block of the current picture; determine, based on the motion vector of the non-adjacent block, a motion vector predictor (MVP) for the current block; determine, based on the MVP for the current block, a motion vector of the current block; determine a predictive block based on the motion vector of the current block; and reconstruct, based on the predictive block, sample values of the current picture.

In another example, this disclosure describes a computer-readable storage medium storing instructions that, when executed, cause one or more processors to: determine a motion vector of a non-adjacent block of a current picture of the video data, the non-adjacent block being non-adjacent to a current block of the current picture; determine, based on the motion vector of the non-adjacent block, a motion vector predictor (MVP) for the current block; determine a motion vector of the current block, wherein the motion vector is equal to a motion vector of the MVP for the current block or is equal to the motion vector of the MVP for the current block plus a motion vector difference (MVD) signaled in a bitstream; determine a predictive block based on the motion vector of the current block; and generate, based on the predictive block, residual sample values.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

As video compression has improved, the proportion of encoded data used to represent motion vectors has risen. Accordingly, to achieve greater video compression, it may be desirable to improve how motion vectors are encoded. Achieving greater video compression is desirable for many reasons, such as being able to send higher-quality video data through existing infrastructure, reducing network congestion, and so on. Motion vector prediction is one common way of reducing the amount of data used to encode a motion vector for a block. In most motion vector prediction systems, a video encoder determines a list of motion vector predictors for the block, selects a motion vector predictor, and then signals a position in the list of the selected motion vector. A video decoder determines the same list of motion vector predictors and determines the selected motion vector predictor based on data signaled in the bitstream. The video decoder may then use the motion vector predictor to determine one or more motion vectors of the block.

This disclosure describes techniques that may improve motion vector prediction, and thereby potentially improve video compression efficiency, by more fully using reconstructed motion vector information. For example, this disclosure describes techniques that use motion vector predictors from one or more blocks of a current picture that are not spatially adjacent to a current block of the current picture. In this example, a video coder (e.g., a video encoder or a video decoder) may determine a motion vector of a non-adjacent block of a current picture of the video data. The non-adjacent block is non-adjacent to a current block of the current picture. Furthermore, in this example, the video coder may determine, based on the motion vector of the non-adjacent block, a motion vector predictor (MVP) for the current block. The video coder may then determine (e.g., based on the MVP for the current block) a motion vector of the current block. Additionally, the video coder may determine a predictive block based on the motion vector of the current block.

Furthermore, this disclosure describes techniques for generating synthetic motion vector candidates. This disclosure also describes techniques for generating additional temporal motion vector predictor candidates. In addition, this disclosure describes techniques that use intra prediction modes from one or more blocks of a current picture that are not spatially adjacent to a current block of the current picture to determine one or more most probable intra prediction modes in a set of most probable intra prediction modes for the current block. The techniques of this disclosure, or sub-combinations thereof, may be used together or separately.

Figure 1:
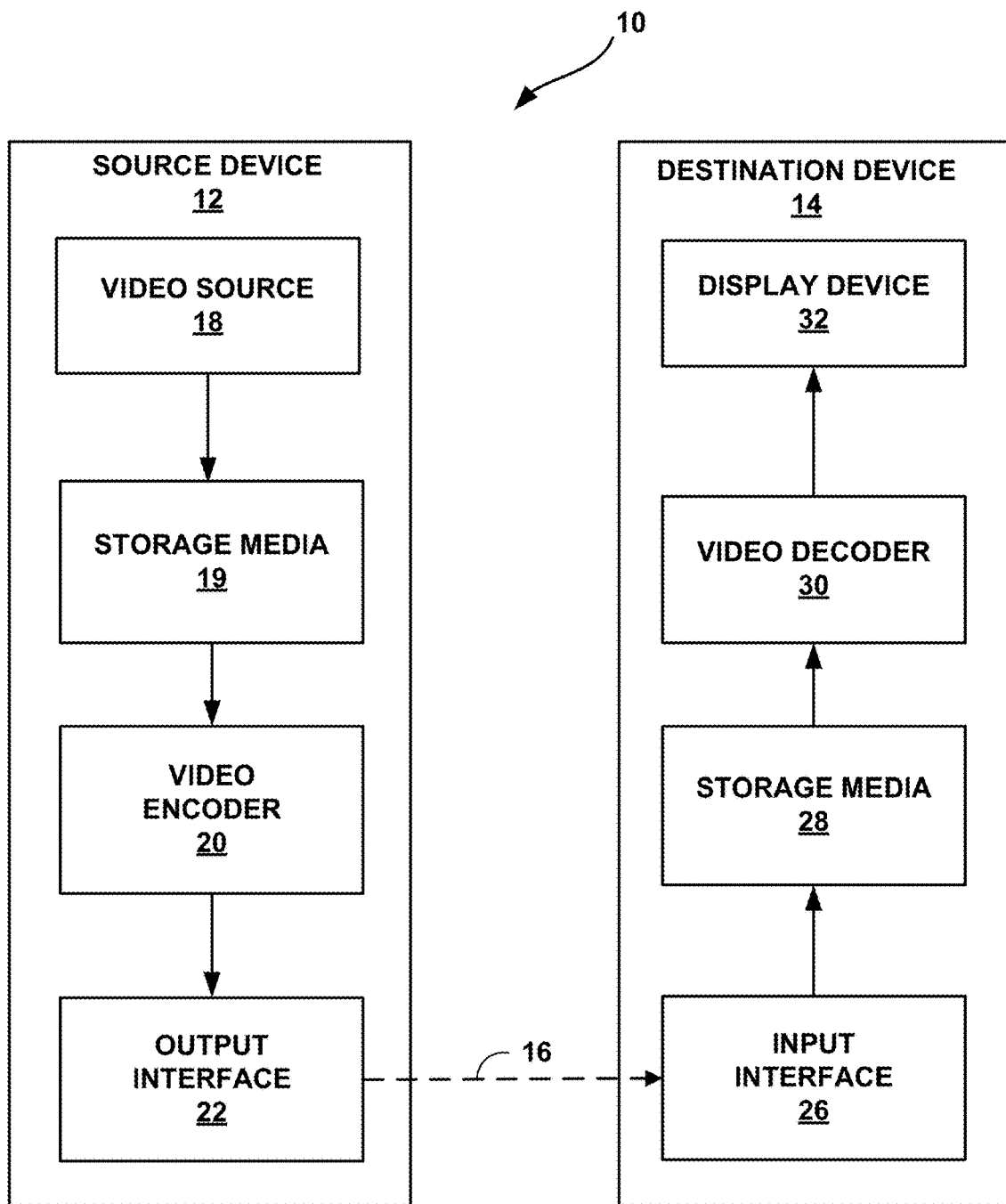
FIG. 1 is a block diagram illustrating an example video encoding and decoding system that may use one or more techniques described in this disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. Source device 12 may be an apparatus for encoding video data and destination device 14 may be an apparatus for decoding video data. In particular, source device 12 provides the encoded video data to destination device 14 via a computer-readable medium 16. Source device 12 and destination device 14 may comprise any of a wide range of devices and apparatuses, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data may be performed by any digital video encoding and/or decoding device. In some examples, the techniques may be performed by a video encoder/decoder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and a display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may comprise a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may comprise various types of components or devices. For example, output interface 22 may comprise a wireless transmitter, a modem, a wired networking component (e.g., an Ethernet card), or another physical component. In examples where output interface 22 comprises a wireless transmitter, output interface 22 may be configured to transmit data, such as encoded video data, modulated according to a cellular communication standard, such as 4G, 4G-LTE, LTE Advanced, 5G, and the like. In some examples where output interface 22 comprises a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, output interface 22 may output data, such as encoded video data, to an intermediate device, such as a storage device. Similarly, input interface 26 of destination device 14 may receive encoded data from the intermediate device. The intermediate device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the, High Efficiency Video Coding (HEVC), which as known as or ITU-T H.265, its range and screen content coding extensions, its 3D video coding extension (3D-HEVC), its multiview extension (MV-HEVC), or its scalable extension (SHVC). HEVC, SHVC, and 3D-HEVC were developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. Chen et al., "Algorithm Description of Joint Exploration Test Model 5," Joint Video Exploration Team (JVET) of ITU-T SG 16 WP 3 and ISO/IEC JTC 1/SC 29/WG 11, $5^{th}$ Meeting, Geneva, CH, 12-20 Jan. 2017, document JVET E-1001, is an algorithm description of Joint Exploration Test Model 6 (JEM5). Chen et al., "Algorithm Description of Joint Exploration Test Model 6," Joint Video Exploration Team (JVET) of ITU-T SG 16 WP 3 and ISO/IEC JTC 1/SC 29/WG 11, $6^{th}$ Meeting, Hobart, AU, 31 Mar.-7 Apr. 2017, document JVET F-1001, is an algorithm description of Joint Exploration Test Model 6 (JEM6). Video encoder 20 and video decoder 30 may operate according to the joint exploration model or the new Versatile Video Coding (VVC) standard currently under development.

This disclosure may generally refer to "signaling" certain information, such as syntax elements. The term "signaling" may generally refer to the communication of syntax elements and/or other data used to decode the encoded video data. Such communication may occur in real- or near-real-time. Alternately, such communication may occur over a span of time, such as might occur when storing syntax elements to a computer-readable storage medium in a bitstream at the time of encoding, which then may be retrieved by a decoding device at any time after being stored to this medium.

In HEVC and other video coding specifications, video data includes a series of pictures. Pictures may also be referred to as "frames." A picture may include one or more sample arrays. Each respective sample array of a picture may comprise an array of samples for a respective color component. A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. The residual block comprises residual samples. Each residual sample may indicate a difference between a sample of one of the generated predictive blocks and a corresponding sample of the block. In this way, video encoder 20 may generate, based on a predictive block, residual sample values. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block. In HEVC, the largest coding unit in a slice is called a coding tree block (CTB) or coding tree unit (CTU). A CTB contains a quad-tree the nodes of which are CUs. The size of a CTB can range from 16×16 to 64×64 in the HEVC main profile (although technically 8×8 CTB sizes can be supported). A coding unit (CU) can be the same size of a CTB though and can be as small as 8×8. Each coding unit is coded with one mode.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a PU of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture). In HEVC, video encoder 20 generates a "prediction_unit" syntax structure within a "coding_unit" syntax structure for inter predicted PUs, but does not generate a "prediction_unit" syntax structure within a "coding_unit" syntax structure for intra predicted PUs. Rather, in HEVC, syntax elements related to intra predicted PUs are included directly in the "coding_unit" syntax structure. When a CU is inter coded, the CU may be further partitioned into 2 or 4 PUs or become just one PU when further partitioning does not apply. When two PUs are present in one CU, they can be half size rectangles or two rectangle size with ¼ or ¾ size of the CU. When the CU is inter coded, one set of motion information is present for each PU. In addition, each PU is coded with a unique inter-prediction mode to derive the set of motion information. In this disclosure, the terminology "block" may refer to CU, PU or any other coding units used for video coding purpose.

A video coder, such as video encoder 20 or video decoder 30, may perform intra prediction using an intra prediction mode selected from a plurality of available intra prediction modes. The intra prediction modes may include directional intra prediction modes, which may also be referred to as intra prediction directions. Different directional intra prediction modes correspond to different angles. In some examples, to determine a value of a current sample of a predictive block using a directional intra prediction mode, the video coder may determine a point where a line passing through the current sample at the angle corresponding to the directional intra prediction mode intersects a set of border samples. The border samples may comprise samples in a column immediately left of the predictive block and samples in a row immediately above the predictive block. If the point is between two of the border samples, the video coder may interpolate or otherwise determine a value corresponding to the point. If the point corresponds to a single one of the border samples, the video coder may determine that the value of the point is equal to the border sample. The video coder may set the value of the current sample of the predictive block equal to the determined value of the point.

In HEVC and some other codecs, video encoder 20 encodes a CU using only one prediction mode (i.e., intra prediction or inter prediction). Thus, in HEVC and particular other codecs, video encoder 20 may generate predictive blocks of each PU of a CU using intra prediction or video encoder 20 may generate predictive blocks of each PU of the CU using inter prediction. When video encoder 20 uses inter prediction to encode a CU, video encoder 20 may partition the CU into 2 or 4 PUs, or one PU corresponds to the entire CU. When two PUs are present in one CU, the two PUs can be half size rectangles or two rectangle sizes with ¼ or ¾ size of the CU. In HEVC, there are eight partition modes for a CU coded with inter prediction mode, i.e., PART_2N×2N, PART_2N×N, PART_N×2N, PART_N×N, PART_2N×nU, PART_2N×nD, PART_nL×2N and PART_nR×2N. When a CU is intra predicted, 2N×2N and N×N are the only permissible PU shapes, and within each PU a single intra prediction mode is coded (while chroma prediction mode is signaled at CU level).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. Thus, in the context of the JEM, the term "PU" or "TU" may apply to a CU. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. Quantization may reduce the bit depth associated with some or all the transform coefficients. For example, an n-bit transform coefficient may be rounded down to an m-bit transform coefficient during quantization, where n is greater than m. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may comprise a sequence of bits that forms a representation of encoded pictures of the video data and associated data. In some examples, a representation of an encoded picture may include encoded representations of blocks of the picture.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Inverse quantization maps quantized value to a reconstructed value. For instance, video decoder 30 may inverse quantize a value by determining the value multiplied by a quantization step size. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, in HEVC and other video coding specifications, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of blocks of the picture. For example, in HEVC and other video coding specifications, a slice of a picture may include an integer number of CTUs of the picture. The CTUs of a slice may be ordered consecutively in a scan order, such as a raster scan order. In HEVC and potentially other codecs, a slice is defined as an integer number of CTUs contained in one independent slice segment and all subsequent dependent slice segments (if any) that precede the next independent slice segment (if any) within the same access unit. Furthermore, in HEVC and potentially other codecs, a slice segment is defined as an integer number of CTUs ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

As mentioned above, a video coder (e.g., video encoder 20 or video decoder 30) may apply inter prediction to generate a predictive block for a video block of a current picture. For instance, in the context of HEVC and other video coding specifications, the video coder may apply inter prediction to generate a predictive block for a prediction block of a PU of a CU of the current block. If the video coder applies inter prediction to generate a predictive block, the video coder may generate the predictive block based on decoded samples of one or more reference pictures. The reference pictures are pictures other than the current picture. The video coder may determine one or more reference picture lists. Each of the reference picture lists may include zero or more reference pictures. In the context of HEVC and other video coding specifications, one of the reference picture lists may be referred to as Reference Picture List 0 (i.e., RefPicList0 or list0) and another reference picture list may be referred to as Reference Picture list 1 (i.e., RefPicList1 or list1).

The video coder may apply uni-directional inter prediction or bi-directional inter prediction to generate a predictive block. When the video coder applies uni-directional inter prediction to generate a predictive block for a video block, the video coder determines a single reference block for the video block based on samples of a single reference picture. Furthermore, when the video coder applies uni-directional inter prediction, the video coder may set the predictive block equal to the reference block. When the video coder applies bi-directional inter prediction to generate a predictive block for a video block, the video coder determines two reference blocks for the video block. In some examples, the two reference blocks are in reference pictures in different reference picture lists. Additionally, when the video coder applies bi-direction inter-prediction, the video coder may determine the predictive block based on the two reference blocks. For instance, the video coder may determine the predictive block such that each sample of the predictive block is a weighted average of corresponding samples of the two reference blocks. Reference list indicators may be used to indicate which of the reference picture lists include reference pictures used for determining reference blocks.

As mentioned above, a video coder may determine a reference block based on samples of a reference picture. In some examples, the video coder may determine the reference block such that each sample of the reference block is equal to a sample of the reference picture. In some examples, as part of determining a reference block, the video coder may interpolate samples of the reference block from samples of the reference picture. For example, the video coder may determine that a sample of the predictive block is a weighted average of two or more samples of the reference picture.

In some examples, when video encoder 20 performs uni-directional inter prediction, video encoder 20 searches for a reference block within one or more reference pictures in one of the reference picture lists. The reference block may be a block of samples that is similar to the prediction block. In some examples, video encoder 20 uses a mean squared error to determine the similarity between the reference block and the prediction block Furthermore, video encoder 20 may determine motion information for the prediction block. The motion information (i.e., the motion parameters) for the prediction block may include a motion vector and a reference index. The motion vector may indicate a spatial displacement between a position of the particular video block within the current picture (i.e., the picture that includes the particular video block) and a position of the reference block within the reference picture. The reference index indicates a position within the reference picture list of the reference frame that contains the reference picture list. The predictive block for the particular video block may be equal to the reference block.

When video encoder 20 performs bi-directional inter prediction for a particular video block, video encoder 20 may search for a first reference block within reference pictures in a first reference picture list ("list 0") and may search for a second reference block within reference pictures in a second reference picture list ("list 1"). Video encoder 20 may generate, based at least in part on the first and the second reference blocks, the predictive block for the particular video block. In addition, video encoder 20 may generate a first motion vector that indicates a spatial displacement between the particular video block and the first reference block. Video encoder 20 may also generate a first reference index that identifies a location within the first reference picture list of the reference picture that contains the first reference block. Furthermore, video encoder 20 may generate a second motion vector that indicates a spatial displacement between the particular video block and the second reference block. Video encoder 20 may also generate a second reference index that identifies a location within the second reference picture list of the reference picture that includes the second reference block.

When video encoder 20 performs uni-directional inter prediction on a particular video block, video decoder 30 may use the motion information of the particular video block to identify the reference block of the particular video block. Video decoder 30 may then generate the predictive block of the particular video block based on the reference block. When video encoder 20 performs bi-directional inter prediction to determine a predictive block for a particular video block, video decoder 30 may use the motion information of the particular video block to determine two reference blocks. Video decoder 30 may generate the predictive block of the particular video block based on the two reference samples of the particular video block. In this way, for either uni-directional inter prediction or bi-directional inter prediction, video encoder 20 and video decoder 30 may determine a predictive block based on a motion vector of a block.

Video encoder 20 may signal motion information of a video unit in various ways. Such motion information may include motion vectors, reference indexes, reference picture list indicators, and/or other data related to motion. In some examples, video encoder 20 and video decoder 30 may use motion prediction to reduce the amount of data used for signaling motion information. Motion prediction may comprise the determination of motion information of a video unit (e.g., a PU) based on motion information of one or more other video units. There are various types of motion prediction. For instance, merge mode and advanced motion vector prediction (AMVP) mode are two types of motion prediction. That is, in the HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. See J.-L. Lin, Y.-W. Chen, Y.-W. Huang, and S.-M. Lei, "Motion vector coding in the HEVC standard," Selected Topics in Signal Processing, IEEE Journal of, vol. 7, no. 6, pp. 957-968, 2013.

In merge mode, video encoder 20 generates a candidate list. The candidate list includes a set of candidates that indicate the motion information of one or more source video units. The source video units may spatially or temporally neighbor a current video unit. Furthermore, in merge mode, video encoder 20 may select a candidate from the candidate list and may use the motion information indicated by the selected candidate as the motion information of the current video unit. Video encoder 20 may signal the position in the candidate list of the selected candidate. Video decoder 30 may determine, based on information obtained from a bitstream, the index into the candidate list. In addition, video decoder 30 may generate the same candidate list and may determine, based on the index, the selected candidate. Video decoder 30 may then use the motion information of the selected candidate to generate a predictive block for the current video unit.

Skip mode is similar to merge mode. In skip mode, video encoder 20 and video decoder 30 generate and use a candidate list in the same way that video encoder 20 and video decoder 30 use the candidate list in merge mode. However, when video encoder 20 signals the motion information of a current video unit using skip mode, video encoder 20 does not signal any residual data for the current video unit. Accordingly, video decoder 30 may determine, without use of residual data, a predictive block for the video unit based on one or more reference blocks indicated by the motion information of a selected candidate in the candidate list.

Figure 2:
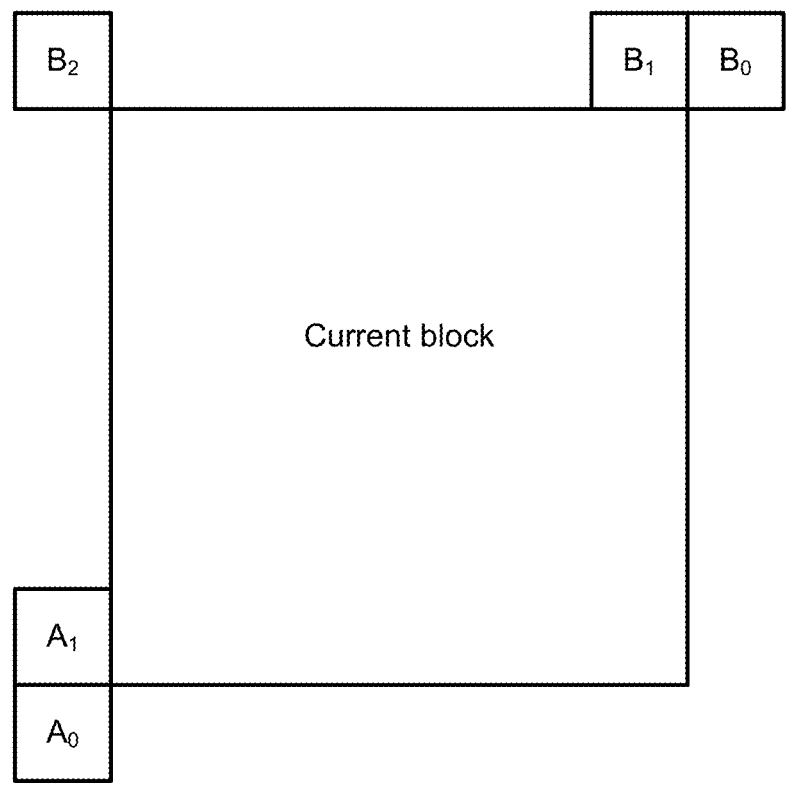
FIG. 2 is an example of spatial and temporal neighboring motion vector candidates for merge/skip modes.
Figure 2:
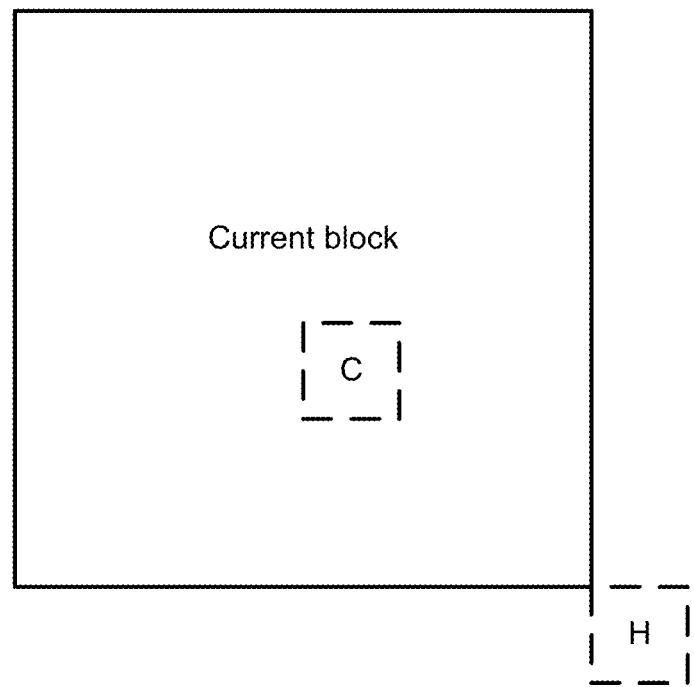

For the skip mode and merge mode, a merge index is signaled to indicate which candidate in the merging candidate list is used. No inter prediction indicator, reference index, or motion vector difference is transmitted. Two or more types of merging candidates are considered in merge mode including: spatial motion vector predictors (SMVPs) and temporal motion vector predictors (TMVPs). For SMVP derivation, a maximum of four merge candidates are selected among candidates that are located in positions as depicted in FIG. 2. The order of derivation is $A_1 \rightarrow B_1 \rightarrow B_0 \rightarrow A_0 \rightarrow (B_2)$. In HEVC, position $B_2$ is considered only when any PU of position $A_1$, $B_1$, $B_0$, $A_0$ is not available or is intra coded or the total number of candidates, after pruning, from positions $A_1$, $B_1$, $B_0$, $A_0$ is less than four.

In the derivation of a TMVP, a scaled motion vector is derived based on a co-located PU belonging to one of the reference pictures of a current picture within a signaled reference picture list. The reference picture list used for derivation of the co-located PU may be explicitly signaled in a slice header of a slice of the current picture. The scaled motion vector for temporal merge candidate may be obtained with the scaled motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of the temporal merge candidate is set equal to zero. A practical realization of the scaling process is described in the HEVC draft specification, which is available from https://www.itu.int/rec/T-REC-H.265. For a B-slice, two motion vectors, one for reference picture list 0 and the other for reference picture list 1, are obtained and combined to make the bi-predictive merge candidate.

The position of the co-located PU is selected between two candidate positions, C and H, as depicted in FIG. 2. If the PU at position H is not available, or is intra coded, or is outside of a current CTU row (i.e., a CTU row that contains the current PU), position C is used. Otherwise, position H is used for the derivation of the temporal merge candidate.

In addition to SMVPs and TMVPs, there may be two types of synthetic merge candidates: (1) combined bi-predictive MVP and (2) zero MVP. Combined bi-predictive MVPs are generated by utilizing a SMVP and a TMVP. In HEVC, combined bi-predictive merge candidates are used for B-slices only. For example, two candidates in the original merge candidate list, which have mvL0 and refIdxL0 or mvL1 and refIdxL1, are used to create a combined bi-predictive merge candidate. A zero MVP has one or more motion vectors with magnitudes of 0.

In the process of candidate selection, duplicated candidates having the same motion parameters as the previous candidate in the processing order may be removed from the candidate list. This process is defined as a pruning process. Also, candidates inside the same merge estimation region (MER) are not considered, in order to help parallel merge processing. Redundant partition shapes are avoided in order to not emulate a virtual 2N×2N partition.

Between each step of generating a merge candidate in the merge candidate list, the derivation process may be stopped if the number of merge candidates reaches to MaxNumMergeCand. In HEVC and potentially other codecs, MaxNumMergeCand is set equal to five. Since the number of candidates is constant, an index of a best merge candidate may be encoded using truncated unary binarization.

AMVP mode is similar to merge mode in that video encoder 20 may generate a candidate list and may select a candidate from the candidate list. However, for each respective reference block used in determining a predictive block for a current block (i.e., video unit), video encoder 20 may signal a respective motion vector difference (MVD) for the current block, a respective reference index for the current block, and a respective candidate index indicating a selected candidate in the candidate list. An MVD for a block may indicate a difference between a motion vector of the block and a motion vector of the selected candidate. The reference index for the current block indicates a reference picture from which a reference block is determined.

Furthermore, when AMVP mode is used, for each respective reference block used in determining a predictive block for the current block, video decoder 30 may determine an MVD for the current block, a reference index for the current block, and a candidate index and a motion vector prediction (MVP) flag. Video decoder 30 may generate the same candidate list and may determine, based on the candidate index, a selected candidate in the candidate list. As before, this list may include motion vectors of neighboring blocks that are associated with the same reference index as well as a temporal motion vector predictor which is derived based on the motion parameters of the neighboring block of the co-located block in a temporal reference picture. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

When a video coder (e.g., video encoder 20 or video decoder 30) generates an AMVP candidate list for a current PU, the video coder may derive one or more AMVP candidates based on the motion information of PUs (i.e., spatially-neighboring PUs) that cover locations that spatially neighbor the current PU and one or more AMVP candidates based on motion information of PUs that temporally neighbor the current PU. In this disclosure, a PU (or other type of video unit or block) may be said to "cover" a location if a prediction block of the PU (or other type of sample block of the video unit) includes the location. The candidate list may include motion vectors of neighboring blocks that are associated with the same reference index as well as a temporal motion vector predictor which is derived based on the motion parameters (i.e., motion information) of the neighboring block of the co-located block in a temporal reference picture. A candidate in a merge candidate list or an AMVP candidate list that is based on the motion information of a PU that temporally neighbors a current PU (i.e., a PU that is in a different time instance than the current PU) may be referred to as a TMVP. A TMVP may be used to improve the coding efficiency of HEVC and, different from other coding tools, a TMVP may need to access a motion vector of a frame in a decoded picture buffer, more specifically in a reference picture list.

For the AMVP mode, an inter prediction indicator is transmitted to denote list 0 prediction, list 1 prediction, or bi-prediction. Next, one or two reference indices are transmitted when there are multiple reference pictures. An index is transmitted for each prediction direction to select one motion candidate from the candidate list. As shown in FIG. 2, the candidate list for the inter mode includes two spatial motion candidates and one temporal motion candidate:

1. Left candidate (the first available from $A_0$, $A_1$)
2. Top candidate (the first available from $B_0$, $B_1$, $B_2$)
3. Temporal candidate (the first available from H and C)

In HEVC, a video coder searches for the left spatial motion candidate from the below left to the left (i.e., $A_0$ and $A_1$) and the video coder selects the first available one as the left candidate. The video coder searches for the top spatial motion candidate from the above right to the above left (i.e. $B_0$, $B_1$ and $B_2$) and the video coder selects the first available one as the top motion candidate. The video coder may select a temporal motion candidate from a block (H or C) located in a reference picture, which is termed a temporal collocated picture. The temporal collocated picture is indicated by transmitting one flag in a slice header to specify which reference picture list and one reference index in the slice header to indicate which reference picture in the reference list is used as the collocated reference picture. In HEVC, after the index is transmitted, one or two corresponding motion vector differences (MVDs) are transmitted.

Furthermore, in HEVC and potentially other codecs, a fixed candidate list size is used to decouple the candidate list construction and the parsing of the index. In order to compensate for the coding performance loss caused by the fixed list size, additional candidates are assigned to the empty positions in the candidate list. In this process, the index is coded in truncated unary codes of a maximum length, where the maximum length is transmitted in the slice header for the skip mode and merge mode and fixed to 2 for the inter mode. As described above, for the skip mode and merge mode, after the derivation and pruning of the four spatial motion candidates and the one temporal motion candidate, if the number of available candidates is smaller than the fixed candidate list size, additional synthetic candidates are derived and added to fill the empty positions in the merging candidate list. For the AMVP mode, a zero vector motion candidate is added to fill the empty positions in the AMVP candidate list after the derivation and pruning of the two spatial motion candidates and the one temporal motion candidate.

In the JEM reference software, there are several inter coding tools which derive and/or refine the motion vector (MV) for a current block at the decoder side or utilize an affine motion model. These new inter-prediction approaches are elaborated below.

Pattern matched motion vector derivation (PMMVD) mode is a special merge mode based on Frame Rate Up-Conversion (FRUC) techniques. With the PMMVD mode, motion information of a block is not signaled, but is instead derived at the decoder side. A FRUC flag is signaled for a block (e.g., CU) when its merge flag is true. When the FRUC flag is false, a merge index is signaled and the regular merge mode is used. When the FRUC flag is true, an additional FRUC mode flag is signaled to indicate which method (bilateral matching or template matching) is to be used to derive motion information for the block.

At the encoder side, the decision on whether to use FRUC merge mode for a CU may be based on rate/distortion (RD) cost selection as is done for normal merge candidates. That is, the two matching modes (bilateral matching and template matching) may both be checked for a CU by using RD cost selection. The mode leading to the minimal cost is further compared to other CU modes. If a FRUC matching mode is the most efficient mode, the FRUC flag is set to true for the CU and the related matching mode is used.

The motion derivation process in the FRUC merge mode includes two steps. A CU-level motion search may first be performed, followed by a sub-CU level motion refinement. At the CU level, an initial motion vector (i.e., a starting MV) is derived for the whole CU based on bilateral matching or template matching. First, a list of MV candidates is generated (FRUC MV candidates) and the candidate which leads to the minimum matching cost is selected as a starting point for further CU level refinement. Then, a local search based on bilateral matching or template matching around the starting point is performed and the MV that results in the minimum matching cost is taken as the MV for the whole CU. Subsequently, the motion information is further refined at the sub-CU level with the derived CU motion vectors as the starting points.

For example, the following derivation process may be performed for a W×H CU motion information derivation, where W is width and H is height. At the first stage, a MV for the whole W×H CU is derived. At the second stage, the CU is further split into M×M sub-CUs. The value of M is calculated as in equation (1), below, D is a predefined splitting depth which is set to 3 by default in the JEM. Then, the MV for each sub-CU is derived.

$$M = \max\left\{4, \min\left\{\frac{M}{2^D}, \frac{N}{2^D}\right\}\right\} \qquad (1)$$

Figure 3:
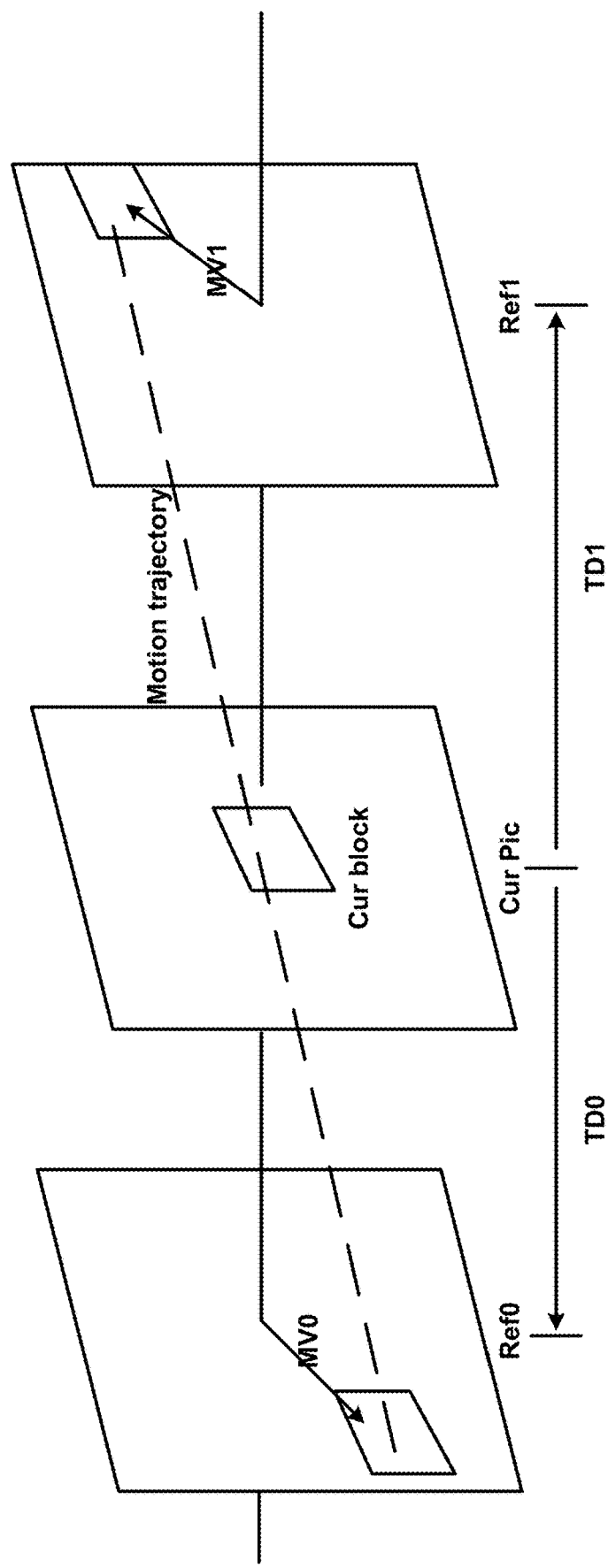
FIG. 3 is an example of bilateral matching.

As shown in the FIG. 3, the bilateral matching is used to derive motion information of a current CU by finding the best match between two blocks along the motion trajectory of the current CU in two different reference pictures. Under the assumption of continuous motion trajectory, the motion vectors MV0 and MV1 pointing to the two reference blocks are proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 4:
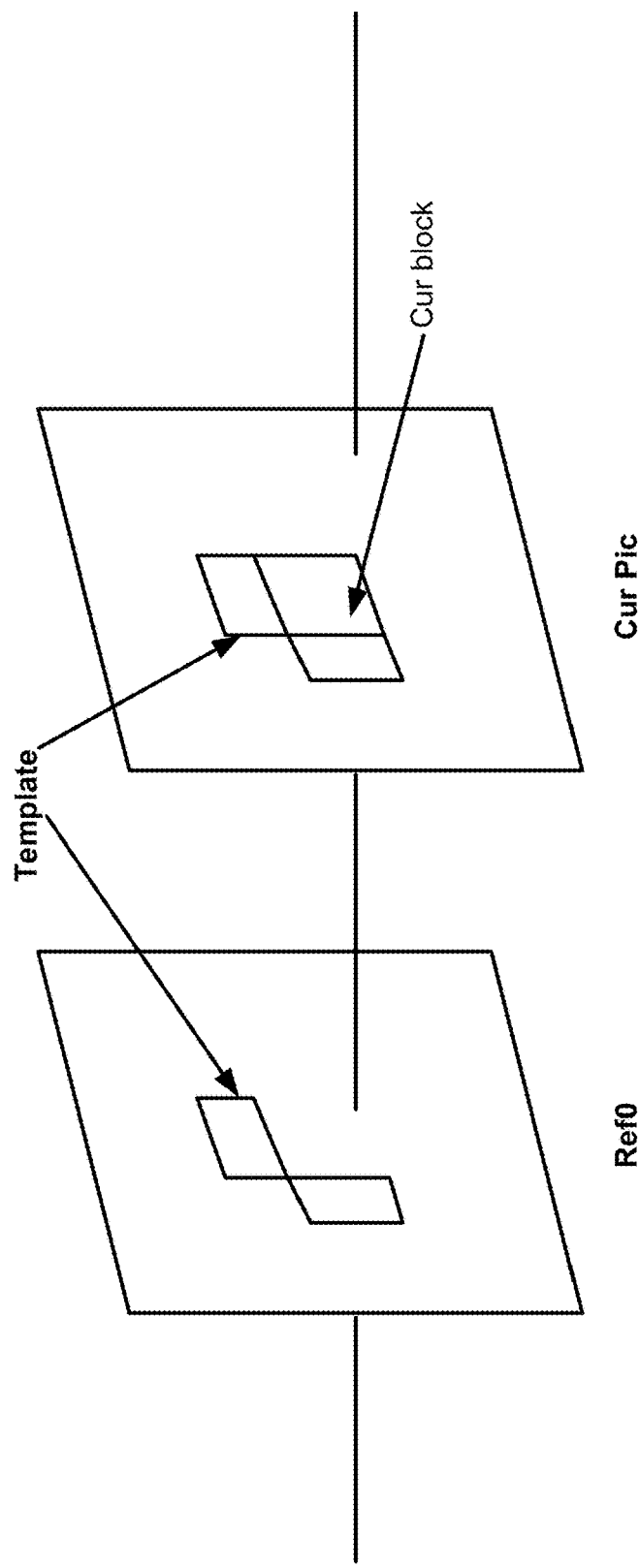
FIG. 4 is an example of template matching.

As shown in FIG. 4, template matching is used to derive motion information of the current CU by finding the best match between a template (top and/or left neighboring blocks of the current CU) in the current picture and a block (same size to the template) in a reference picture. Except for the aforementioned FRUC merge mode, the template matching is also applied to AMVP mode. In the JEM, like in HEVC, AMVP has two candidates. With the template matching method, a new candidate is derived. If the newly derived candidate by template matching is different from the first existing AMVP candidate, the newly derived candidate is inserted at the very beginning of the AMVP candidate list and then the list size is set to two (meaning remove the second existing AMVP candidate). When applied to the AMVP mode, only a CU-level search is applied.

In a CU-level FRUC MV candidate set, the MV candidate set at the CU-level comprises or consists of:
  (i) Original AMVP candidates if the current CU is in AMVP mode
  (ii) all merge candidates,
  (iii) several MVs in an interpolated MV field, which is introduced elsewhere in this disclosure
  (iv) top and left neighboring motion vectors When using bilateral matching, each valid MV of a merge candidate is used as an input to generate a MV pair with the assumption of bilateral matching. For example, one valid MV of a merge candidate is ($MV_a$, $ref_a$) at reference list A. Then, the reference picture $ref_b$ of its paired bilateral MV is found in the other reference list B so that $ref_a$ and $ref_b$ are temporally at different sides of the current picture. If such a $ref_b$ is not available in reference list B, $ref_b$ is determined as a reference which is different from $ref_a$ and its temporal distance to the current picture is the minimal one in list B. After $ref_b$ is determined, $MV_b$ is derived by scaling $MV_a$ based on the temporal distance between the current picture and $ref_a$, $ref_b$.

Four MVs from the interpolated MV field may also be added to the CU level candidate list. More specifically, the interpolated MVs at the position (0, 0), (W/2, 0), (0, H/2) and (W/2, H/2) of the current CU may be added. When FRUC is applied in AMVP mode, the original AMVP candidates may also be added to the CU-level MV candidate set. At the CU level, up to 15 MVs for AMVP CUs and up to 13 MVs for merge CUs are added to the candidate list. In this disclosure, an AMVP CU is a CU in which motion information is predicted using an AMVP mode. Furthermore, in this disclosure, a merge CU is a CU in which motion information is predicted using merge mode.

In some examples, the MV candidate set at the sub-CU level consists of or comprises:
  (i) a MV determined from a CU-level search,
  (ii) top, left, top-left and top-right neighboring MVs,
  (iii) scaled versions of collocated MVs from reference pictures,
  (iv) up to 4 advanced temporal motion vector prediction (ATMVP) candidates,
  (v) up to 4 spatial-temporal motion vector prediction (STMVP) candidates.

The scaled MVs from reference pictures may be derived as follows. All the reference pictures in both lists are traversed. The MVs at a collocated position of the sub-CU in a reference picture are scaled to the reference of the starting CU-level MV. That is, like TMVPs in HEVC, the MVs at the collocated position may be scaled according to the POC distance. ATMVP and STMVP candidates are limited to up to four ATMV and STMVP candidates. At the sub-CU level, up to 17 MVs are added to the candidate list.

Figure 5:
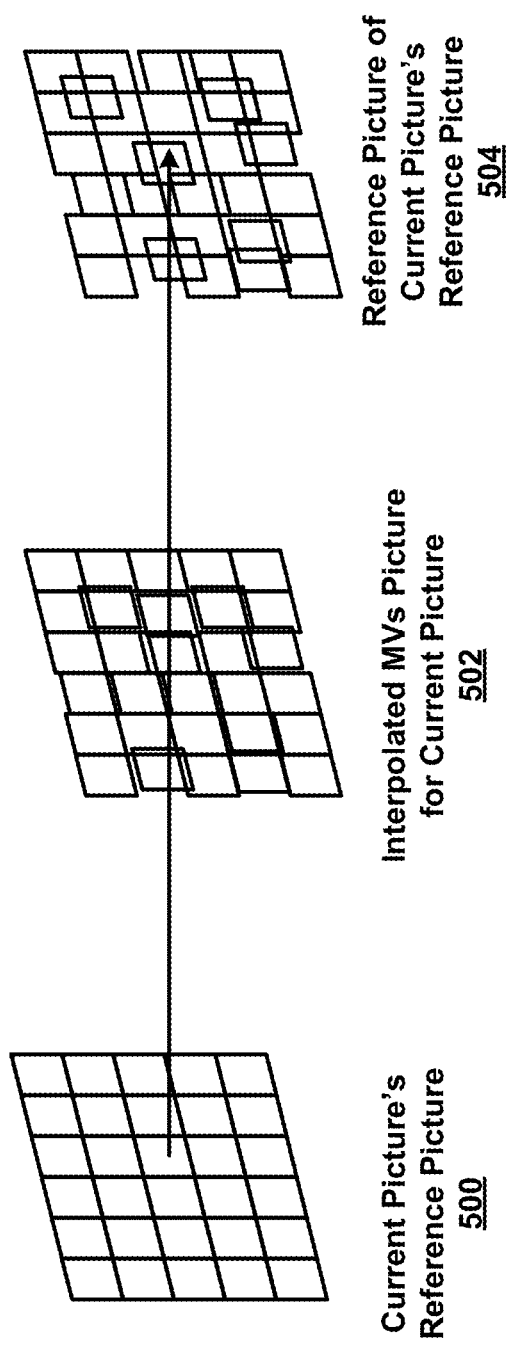
FIG. 5 is an example of unilateral motion estimation in frame-rate up conversion.

As mentioned above, in a CU-level FRUC MV candidate set, the MV candidate set at the CU level may include one or more MVs in an interpolated MV field. Before coding a frame, the interpolated motion field (i.e., interpolated MV field) is generated for the whole picture based on unilateral motion estimation. The motion field may then be used later as CU level or sub-CU level MV candidates. First, the motion field of each reference picture in both reference lists may be traversed at a 4×4 block level. FIG. 5 is an example of unilateral motion estimation in frame-rate up conversion. Picture 500 in FIG. 5 is a reference picture for a current picture. The current picture has an output time corresponding to the output time of picture 502. Picture 504 is a reference picture for picture 500. A video coder uses motion vectors of blocks in picture 500 that point to locations in picture 504 to interpolate samples of the current picture. Picture 502 contains the resulting interpolated samples. In some examples, for each 4×4 block in picture 500 of FIG. 5, if the motion associated to the 4×4 block passing through a 4×4 block in the current picture and the 4×4 block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block in the current frame, the motion of the block in the current frame is marked as unavailable in the interpolated motion field. In other examples, other block sizes may be used.

When a motion vector points to a fractional sample position, motion compensated interpolation may be needed. The motion compensated interpolation may interpolate sample values for locations between actual samples of a picture from actual samples of the picture. To keep the complexity of motion compensated interpolation low, bi-linear interpolation instead of regular 8-tap HEVC interpolation may be used for both bilateral matching and template matching. The calculation of matching cost is different at different steps. For instance, when selecting the best candidate from candidate set at the CU level, the matching cost is the absolute sum difference (SAD) of bilateral matching or template matching. After the starting MV is determined, the matching cost C may be calculated using equation (2), below:

$$C = SAD + w \cdot (|MV_x - MV_x^s| + |MV_y - MV_y^s|) \qquad (2)$$

In equation (2), w is a weighting factor which is empirically set to 4, MV and $MV^s$ indicate the current MV and the starting MV, respectively ($MV_x$ and $MV_x^s$ being the horizontal components of the current MV and the starting MV, respectively; $MV_y$ and $MV_y^s$ being the vertical components of the current MV and the starting MV, respectively), and |•| indicates absolute value.

In some examples, in FRUC mode, a MV is derived by using luma samples only. In such examples, the derived motion may be used for both luma and chroma for motion compensation inter prediction. After the MV is derived, a final motion compensation is performed using an 8-tap interpolation filter for luma and 4-taps interpolation filter for chroma.

MV refinement may include a pattern-based MV search with the criterion of bilateral matching cost or template matching cost. In the JEM, two search patterns are supported: (1) unrestricted center-biased diamond search (UCBDS), and (2) adaptive cross search for MV refinement at the CU level and the sub-CU level, respectively. For both CU level and sub-CU level MV refinement, the MV may be directly searched at quarter luma sample MV accuracy, which may then be followed by one-eighth luma sample MV refinement. The search range of MV refinement for both CU and sub-CU step may be set equal to 8 luma samples.

A video coder may select a prediction direction in template matching FRUC merge mode as follows. In the bilateral matching merge mode, bi-prediction is always applied because the motion information of a CU is derived based on the best match between two blocks along the motion trajectory of the current CU in two different reference pictures. In the JEM, there is no such limitation for the template matching merge mode. In the template matching merge mode, a video coder may select among uni-prediction from list0, uni-prediction from list1 or bi-prediction for a CU. The selection may be based on a template matching cost as follows:

---
Sequence 1
---
If costBi <= factor × min (cost0, cost1),
   bi-prediction is used;
Else If cost0 <= cost1,
   uni-prediction from list0 is used;
Else,
   uni-prediction from list1 is used;

---

In the pseudocode of Sequence 1, above, cost0 is the SAD of list0 template matching, cost1 is the SAD of list1 template matching and costBi is the SAD of bi-prediction template matching. The value of factor is equal to 5/4, which means that the selection process is biased to bi-prediction. In the JEM, the inter prediction direction selection is only applied to CU-level template matching process.

In a bi-prediction template matching operation, for the prediction of one block region, two prediction blocks, formed using a MV of list0 and a MV of list1, respectively, are combined to form a single prediction signal. In the decoder-side motion vector refinement (DMVR) method, the two motion vectors of the bi-prediction are further refined by a bilateral template matching process. The bilateral template matching may be applied in video decoder 30 to perform a distortion-based search between a bilateral template and the reconstruction samples in the reference pictures in order to obtain a refined MV without transmission of additional motion information.

Figure 6:
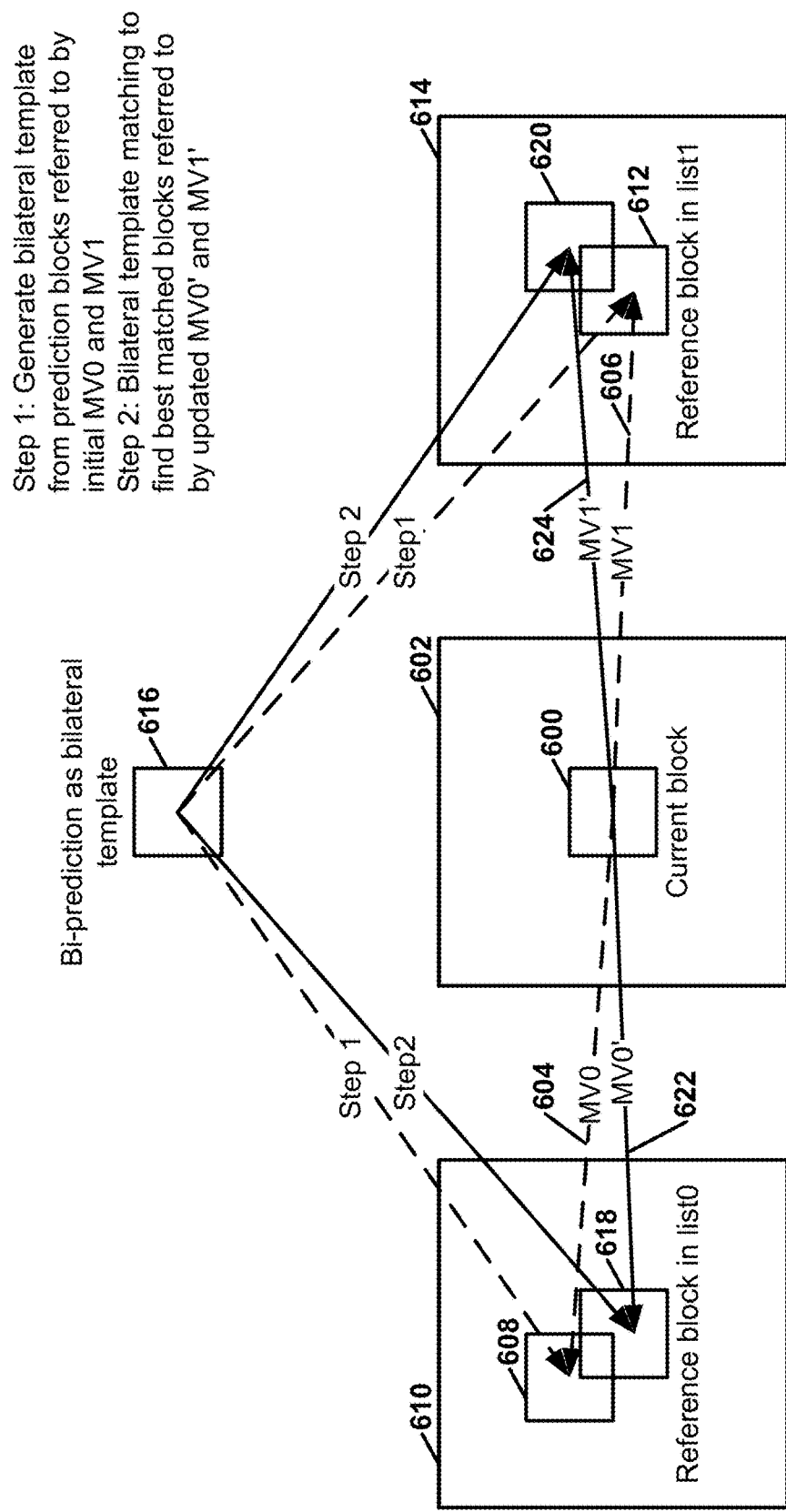
FIG. 6 is an example of a decoder-side motion vector refinement based on bilateral template matching.

In DMVR, a bilateral template is generated as a weighted combination (i.e. average) of the two prediction blocks, from the initial MV0 of list1 and MV1 of list1, respectively, as shown in FIG. 6. The template matching operation may include or consist of calculating cost measures between the generated bilateral template and the sample region (around the initial prediction block) in the reference picture. For each of the two reference pictures, the MV that yields the minimum template cost may be considered as the updated MV of that list to replace the original one. The template cost may be calculated as the sum of absolute differences (SAD) or sum of squared differences (SSD) between the current template and the reference samples. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 6, are used for generating the final bi-prediction results. A SAD may be utilized as the cost measure. FIG. 6 is a proposed DMVR based on bilateral template matching.

Thus, in the example of FIG. 6, a current block 600 in a current picture 602 has a first motion vector 604 (MV0) and a second motion vector 606 (MV1). Motion vector 604 points to a reference block 608 in a list0 reference picture 610. Motion vector 606 points to a reference block 612 in a list1 reference picture 614. Reference block 608 and reference block 612 may also be referred to herein as prediction blocks. After identifying reference block 608 and reference block 612, a video coder may generate a predictive block 616 as a weighted average of reference block 608 and reference block 612. Predictive block 616 may also be referred to herein as a bilateral template. Hence, in the example of FIG. 6, the video coder may generate a bilateral template from prediction blocks referred to by MV0 and MV1. Additionally, the video coder may search in reference picture 610 for a block that best matches predictive block 616. In the example of FIG. 6, the video coder has identified block 618 of reference picture 610 as the best match for predictive block 616. The video coder may also search in reference picture 614 for a block that best matches predictive block 616. In the example of FIG. 6, the video coder has identified block 620 as the best match for predictive block 616. A motion vector 622 (MV0') indicates a spatial displacement between current block 600 and block 618. A motion vector 624 (MV1') indicates a spatial displacement between current block 600 and block 620.

DMVR may be applied for the merge mode of bi-prediction with one MV from a reference picture in the past and another from a reference picture in the future, without the transmission of additional syntax elements. In JEM5, when local illumination compensation (LIC), affine motion, FRUC, or sub-CU merge candidate is enabled for a CU, DMVR is not applied.

In the JEM with QTBT, each CU can have at most one set of motion for each prediction direction. Two sub-CU level motion vector prediction methods are provided by splitting a large CU into sub-CUs and deriving motion information for all the sub-CUs of the large CU. The advanced temporal motion vector prediction (ATMVP) method allows each CU to fetch multiple sets of motion information from multiple blocks smaller than the current CU in the collocated reference picture. In the spatial-temporal motion vector prediction (STMVP) method, motion vectors of the sub-CUs are derived recursively by using the temporal motion vector predictor and spatial neighboring motion vector. To preserve a more accurate motion field for sub-CU motion prediction, the motion compression for the reference frames is currently disabled in the JEM.

Figure 7:
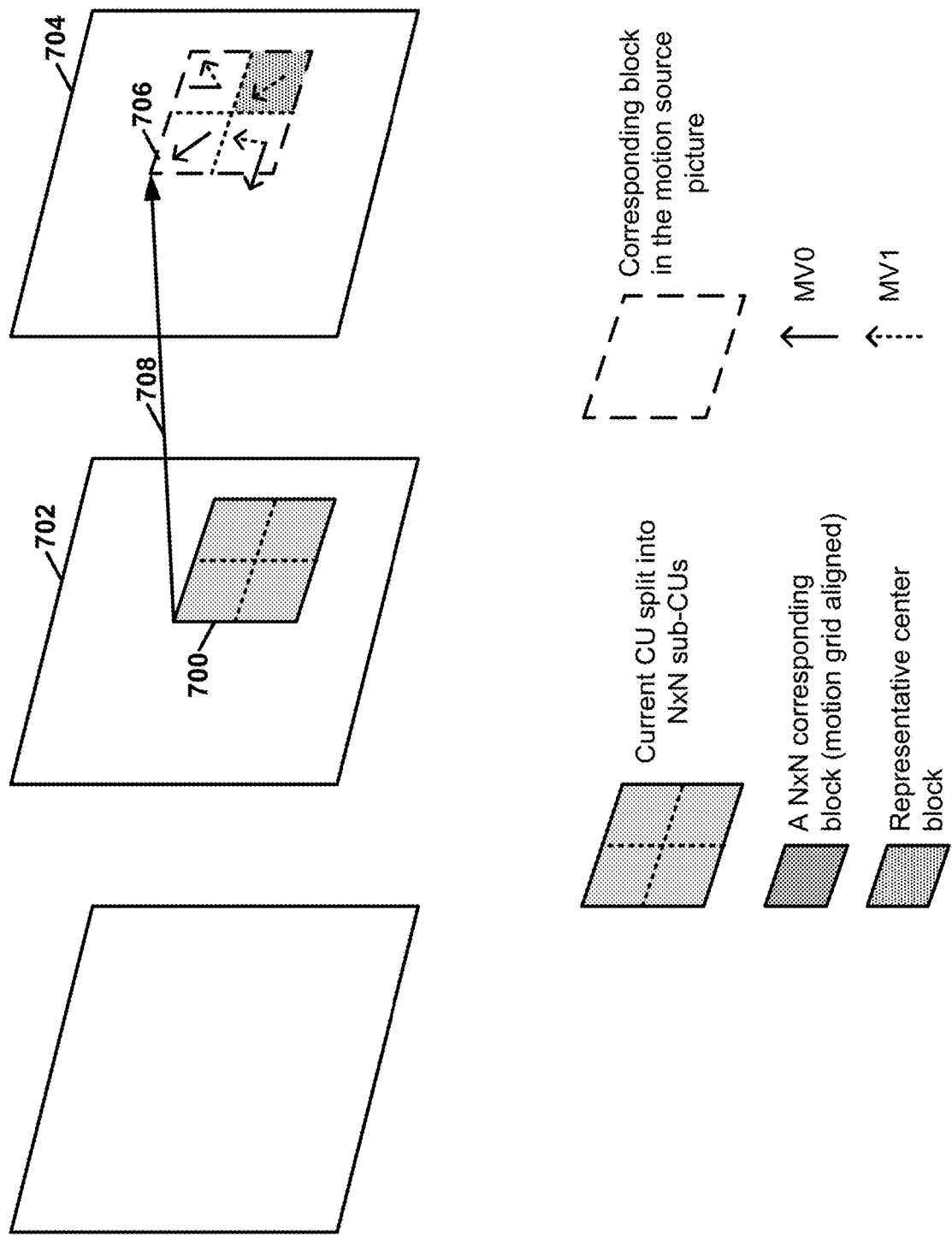
FIG. 7 is an example of advanced temporal motion vector prediction motion prediction for a coding unit.

In the advanced temporal motion vector prediction (ATMVP) method, the motion vectors temporal motion vector prediction (TMVP) is improved by allowing each CU to fetch multiple sets of motion information (including motion vectors and reference indices) from multiple blocks smaller than the current CU. As shown in FIG. 7, the sub-CUs are square N×N blocks (N is set to 4 by default).

The ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and to obtain the motion vectors as well as the reference indices of each sub-CU from the block corresponding to each sub-CU, as shown in FIG. 7.

FIG. 7 shows ATMVP motion prediction for a current CU 700 in a current picture 702. In the first step, a reference picture 704 and a corresponding block 706 is determined by the motion information of the spatial neighboring blocks of current CU 700. Reference picture 704 may also be referred to as motion source picture 704 because a video coder uses motion source picture 704 as a source of motion information for current CU 700 in current picture 702. To avoid the repetitive scanning process of neighboring blocks, the motion information of the first merge candidate in a merge candidate list of current CU 700 is used to determine reference picture 704 and corresponding block 706. The first available motion vector as well as its associated reference index are set to be a temporal vector 708 and the index to the motion source picture 704. This way, in ATMVP, corresponding block 706 may be more accurately identified, compared with TMVP, wherein the corresponding block (sometimes called collocated block) is always in a bottom-right or center position relative to current CU 700.

In the second step, a corresponding block of a sub-CU of current CU 700 is identified by temporal vector 708 in motion source picture 704, by adding temporal vector 708 to the (x, y) coordinates of current CU 700. For each sub-CU of current CU 700, the motion information of its corresponding block (the smallest motion grid that covers the center pixel) is used to derive the motion information for the sub-CU. After the motion information of a corresponding N×N block is identified, the motion information of the corresponding N×N block is converted to the motion vectors and reference indices of the current sub-CU, in the same way as TMVP, wherein motion scaling and other procedures apply. For example, video decoder 30 may check whether the low-delay condition is fulfilled and possibly uses motion vector $MV_x$ (the motion vector corresponding to reference picture list X) to predict motion vector $MV_y$ (with X being equal to 0 or 1 and Y being equal to 1−X) for each sub-CU. This is done in the same way as for temporal motion vector prediction.

Figure 8:
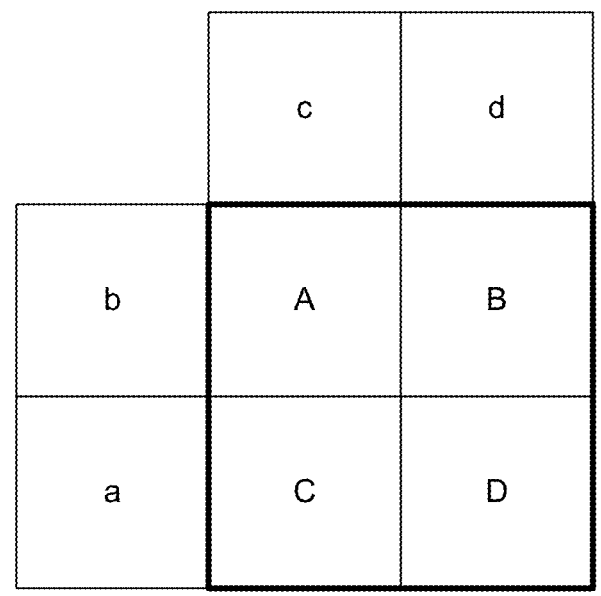
FIG. 8 is an example of one coding unit with four sub-blocks and its neighboring blocks.

In spatial-temporal motion vector prediction, the motion vectors of the sub-CUs are derived recursively, following raster scan order. FIG. 8 illustrates this concept. For example, consider an 8×8 CU (shown in FIG. 8 as a square with a thicker outline) which contains four 4×4 sub-CUs A, B, C, and D, as shown in FIG. 8. The neighboring N×N blocks in the current frame are labelled as a, b, c, and d in FIG. 8.

The motion derivation for sub-CU A starts by identifying its two spatial neighbors. The first neighbor is an N×N block above sub-CU A (block c). If block c is not available or is intra coded, the other N×N blocks above sub-CU A are checked (from left to right, starting at block c). The second neighbor is a block to the left of the sub-CU A (block b). If block b is not available or is intra coded, other blocks to the left of sub-CU A are checked (from top to bottom, staring at block b). The motion information obtained from the neighboring blocks for each list is scaled to the first reference frame for a given list. Next, a temporal motion vector predictor (TMVP) of sub-block A is derived by following the same procedure of TMVP derivation as specified in HEVC and described in this disclosure above. The motion information of the collocated block at location D is fetched and scaled accordingly. At last, after retrieving and scaling the motion information, all available motion vectors (up to 3) are averaged separately for each reference list. The averaged motion vector is assigned as the motion vector of the current sub-CU.

In sub-CU motion prediction mode signaling, the sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. At encoding logic of the additional merge candidates is same as the merge candidates in the HEVC test model (HM), which means, for each CU in P or B slice, two more RD checks are needed for the two additional merge candidates. To improve the merge index coding, in the JEM, all bins of a merge index are context coded by CABAC. While in HEVC, only the first bin is context coded and the remaining bins are context by-pass coded.

It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 20 and video decoder 30. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals are split directly in half. However, compression efficiency may be diminished.

In HEVC, only a translation motion model is applied for motion compensation prediction (MCP). In the real world, there are many kinds of motion, e.g. zoom in/out, rotation, perspective motions and the other irregular motions. In the JEM, an affine transform motion compensation prediction is applied to improve the coding efficiency. If a block follows affine motion model, the MV of position (x, y) in the block can be determined by the affine motion model:

$$\begin{cases} v_x = ax + by + c \\ v_y = dx + ey + f \end{cases} \quad (3)$$

In equation (3), a, b, c, d, e and f are affine parameters. Furthermore, in equation (3), $v_x$ is a horizontal component of the MV of position (x, y) and $v_y$ is a vertical component of the MV of position (x, y).

Figure 9:
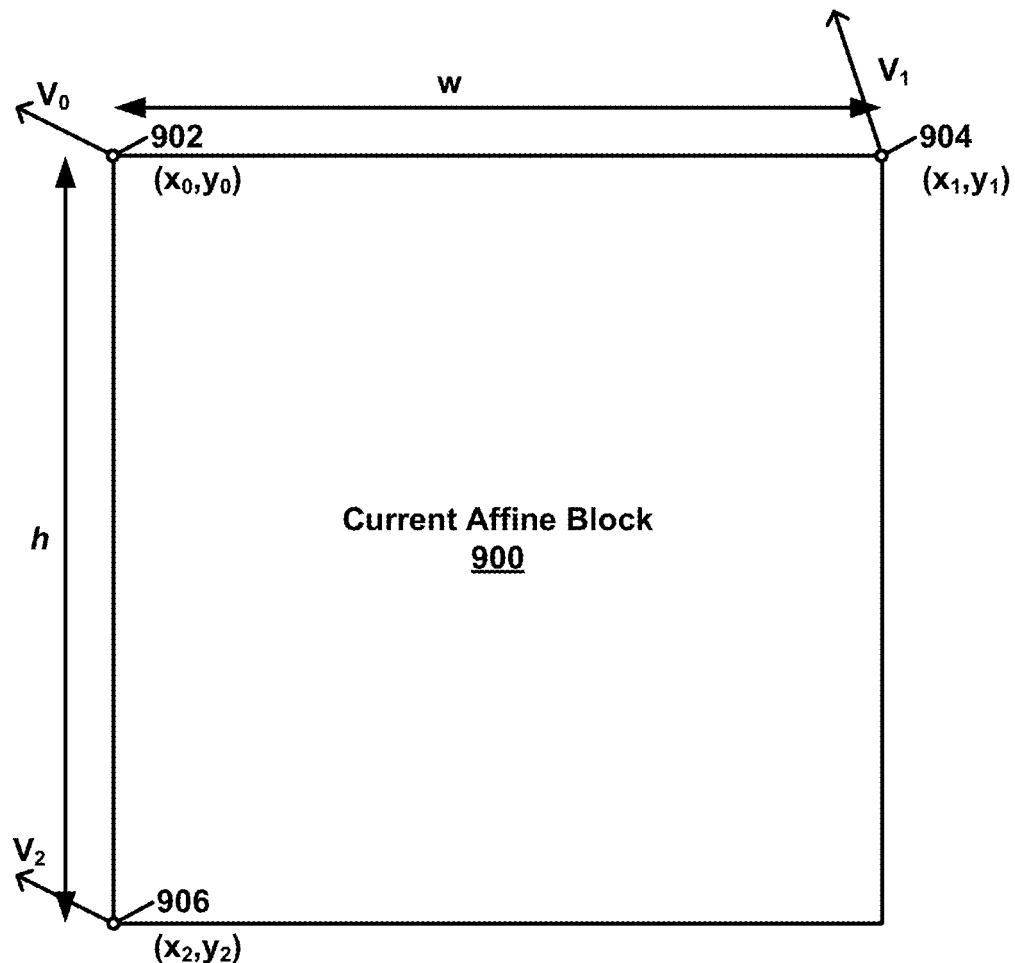
FIG. 9 is a block diagram of an example simplified affine motion model for a current affine block.

FIG. 9 is a block diagram of a simplified affine motion model for a current affine block 900. As shown in FIG. 9, the 6-parameters affine motion model can be represented by the motion vector $v_0$ of a top-left control point 902 ($x_0$, $y_0$), the motion vector $v_1$ of a top-right control point 904 ($x_1$, $y_1$) and the motion vector $v_2$ of a bottom-left control point 906 ($x_2$, $y_2$). With the assumption that top-left control point 902 is the origin of the coordinate system, which means ($x_0$, $y_0$)=(0, 0), the MV of position (x, y) in current affine block 900 is described by equation (4), below:

$$\begin{cases} v_x = \frac{(v_{1x} - v_{0x})}{w} x + \frac{(v_{2x} - v_{0x})}{h} y + v_{0x} \\ v_y = \frac{(v_{1y} - v_{0y})}{w} x + \frac{(v_{2y} - v_{0y})}{h} y + v_{0y} \end{cases} \quad (4)$$

In equation (4), ($v_{0x}$, $v_{0y}$) is the motion vector of top-left corner control point 902, ($v_{1x}$, $v_{1y}$) is a motion vector of top-right corner control point 904, ($v_{2x}$, $v_{2y}$) is a motion vector of bottom-left corner control point 906, w=($x_1$−$x_0$) is the horizontal distance between the top-left and top-right control points 902, 904, and h=($y_2$−$y_0$) is the vertical distance between top-left and bottom-left control points 902, 906. In equation (4), $v_x$ is a horizontal component of the MV of position (x, y) and $v_y$ is a vertical component of the MV of position (x, y).

However, in the JEM, the affine motion model is simplified to a 4-parameter affine motion model by assuming a=e and b=−d in equation (3), resulting in the expression of $v_x$ and $v_y$, as shown in equation (5), below:

$$\begin{cases} v_x = ax - by + c \\ v_y = bx + ay + f \end{cases} \quad (5)$$

Figure 10:
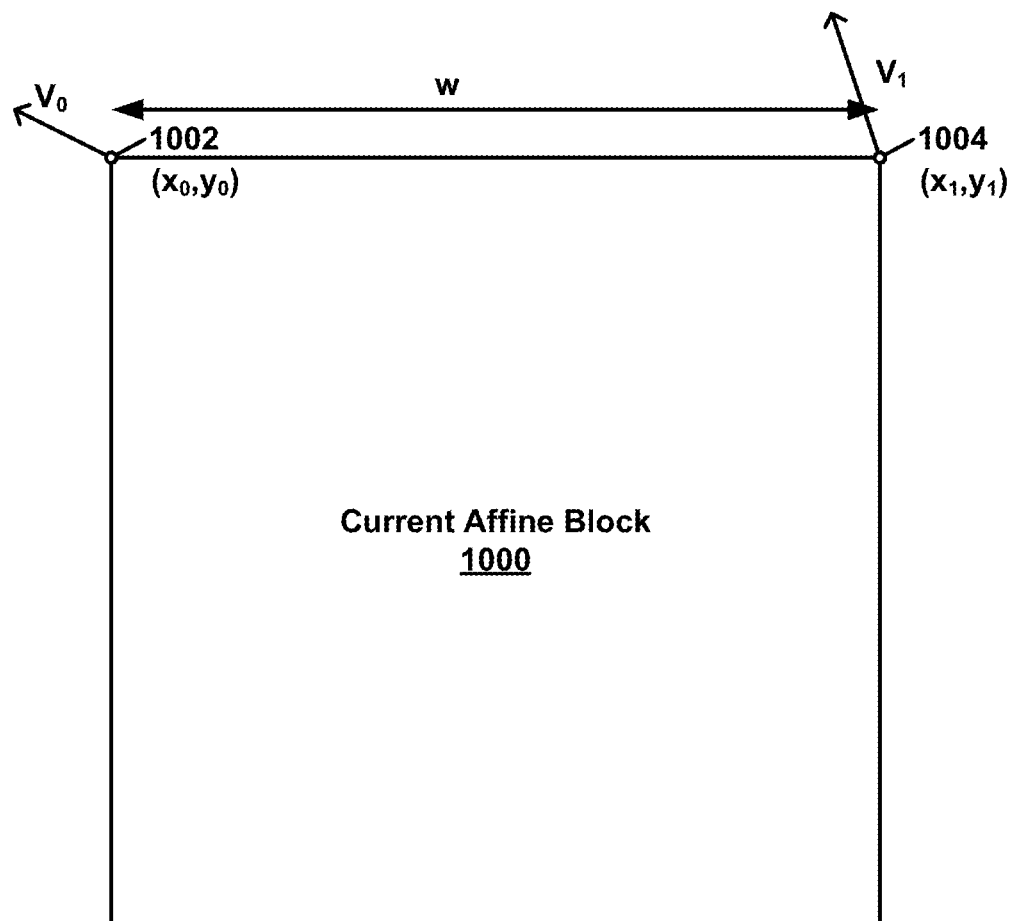
FIG. 10 is an example of a simplified affine motion model for a current affine block.

The 4-parameters affine motion model is then represented by the motion vector $v_0$ of top-left control point 902 ($x_0$, $y_0$) which is assumed as the origin point and the motion vector $v_1$ of top-right control point 904 ($x_1$, $y_1$). In equation (5), $v_x$ is a horizontal component of the MV of position (x, y) and $v_y$ is a vertical component of the MV of position (x, y). FIG. 10 is an example of a simplified affine motion model for a current affine block 1000. As shown in FIG. 10, the affine motion field of the block is described by two control point motion vectors, $v_0$ and $v_1$. The motion vector field (MVF) of a block is described by equation (6):

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (6)$$

In equation (6), ($v_{0x}$, $v_{0y}$) is a motion vector of top-left corner control point 1002, ($v_{1x}$, $v_{1y}$) is a motion vector of a top-right corner control point 1004 and w-($x_1-x_0$) is the horizontal distance between the top-left and top-right control points 1002, 1004. $v_x$ is a horizontal component of the MV of position (x, y) and $v_y$ is a vertical component of the MV of position (x, y).

Figure 11:
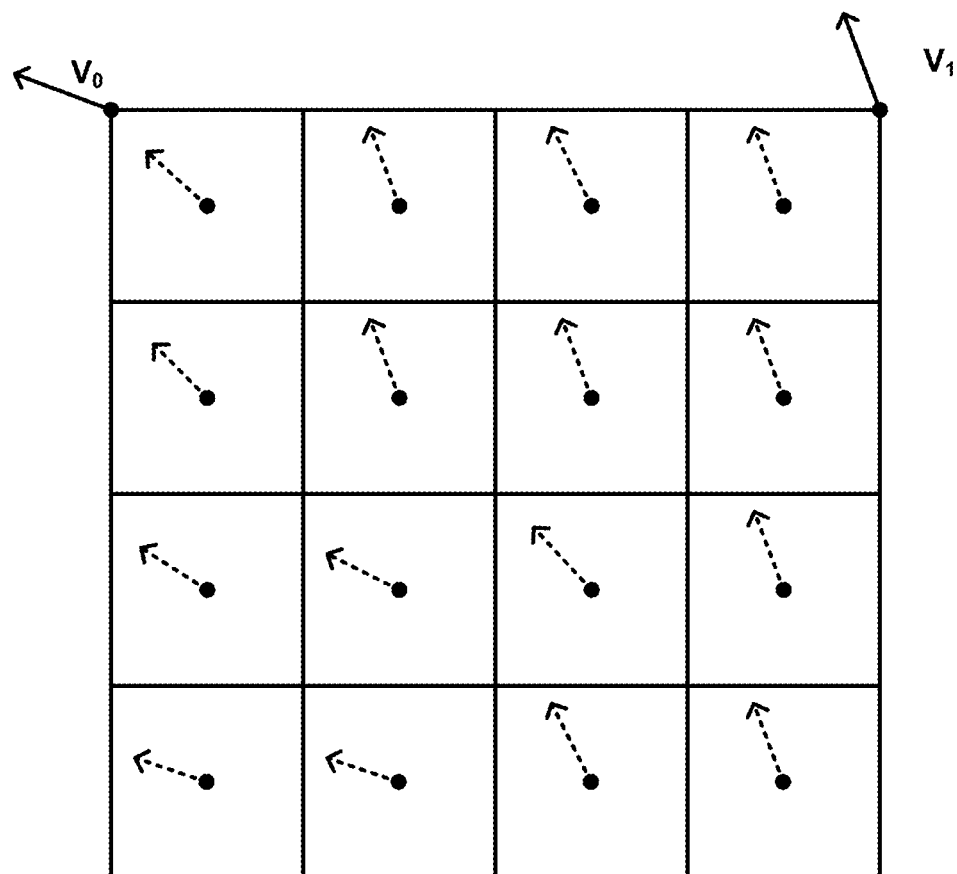
FIG. 11 is an example of a motion compensation prediction motion vector field.

In order to further simplify the motion compensation prediction, block-based affine transform prediction may be applied. To derive a motion vector of each sub-block, the motion vector of a center sample of each sub-block, as shown in FIG. 11, is calculated according to equation (6), and rounded to 1/16 fraction accuracy. A video coder may then apply motion compensation interpolation filters to generate the prediction of each sub-block with the derived motion vector. The interpolated motion vectors for each sub-block within the affine block is named as MCP motion vector field (MVF) in the following context. The sub-block size can vary depending on the MV difference between control points. FIG. 11 is an example MCP MV field, where the MV of each sub-block (e.g., 4×4 block) is interpolated by the MVs of the control points; the MV is then used to perform motion compensation prediction (MCP) for each sub-block. The motion vector of each sub-block may be used to identify a corresponding reference block, the combination of which form a predictive block. Thus, in this way, a video coder may generate a predictive block based on a motion vector of a block (e.g., a motion vector of a control point of the block).

Figure 12:
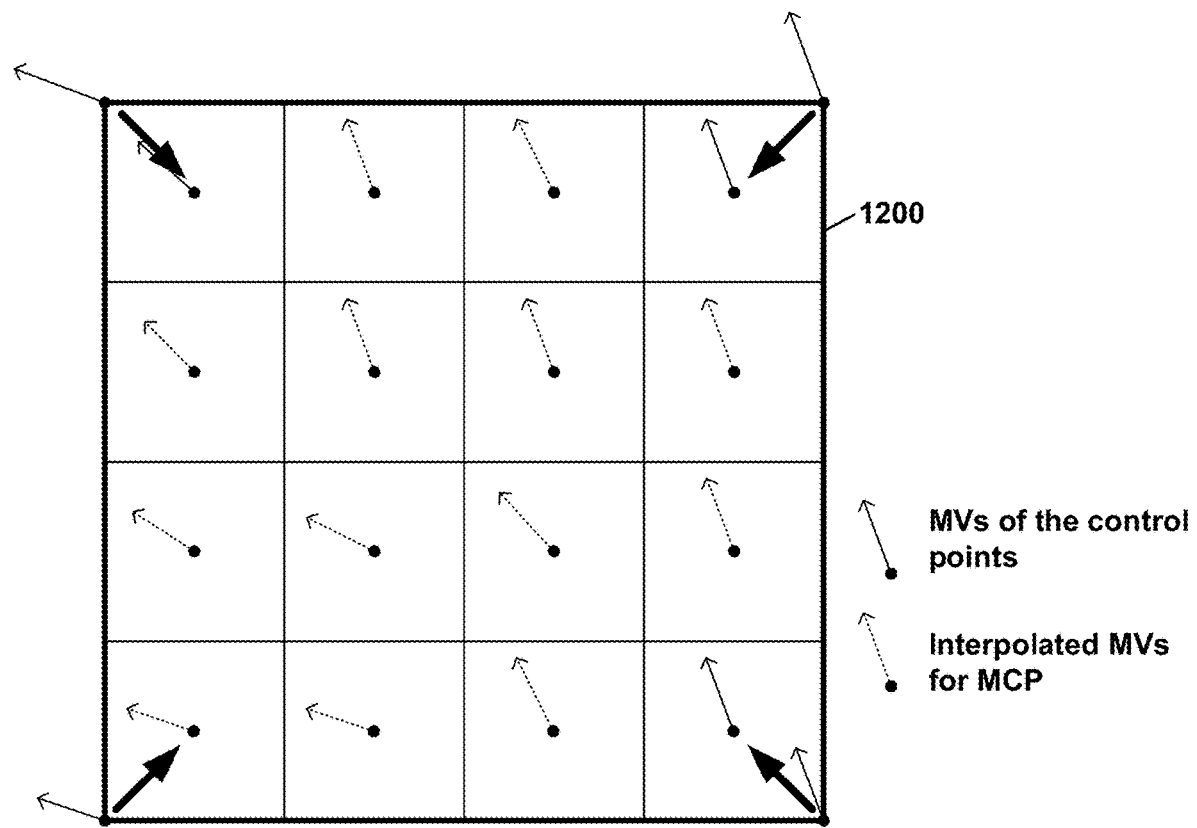
FIG. 12 is an example of a stored motion vector field.

After motion compensation prediction, the high accuracy motion vector of each sub-block is rounded and saved as the same accuracy as the normal motion vector. In the JEM and in HEVC, the motion vectors for each inter prediction CU or PU are stored for the MV prediction of the other inter blocks. The store unit for motion vectors is a 4×4 block. In other words, in the JEM, the interpolated MVs of an affine block are generated and stored for each 4×4 block. However, since the MVs of the control points may be used for the following blocks, the stored MVs for the corner 4×4 blocks are the MVs of the control points instead of the associated MVs used for MCP as shown in FIG. 12. Note that, in JEM6, the MVs of the bottom-left and bottom-right control points are also generated by the MVs of the top-left and top-right control points.

Thus, in FIG. 12, a CU 1200 includes sixteen sub-blocks. For each respective sub-block of the twelve sub-blocks not at the corners of CU 1200, a video coder stores the motion vector(s) for the center point of the respective sub-block. For each respective sub-block at a corner of CU 1200, the video coder stores the motion vector(s) for the outer corner of the respective sub-block.

Figure 13:
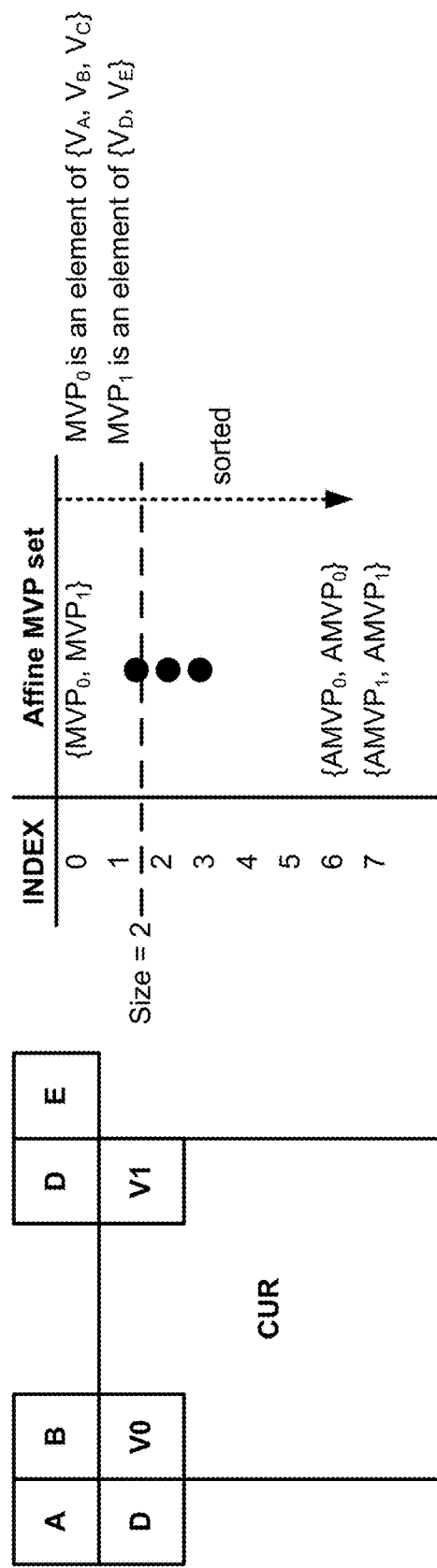
FIG. 13 is an example of motion vector prediction for AF_INTER.

In the JEM, there are two affine motion modes: affine inter (AF_INTER) mode and affine merge (AF_MERGE) mode. For CUs with both width and height larger than 8, AF_INTER mode can be applied. An affine flag at the CU level is signaled in the bitstream to indicate whether AF_INTER mode is used. In this mode, a candidate list with motion vector set $\{(MVP_0, MVP_1)|MVP_0 = \{v_A, v_B, v_C\}, MVP_1 = \{v_D, v_E\}\}$ is constructed using the neighbor blocks. As shown in FIG. 13, $MVP_0$ is selected from the motion vectors of the block A, B or C. FIG. 13 illustrates an example of MVP for AF_INTER. The motion vector from the neighbor block is scaled according to the reference list and the relationship among the Picture Order Count (POC) of the reference for the neighbor block, the POC of the reference for the current CU and the POC of the current CU. The approach to select $MVP_1$ from the neighbor block D and E is similar. In the JEM, if the number of candidates in the candidate list is smaller than 2, the list is padded by the motion vector pair composed by duplicating each of the AMVP candidates $\{AMVP_0, AMVP_0\}$ and $\{AMVP_1, AMVP_1\}$.

Furthermore, in the JEM, when the number of candidates in the candidate list is larger than 2, the candidates are firstly sorted according to the consistency of the neighboring motion vectors (similarity of the two motion vectors in a pair candidate) and only the first two candidates are kept as shown in the right part of FIG. 13. A video coder may use a rate-distortion (RD) cost check is used to determine which motion vector set candidate is selected as the control point motion vector prediction (CPMVP) of the current CU. An index indicating the position of the CPMVP in the candidate list is signaled in the bit stream. After the CPMVP of the current affine CU is determined, affine motion estimation is applied and the control point motion vector (CPMV) is found. The difference of the CPMV and the CPMVP may then be signaled in the bitstream.

Figure 14B:
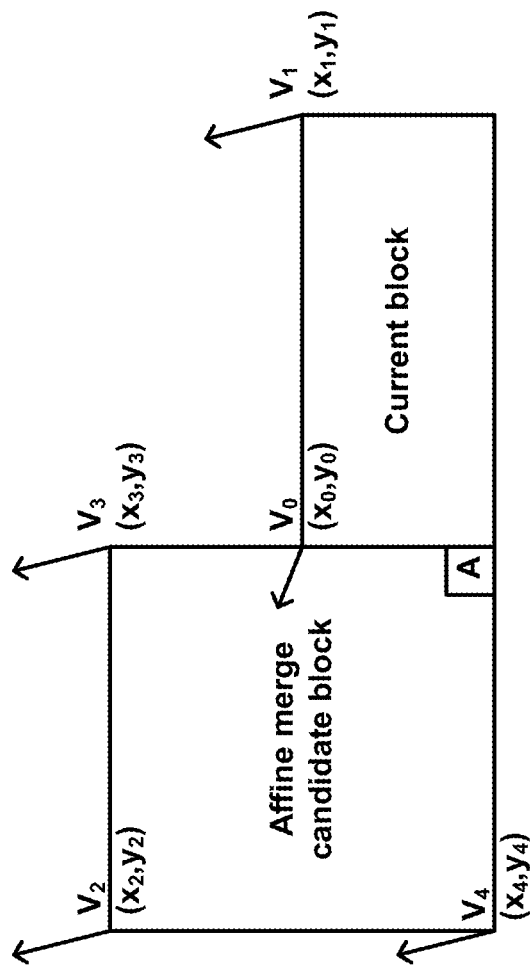
FIG. 14B is a block diagram illustrating candidates for AF_MERGE if a left bottom candidate block is coded in affine mode.
Figure 14A:
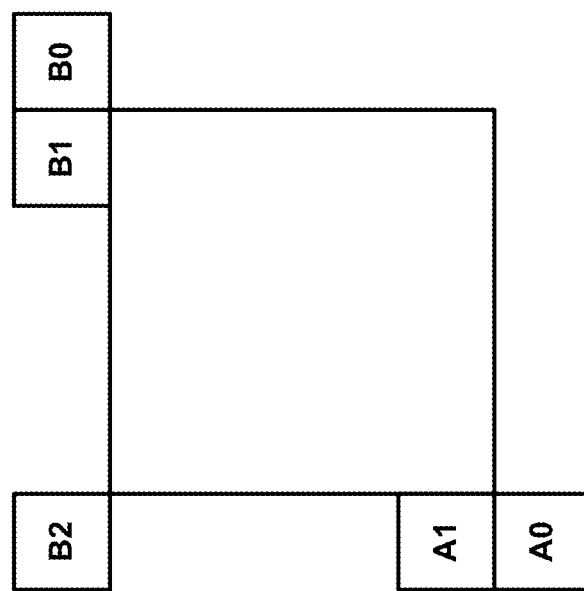
FIG. 14A is a block diagram illustrating a selection order for candidate blocks for AF_MERGE.

When a CU is applied in affine merge (AF_MERGE) mode, the CU gets the first block coded with affine mode from the valid neighbor reconstructed blocks based on the visiting order: A1→B1→B0→A0→B2. The selection order for the candidate block is from left, above, above-right, left-bottom to above-left as shown in FIG. 14A. If the neighbor left bottom block A is coded in affine mode as shown in FIG. 14B, the motion vectors $v_2$, $v_3$ and $v_4$ of the top left corner, above right corner and left bottom corner of the CU which contains the block A are derived. The motion vector $v_0$ of the top left corner on the current CU is extrapolated according to $v_2$, $v_3$ and $v_4$ using equation (7), below, by assuming ($x_2$, $y_2$) is the origin point which means ($x_2$, $y_2$)=(0, 0). Secondly, the motion vector $v_1$ of the above right of the current CU is calculated in a similar way. Equation (7) is shown below.

$$\begin{cases} v_x = \frac{(v_{3x} - v_{2x})}{w}x + \frac{(v_{4x} - v_{2x})}{h}y + v_{2x} \\ v_y = \frac{(v_{3y} - v_{2y})}{w}x + \frac{(v_{4y} - v_{2y})}{h}y + v_{2y} \end{cases} \quad (7)$$

In equation (7), ($v_{2x}$, $v_{2y}$) is motion vector of the top-left corner control point ($x_2$, $y_2$), ($v_{3x}$, $v_{3y}$) is motion vector of the top-right corner control point ($x_3$, $y_3$), ($v_{4x}$, $v_{4y}$) is motion vector of the bottom-left corner control point ($x_4$, $y_4$) in the neighbor affine block, $w=(x_3-x_2)$ is the horizontal distance between the top-left and top-right control points, and $h=(y_4-y_2)$ is the vertical distance between the top-left and bottom-left control points, $v_x$ is the horizontal component of the motion vector for location (x, y), and $v_y$ is the vertical component of the motion vector for location (x, y).

After the CPMV of the current CU $v_0$ and $v_1$ are derived, according to the affine motion model equation (6), the MVF of the current CU is generated. In order to identify whether the current CU is coded with AF_MERGE mode, an affine flag is signaled in the bitstream when there is at least one neighbor block coded in affine mode.

In HEVC, Motion Vector Differences (MVDs) (between the motion vector and predicted motion vector of a PU) are signaled in unit of quarter luma sample. In the JEM, Advanced Motion Vector Resolution (AMVR) is introduced. In JEM5, an MVD can be coded in units of quarter luma samples, integer luma samples or four luma samples. In JEM5, the MVD resolution is controlled at the CU level and MVD resolution flags are conditionally signaled for each CU that has at least one non-zero MVD components.

For a CU that has at least one non-zero MVD components, a first flag is signaled to indicate whether quarter luma sample MV precision is used in the CU. When the first flag (equal to 1) indicates that quarter luma sample MV precision is not used, another flag is signaled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

At the encoder side, video encoder 20 may use CU level RD checks to determine which MVD resolution is used for a CU. That is, the CU level RD check may be performed three times, respectively, for each MVD resolution. To accelerate encoder speed, the following encoding schemes are applied in the JEM:

During an RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

An RD check of a CU with 4 luma sample MVD resolution is conditionally invoked. For a CU, when the RD cost for integer luma sample MVD resolution is much larger than that of quarter luma sample MVD resolution (e.g., the ratio of the RD cost for integer luma sample MVD resolution to the RD cost for quarter luma sample MVD resolution is greater than a threshold), the RD check of 4 luma sample MVD resolution for the CU is skipped.

The reconstructed motion vector information is not fully utilized in the existing schemes of motion vector prediction in the existing video codec such as HEVC/H.265, AVC/H.264, and the JEM.

This disclosure describes techniques that may improve computing devices that perform motion vector prediction (MVP). The techniques are elaborated in several different aspects described below. The following techniques may be applied individually. Alternatively, any combination of the techniques may be applied.

In accordance with one or more techniques of this disclosure, video coders may use motion vectors of blocks which are not immediately adjacent to a current block because the motion vectors of the non-adjacent blocks can further improve prediction efficiency, especially when the correlation between the spatial motion vectors is strong enough for the motion information of the current block to be similar to that of the non-adjacent blocks. Thus, the motion information from the non-adjacent blocks may be good MVP candidates for the current block. In this disclosure, it is proposed that one or more non-adjacent spatial motion vector predictors (NA-SMVPs) are used to derive the motion vector predictor for the motion information of current block; or the NA-SMVPs may be directly re-used by the current block to perform inter-prediction. This disclosure describes techniques to adaptively incorporate the NA-SMVPs together with the other MV predictors (e.g., regular SMVP, TMVP, synthetic MVPs) for MV prediction.

Thus, in accordance with a technique of this disclosure, video encoder 20 may determine a motion vector of a non-adjacent block of a current picture of the video data. The non-adjacent block is non-adjacent to a current block of the current picture. Furthermore, video encoder 20 may determine, based on the motion vector of the non-adjacent block, an MVP for the current block. Video encoder 20 may also determine a motion vector of the current block. The motion vector may be equal to a motion vector of the MVP for the current block or may be equal to the motion vector of the MVP for the current block plus a motion vector difference (MVD) signaled in a bitstream. Additionally, video encoder 20 may determine a predictive block based on the motion vector of the current block. Video encoder 20 may generate, based on the predictive block, residual sample values.

Similarly, video decoder 30 may determine a motion vector of a non-adjacent block of a current picture of the video data. The non-adjacent block is non-adjacent to a current block of the current picture. Furthermore, video decoder 30 may determine, based on the motion vector of the non-adjacent block, an MVP for the current block. Additionally, video decoder 30 may determine, based on the MVP for the current block, a motion vector of the current block. Video decoder 30 may also determine a predictive block based on the motion vector of the current block. Video decoder 30 may then reconstruct, based on the predictive block, sample values of the current picture.

In some examples, the non-adjacent spatial motion vector predictors (NA-SMVP) are derived from the motion information of the spatially non-adjacent blocks located within the same picture, slice or a pre-defined region in which the current block is located. Because the motion information of the non-adjacent blocks may be re-used as motion vector predictors for the current block, only the non-adjacent blocks which have motion information reconstructed are considered for non-adjacent MVP derivation. This disclosure proposes further adding a constraint to the NA-blocks to constrain a distance between the NA-blocks and the current block to be within a range. The distance can be measured in pixel distance in the L1 or L2 sense; or the distance can be measured in block distance in the L1 or L2 sense. L1 distance between two coordinate points in an n-dimensional real vector space with a fixed Cartesian coordinate system is the sum of the lengths of the projections of the line segment between the points onto the coordinate axes. In the case of L1 pixel distance, the length of a projection is the height or width of one pixel. In the case of L1 block distance, the length of a projection is a width or height of a block. The L2 distance is the Euclidean distance between two points. The distance can be measured between the block centers or any designated point within each block. In some examples, another constraint is added to the NA-blocks which constrains the NA-blocks to be the blocks that are not adjacent to the current block and are not adjacent to the blocks which are immediately adjacent to the current block.

Figure 15:
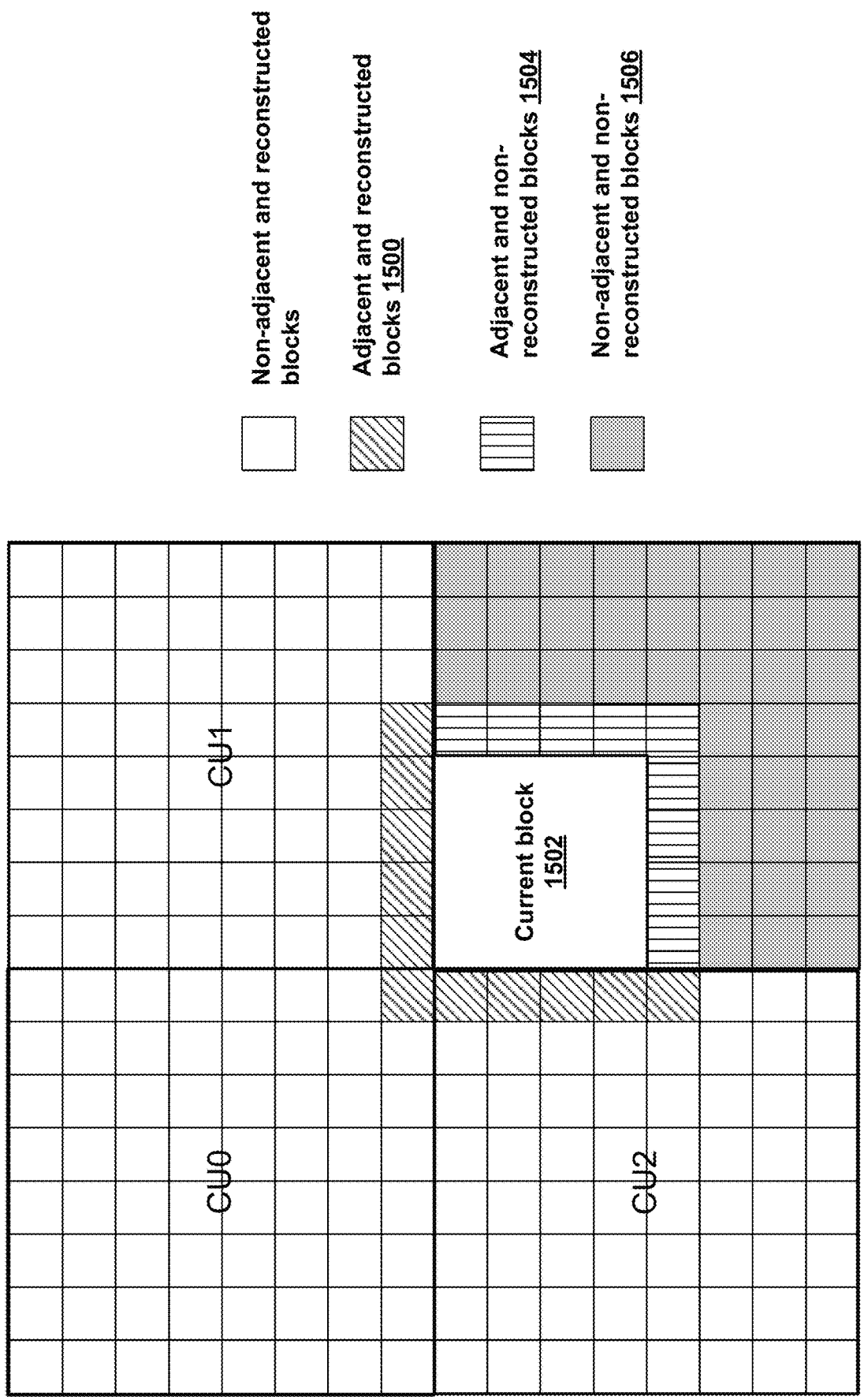
FIG. 15 is a block diagram illustrating example non-adjacent blocks, in accordance with a technique of this disclosure.

FIG. 15 is a block diagram illustrating example non-adjacent blocks, in accordance with a technique of this disclosure. As shown in FIG. 15, the non-adjacent blocks 1500 are reconstructed blocks that are not immediately adjacent to a current block 1502. The size of the non-adjacent blocks can be defined as the smallest unit block used to store the motion information (e.g. 4×4 block) or the basic unit for inter-prediction (e.g. PU in HEVC) or the sub-block as used in affine mode, FRUC mode in the JEM or any other specified block size. FIG. 15 also shows adjacent, non-reconstructed blocks 1504 and non-adjacent, non-reconstructed blocks 1506.

Figure 16:
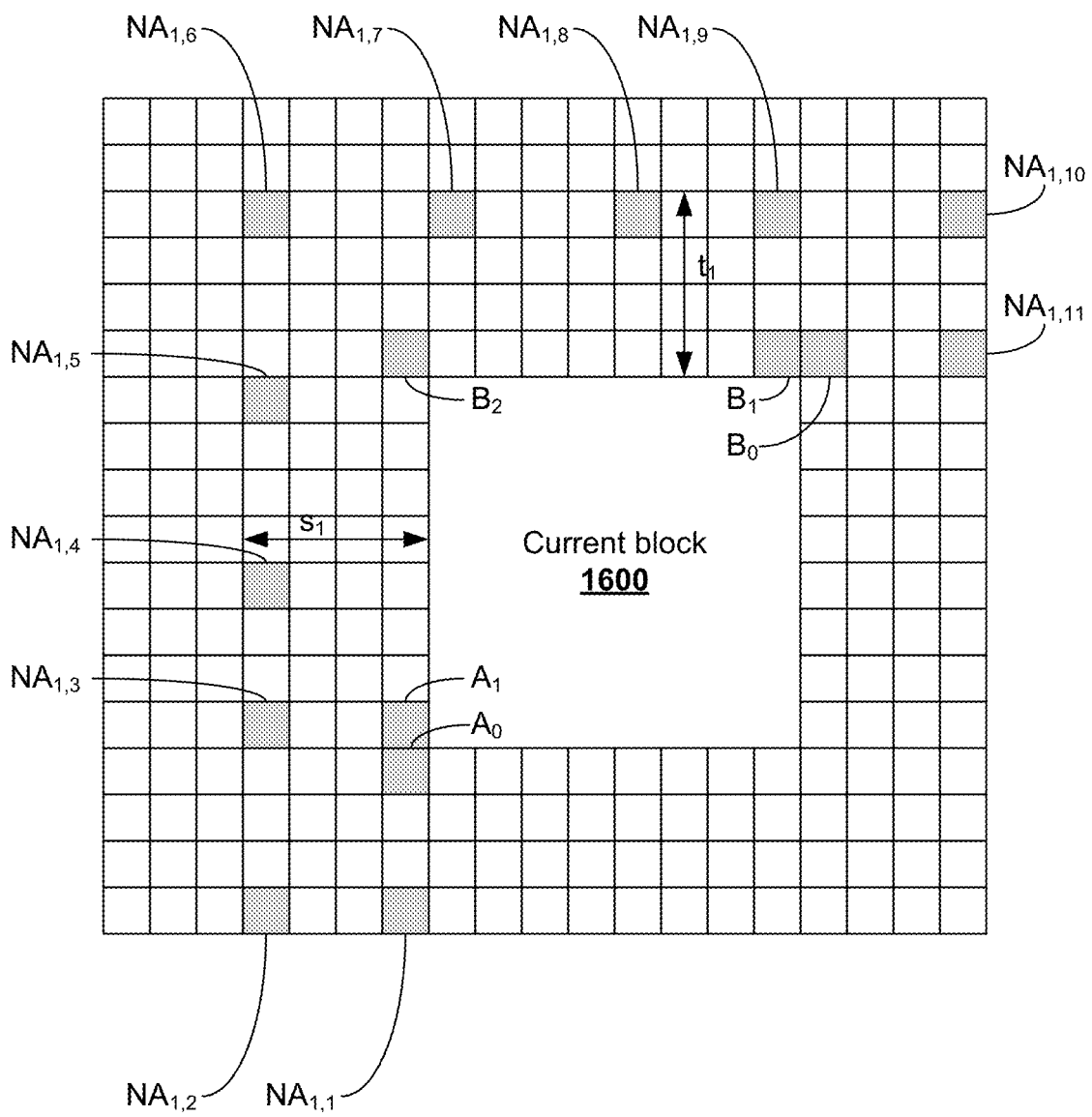
FIG. 16 is a block diagram illustrating an example of a selection of non-adjacent blocks, in accordance with a technique of this disclosure.
Figure 17:
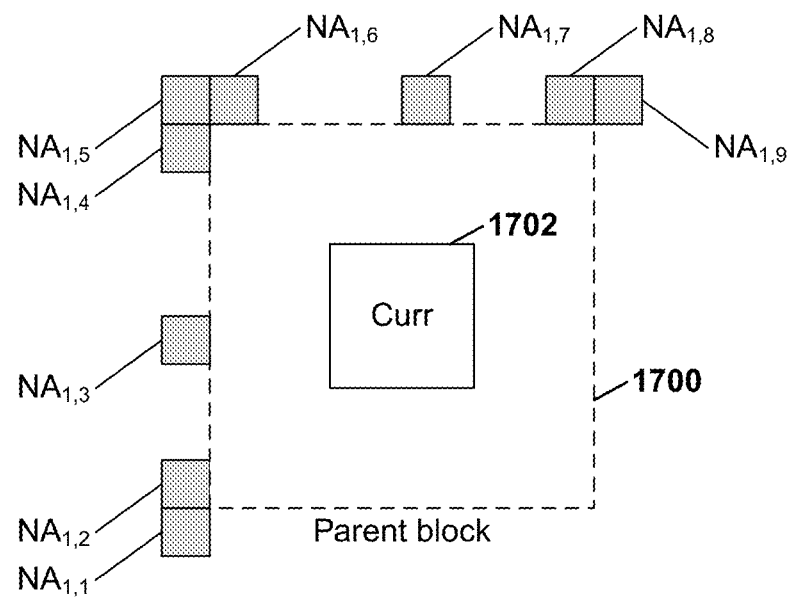
FIG. 17 is a block diagram illustrating an example of a selection of non-adjacent blocks based on a parent block.

FIG. 16 is block diagram illustrating an example of a selection of non-adjacent blocks, in accordance with a technique of this disclosure. FIG. 17 is a block diagram illustrating an example of a selection of non-adjacent blocks based on a parent block in accordance with a technique of this disclosure. Although potentially all non-adjacent blocks can be used for MVP derivation, it may be more desirable (in terms of implementation complexity) to select only a limited number of non-adjacent blocks (NA-blocks) for MVP derivation. Several ways to select N (where N is a non-negative integer) non-adjacent blocks for motion vector predictor (MVP) derivation are elaborated below. For instance, in one example of selecting N non-adjacent blocks for MVP derivation, fixed patterns of non-adjacent blocks are selected for NA-SMVP derivation. The fixed patterns are positioned relative to the position of current block. In one example as shown in FIG. 16, besides the adjacent blocks (e.g. $A_0$, $A_1$, $B_0$, $B_1$ and $B_2$) used to derive the regular SMVPs as used in HEVC for a current block 1600, a fixed pattern of 11 NA-blocks ($NA_{1,1}$, $NA_{1,2}$, $NA_{1,3}$, $NA_{1,4}$, $NA_{1,5}$, $NA_{1,6}$, $NA_{1,7}$, $NA_{1,8}$, $NA_{1,9}$, $NA_{1,10}$, $NA_{1,11}$) which surround current block 1600 are used to derive the NA-SMVPs. The horizontal distance $s_1$ and the vertical distance $t_1$ are two descriptors of this pattern.

In another example as shown in FIG. 17. In the example of FIG. 17, besides the adjacent blocks used to derive the regular SMVPs as used in HEVC, a video coder uses the adjacent block of a parent block 1700 which contains a current block 1702 as the NA-blocks for MVP derivation. In FIG. 17, the adjacent blocks ($NA_{1,1}$, $NA_{1,2}$, $NA_{1,3}$, $NA_{1,4}$, $NA_{1,5}$, $NA_{1,6}$, $NA_{1,7}$, $NA_{1,8}$, $NA_{1,9}$) of parent block 1700 are selected as the non-adjacent blocks for the blocks within parent block 1700, including current block 1702. The size of parent block 1700 can be pre-determined or signaled in the bitstreams or dependent on the size of current block 1702 or dependent on the coded mode (e.g., skip/merge/AMVP) of current block 1702. The NA-SMVPs of this disclosure can be derived from but not limited to the disclosed patterns of non-adjacent spatial blocks.

Examples of multi-level surrounding NA-blocks are given as follows. It is noted that for each level, the number of NA-blocks may be different.

Figure 20:
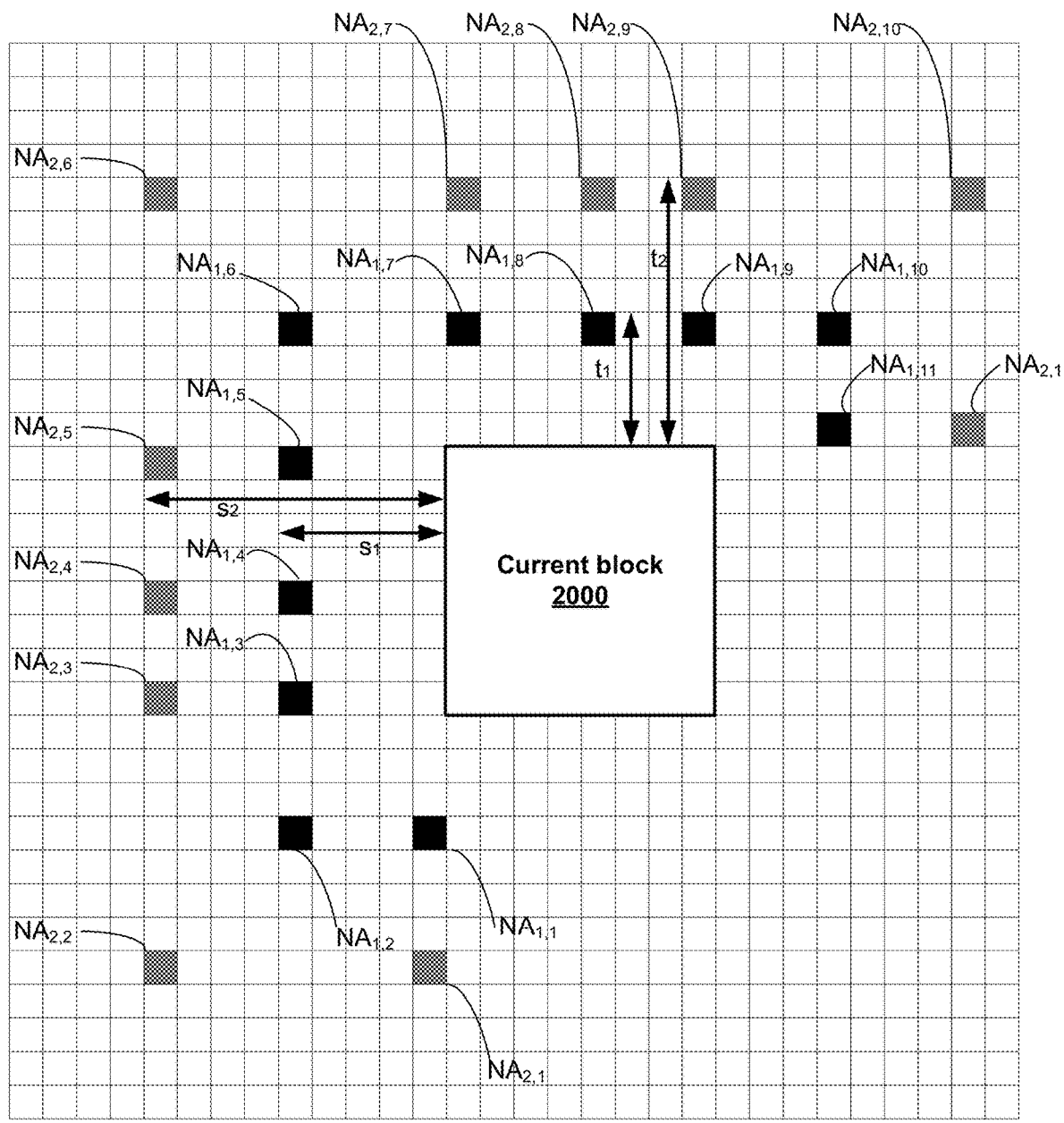
FIG. 20 is a block diagram illustrating an example of a selection of non-adjacent blocks, in accordance with a technique of this disclosure.
Figure 21:
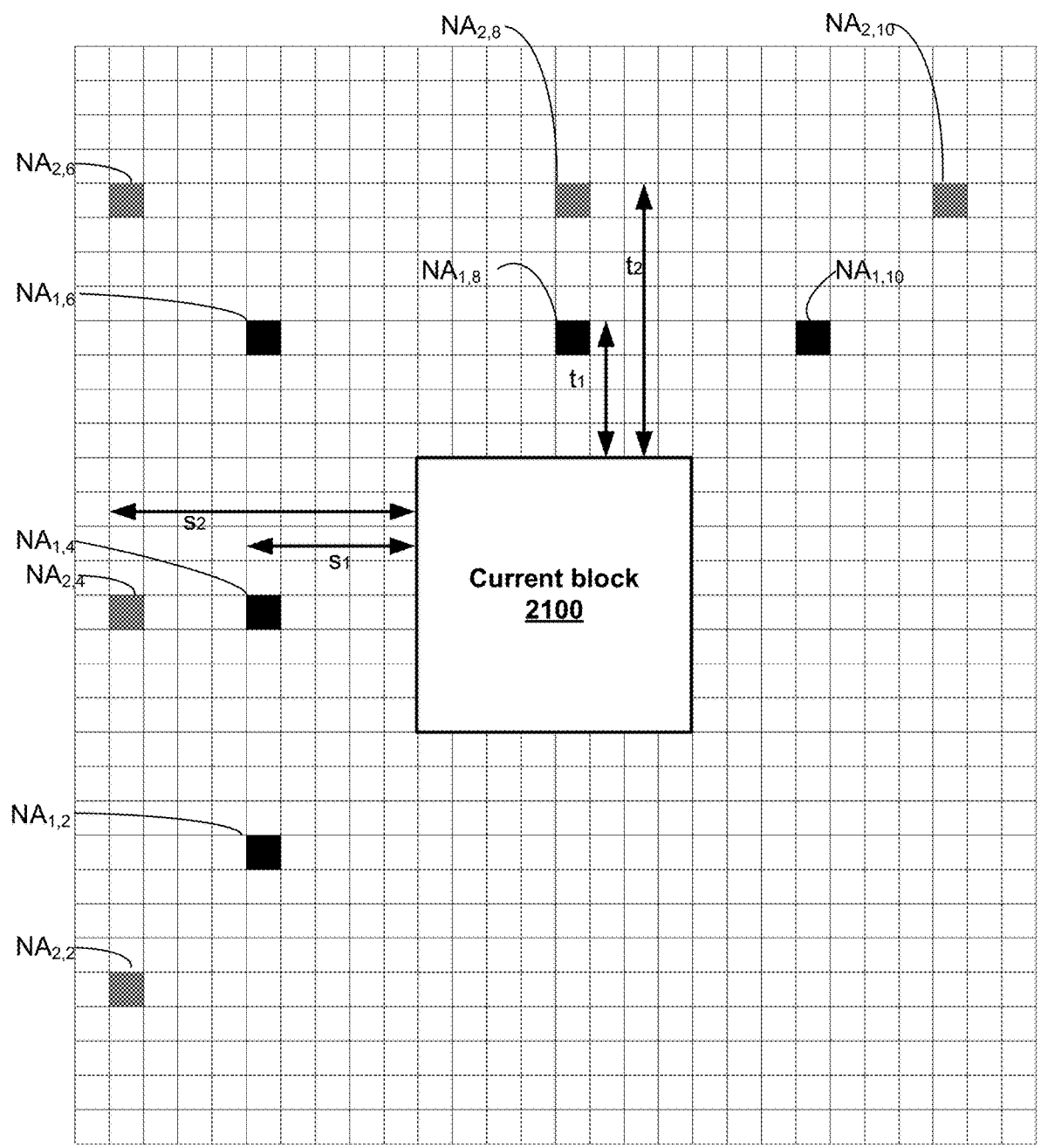
FIG. 21 is a block diagram illustrating an example of a selection of non-adjacent blocks, in accordance with a technique of this disclosure.
Figure 22:
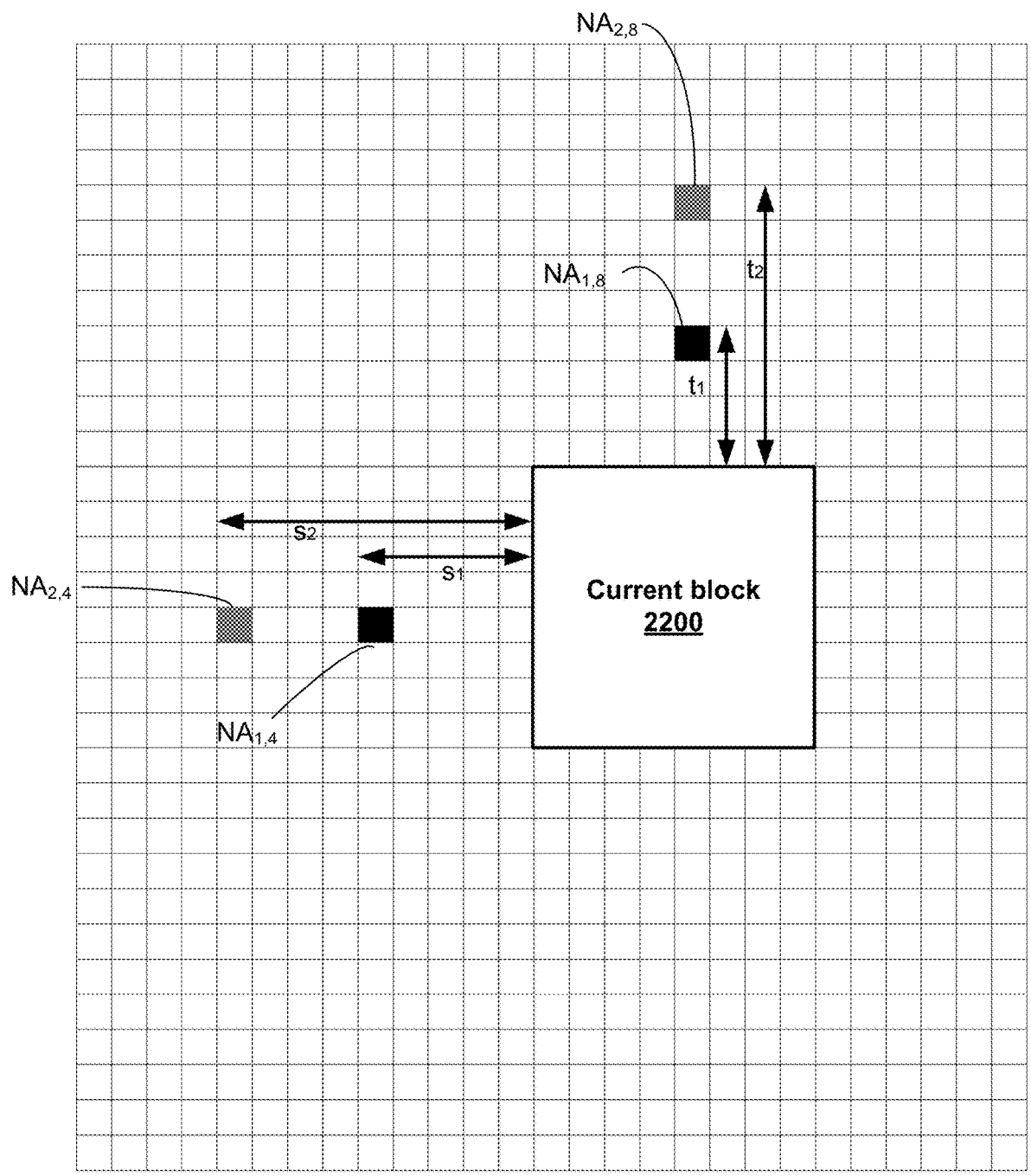
FIG. 22 is a block diagram illustrating an example of a selection of non-adjacent blocks, in accordance with a technique of this disclosure.

Pattern A1: Multi-level surrounding NA-blocks. Each level (level i) is described by the distance parameters ($s_i$ and $t_i$). FIG. 20, FIG. 21 and FIG. 22 shows examples of 2-level surrounding NA-blocks but the number of levels can be any non-negative integer. In the examples of FIG. 20, FIG. 21, and FIG. 22, the black squares correspond to NA-blocks in a first level and the gray squares correspond to NA-blocks in a second level. $t_1$ denotes a vertical distance from a current block 2000, 2100, or 2200 to the first level. $t_2$ denotes a vertical distance from current block 2000, 2100, or 2200 to the second level. $s_1$ denotes a horizontal distance from current block 2000, 2100, or 2200 to the first level. $s_2$ denotes a horizontal distance from current block 2000, 2100, or 2200 to the second level.

Figure 23:
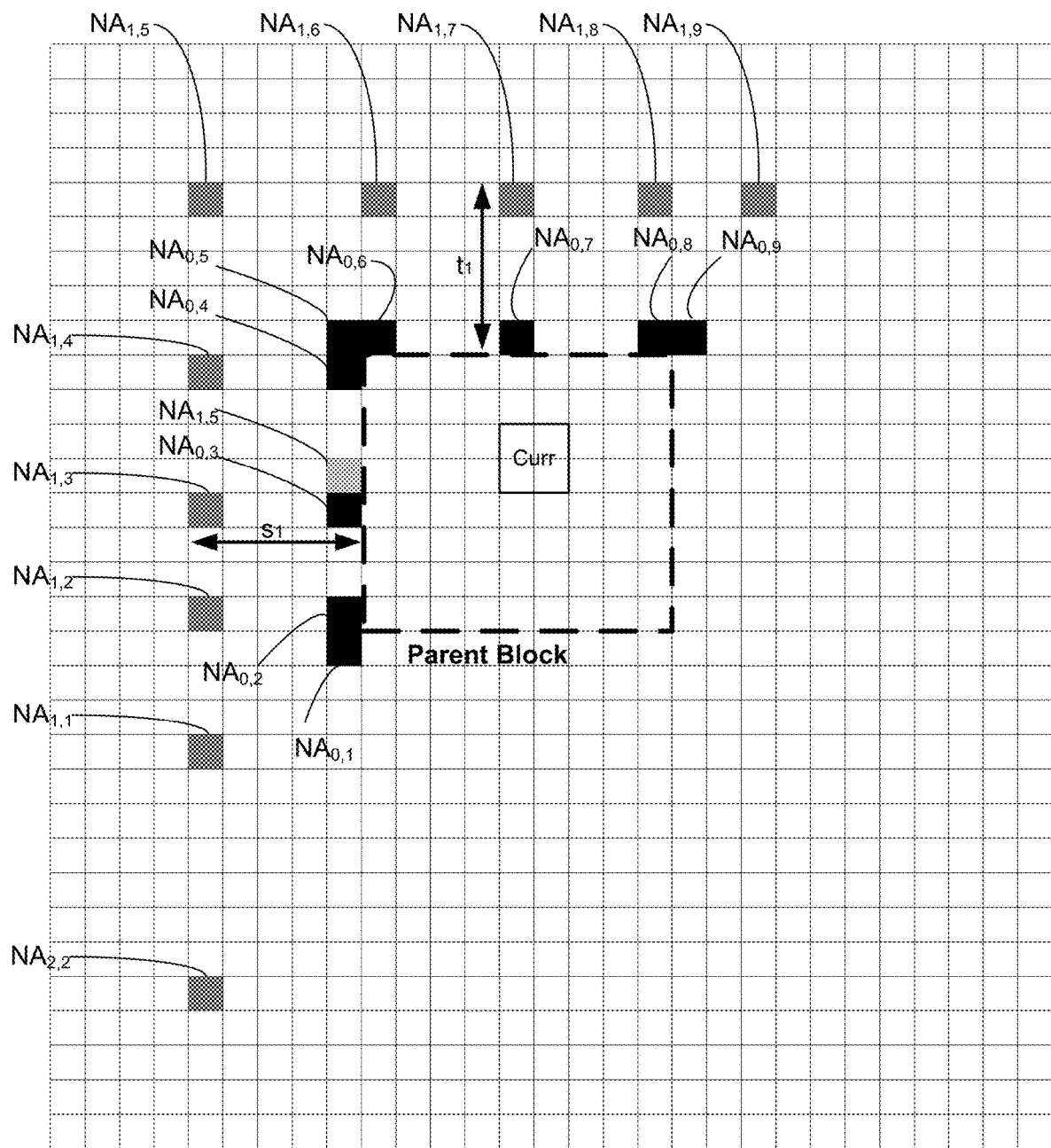
FIG. 23 is a block diagram illustrating an example of a selection of non-adjacent blocks based on a parent block, in accordance with a technique of this disclosure.

Pattern A2: Multi-level surrounding NA-blocks based on a parent block. Each level (level i) is described by the distance parameters ($s_i$ and $t_i$). The size of the parent block can be pre-determined or signaled in the bitstreams. FIG. 23 shows examples of 2-level surrounding NA-blocks but the number of levels can be any non-negative integer.

Furthermore, in some examples, a distance between the current block and the non-adjacent block is defined by a L1-norm (i.e., the L1 distance) or a L2-norm (i.e., the Euclidean distance).

In some examples, video encoder 20 and video decoder 30 select N non-adjacent blocks according to reverse coding order. For example, a video coder (e.g., video encoder 20 or video decoder 30) may select non-adjacent blocks by scanning blocks according to an order that is opposite an order in which the video coder coded the blocks.

In some examples, video encoder 20 and video decoder 30 construct a global MV candidate list by inserting all the reconstructed MVs into this list according to a pre-defined order. The global MV candidate list may contain the MVs derived from the adjacent blocks as well as the MVs derived from non-adjacent blocks. The MV predictor of the current block may be then derived using this global MV candidates. Thus, in such examples, a video coder (e.g., video encoder 20 or video decoder 30) may determine a global motion vector candidate list that comprises MVP candidates specifying a motion vector for each block that is in the current picture and that is encoded prior to the current block. Additionally, the video coder may determine the motion vector of the non-adjacent block from a MVP candidate in the global motion vector candidate list.

In some examples, because directly fetching non-adjacent MV candidates may increase the size of line buffer, a video coder applies an alternative way to store reconstructed MVs. For instance, the video coder may store reconstructed MVs in a history buffer in a first-in and first-out, fashion. To mimic the non-adjacent MV candidates, only those old MVs in the history buffer are taken as non-adjacent MV candidates. The old MVs in the history buffer may be defined as those close to the end of the history buffer. For example, if the size of the history buffer is N, a threshold T (such as T=N/4) may be signaled or set so that the T closest MVs to the exit in the history buffer are defined as old MVs.

In some examples, to reduce buffer size of a buffer used to store non-adjacent motion information (i.e., motion information of non-adjacent blocks), constraints are added to derive non-adjacent spatial motion vector predictors. If the distance between a non-adjacent block and the current block (or the current CTU) is larger than a threshold, the position of the non-adjacent block can be modified. In other words, rather than determining a MV candidate based on a NA-block at a first location (e.g., a location specified by a fixed pattern of NA-blocks), a video coder may determine a second position based on the first position when a distance from the first position to the current block is greater than a threshold. In some examples, rather than determining a MV candidate based on a NA-block at a first location (e.g., a location specified by a fixed pattern of NA-blocks), a video coder may determine the first position is not valid when a distance from the first position to the current block is greater than a threshold. The threshold can be different for horizontal distance and vertical distance. Thus, in some examples, prior to determining the motion vector of the non-adjacent block and based on a distance between the non-adjacent block and the current block being greater than a threshold distance, a video coder may modify a position of the non-adjacent block. In some examples, prior to determining the motion vector of a non-adjacent block and based on a distance between the non-adjacent block and a current coding tree block being greater than a threshold distance, the video coder may modify a position of the non-adjacent block. In such examples, the current coding tree block contains the current block.

One example of position modification can be rounding the first position to a coarse grid, i.e., reducing stored non-adjacent motions. Thus, in this example, a video coder may modify the position of the non-adjacent block at least in part by rounding a position of the non-adjacent block to a position on a first grid of blocks in the current picture coarser than a second grid of blocks in the current picture.

Another example of position modification can be clipping the first position to the threshold if the distance to the position is larger than the threshold. Clipping the position to the threshold means modifying the position to be at the threshold if the position is past the threshold. Thus, in this example, the video coder may modify the position of the non-adjacent block at least in part by clipping a position of the non-adjacent block to the distance threshold. Multiple position modification methods with different thresholds can be combined.

Figure 18B:
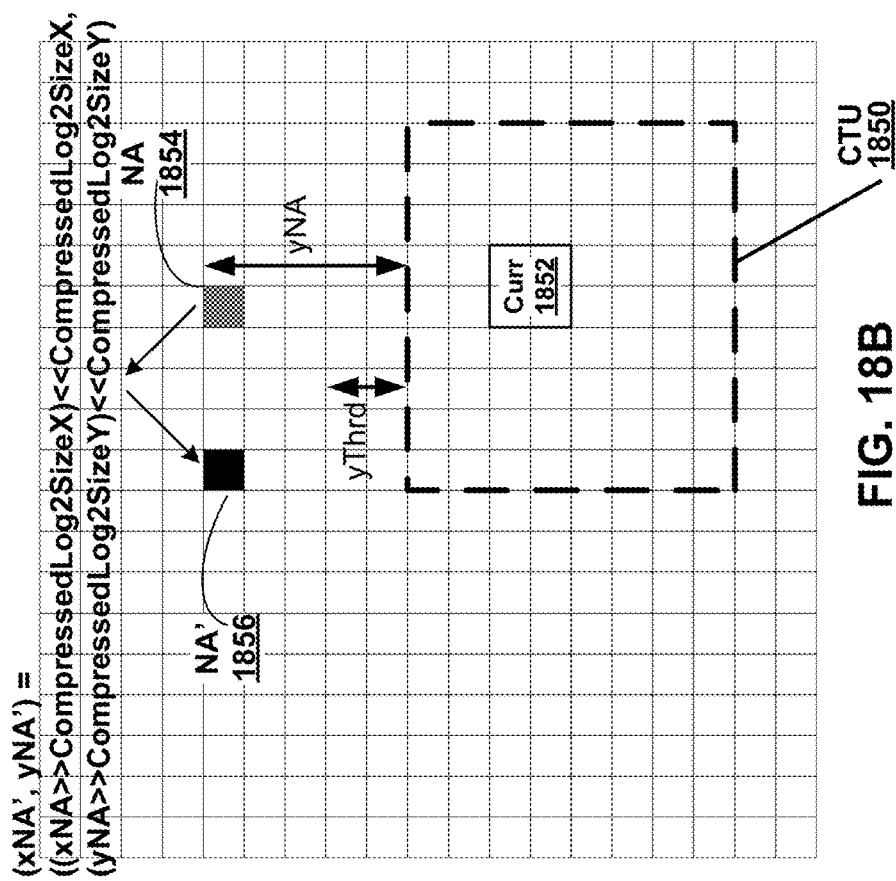
FIG. 18B is a block diagram illustrating an example of position modification of a non-adjacent block, in accordance with a technique of this disclosure.
Figure 18A:
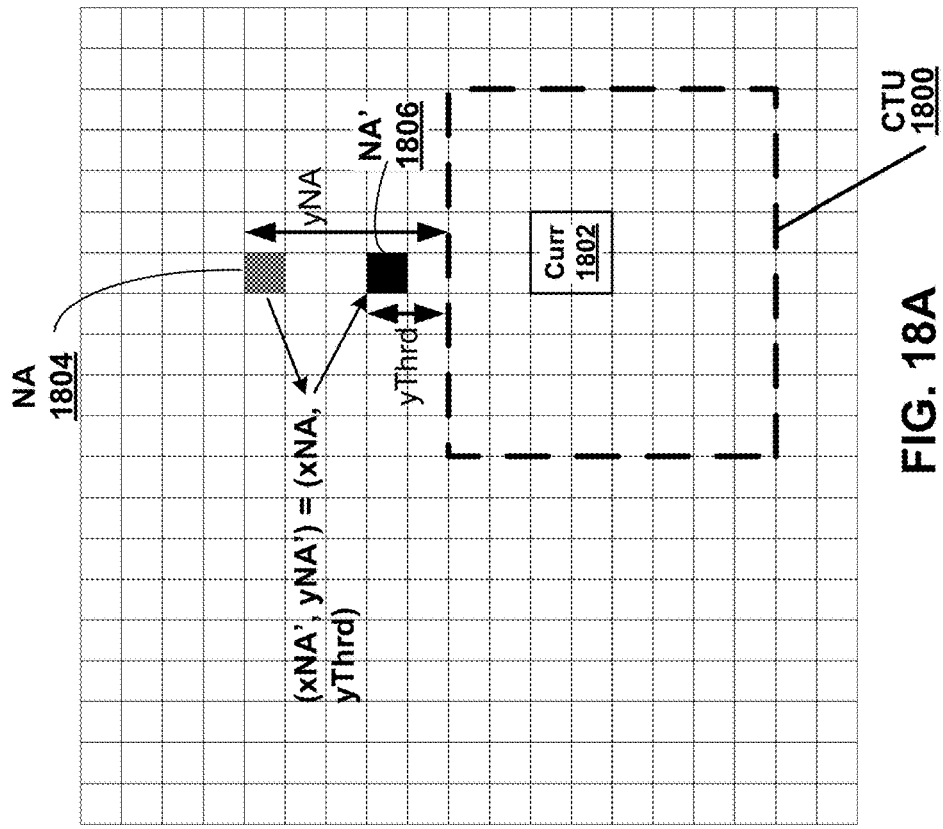
FIG. 18A is a block diagram illustrating an example of position modification of a non-adjacent block, in accordance with a technique of this disclosure.
Figure 19B:
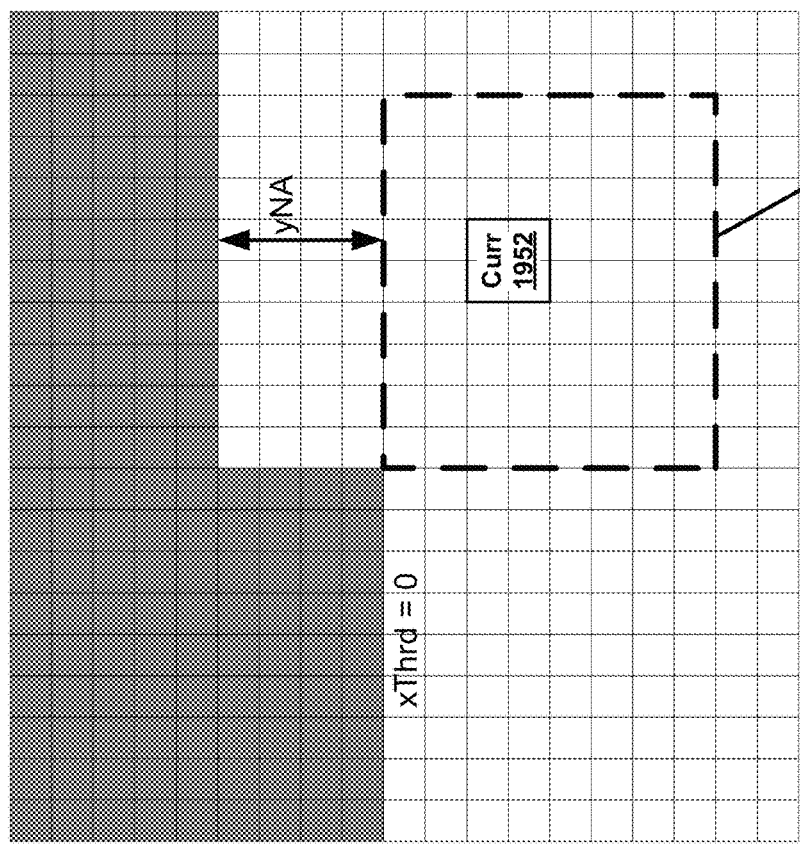
FIG. 19B is a block diagram illustrating an example of a threshold for modifying a non-adjacent block, in accordance with a technique of this disclosure.
Figure 19A:
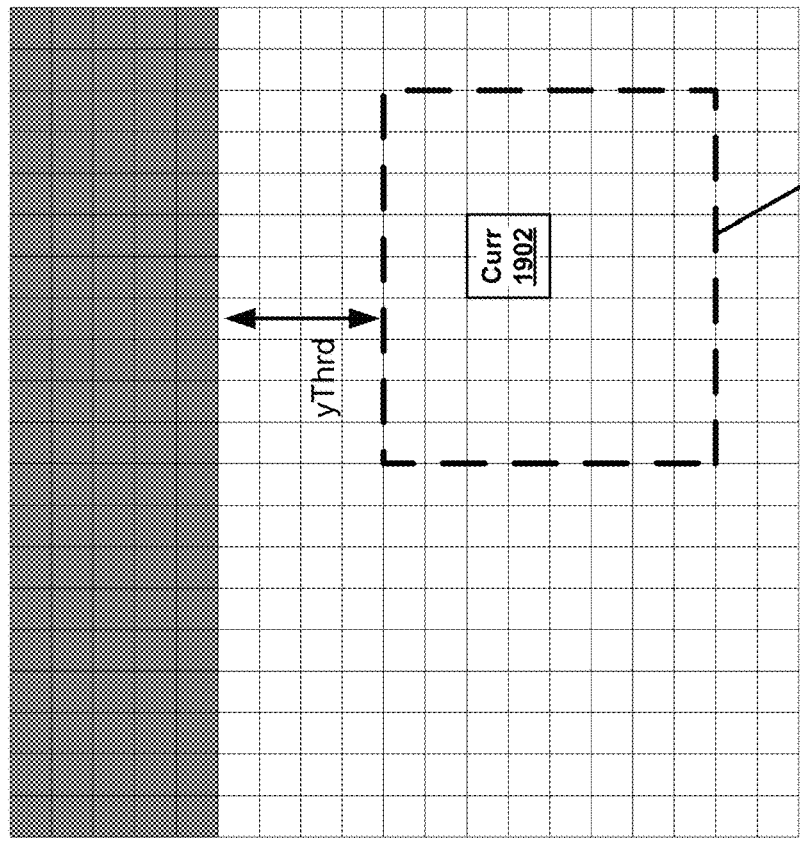
FIG. 19A is a block diagram illustrating an example of a threshold for modifying a non-adjacent block, in accordance with a technique of this disclosure.

FIG. 18A and FIG. 18B are block diagrams illustrating an example of position modification of a non-adjacent block in accordance with a technique of this disclosure. FIG. 19A and FIG. 19B are block diagrams illustrating examples of thresholds for modifying non-adjacent block in accordance with a technique of this disclosure. Several examples of modifying the positions are provided below. In these examples, assume the position of a non-adjacent block is (xNA, yNA), the modified position of the non-adjacent block is (xNA', yNA'), the position of top-left grid of a current CTU 1800, 1900 is (xCTU, yCTU), and the position of the current CU is (xCU, yCU). Examples of constraints can be:

1. If (yCTU−yNA)>(or >=) yThrd, yNA'=yThrd. If (xCTU−xNA)>(or >=) xThrd, xNA'=xThrd. yThrd can be smaller than xThrd. FIG. 18A shows an example with yThrd, where Thrd is an abbreviation for threshold. Thus, in FIG. 18A, a CTU 1800 contains a current CU (curr) 1802. If the difference between a vertical coordinate of a position NA 1804 of a non-adjacent block and a vertical coordinate of CTU 1800 is greater than the threshold (yThrd), the video coder clips the vertical coordinate of position NA 1804 to the threshold, resulting in the position NA' 1806.

2. If (yCTU−yNA)>(or >=) yThrd and (or) (xCTU−xNA)>(or >=) xThrd, abs(xNA', yNA')= ((xNA>>CompressedLog2SizeX) <<CompressedLog2SizeX, (yNA>>CompressedLog2SizeY) <<CompressedLog2SizeY). CompressedLog2SizeX and CompressedLog2SizeY are values for controlling position rounding. For example, if (xNA, yNA) is (36, 18) and (CompressedLog2SizeX, CompressedLog2SizeY) is (4,4), the rounded position, (xNA', yNA'), will be ((36>>4)<<4, (18>>4)<<4)=(32, 16). In other words, if a position of a non-adjacent block is far from the current block, the video coder may round the position to a coarser grid. Thus, the motion buffer can only store non-adjacent block motions on the coarser grid. FIG. 18B shows an example. Thus, in the example of FIG. 18B, a CTU 1850 contains a current CU (curr) 1852. If the difference between a vertical (y) coordinate of a position NA 1854 and a vertical coordinate of a position of CTU 1850 is greater than a vertical threshold (yThrd) and/or a different between a horizontal (x) coordinate of position NA 1854 is greater than a horizontal threshold (xThrd), the video coder may determine a horizontal coordinate of a modified position NA' 1856 to (xNA>>CompressedLog2SizeX) <<CompressedLog2SizeX and a vertical coordinate of the modified position NA' 1856 to (yNA>>CompressedLog2SizeY) <<CompressedLog2SizeY. In some examples, xThrd is negative infinity. Thus, in such examples (xCTU−xNA) is always larger than xThrd.

3. In some examples, the threshold of modifying a non-adjacent block is: if (yCTU−yNA)>yThrd, the non-adjacent block is modified. FIG. 19A shows an example, and shaded blocks are the non-adjacent block positions that should be modified. Particularly, in the example of FIG. 19A, a CTU 1900 includes a current CU (curr) 1902. If a vertical coordinate of a non-adjacent block differs from a vertical coordinate of CTU 1900 by more than the threshold (yThrd), the video coder may modify the position of the non-adjacent block.

4. The threshold of modifying a non-adjacent block can be a combination of more than one rule. An example can be that: (1) if (yCTU−yNA)>yThrd, the non-adjacent block should be modified. (2) if (yCTU−yNA)>0 and (xCTU−xNA)>0, the non-adjacent block should be modified. FIG. 19B shows the example of combination of the two rules, and shaded blocks are the non-adjacent block positions that should be modified. Particularly, in the example of FIG. 19B, a CTU 1950 includes a current CU (curr) 1952. If a vertical coordinate of a non-adjacent block differs from a vertical coordinate of CTU 1950 by more than a vertical threshold (yThrd), the video coder may modify the vertical coordinate of the non-adjacent block. Additionally, if the difference between a horizontal coordinate of the non-adjacent block and a horizontal coordinate of CTU 1950 is greater than 0 and the difference between a vertical coordinate of the non-adjacent block and the vertical coordinate of CTU 1950 is greater than 0, the video coder may modify the horizontal coordinate of the non-adjacent block.

In one example, only the non-adjacent blocks that are located at the same CTU row as the current block can be selected. In another example, only the non-adjacent blocks that are located at the same CTU as the current block can be selected.

After the video coder determines the N non-adjacent blocks are determined, the video coder may derive M (where M≤N) non-adjacent spatial motion vector predictors (NA-SMVP) from the N non-adjacent blocks (NA-blocks). There are different ways to utilize the non-adjacent SMVPs depending on the inter-prediction mechanism used in the video codec. For instance, when a competitive motion candidate mechanism (e.g., the merge/skip mode in HEVC or JEM) is used, one or more non-adjacent spatial MVPs (NA-SMVPs) are derived and inserted into a candidate list according to a pre-defined order. In one example as shown in FIG. 16, the 11 non-adjacent MVPs are inserted into the merging candidate list after the conventional spatial MVPs, temporal MVPs and before the synthetic combined candidates, synthetic zero candidates.

In some examples, a full motion pruning process can be applied to the NA-SMVPs and the other merging candidates; or a partial motion pruning can be applied to the NA-SMVPs and the other merging candidates. The full motion pruning process compares one candidate against all the previously derived candidates in the current candidate list to avoid inserting identical candidate to a certain extent. To reduce the complexity, the partial motion pruning process compares only limited numbers of candidates instead of comparing each potential candidate with all the other existing candidates. More insertion orders of non-adjacent blocks are given in Sequence 2 through Sequence 5, below. The NA-SMVPs of this disclosure can be inserted into the candidate list including but not limited to the disclosed insertion order.

---
Sequence 2
---
Insertion order for Merge mode:
1. Regular SMVPs (e.g. $A_1$, $B_1$, $B_0$, $A_0$, $B_2$) → TMVP (e.g. H or C) → NA-SMVPs→ Synthetic Candidates
2. Regular SMVPs (e.g. $A_1$, $B_1$, $B_0$, $A_0$, $B_2$) → Sub-block MV candidates (e.g. ATMVP, STMVP) → TMVP (e.g. H or C) → NA-SMVPs→ Synthetic Candidates
3. Regular SMVPs (e.g. $A_1$, $B_1$, $B_0$, $A_0$, $B_2$) → NA-SMVPs → TMVP (e.g. H or C) → Synthetic Candidates ---
Sequence 3
---
Insertion order for AMVP mode (for List0 or List1 MV prediction):
1. Left SMVPs (e.g. $A_0$, $A_1$)→ Scaled Left SMVPs (e.g. $A_0$, $A_1$) → Above SMVPs (e.g. $B_0$, $B_1$, $B_2$) → Scaled Above SMVPs (e.g. $B_0$, $B_1$, $B_2$) → NA-SMVPs→ Scaled NA-SMVPs → TMVP → Synthetic Candidates ---
Sequence 4
---
Insertion order for Affine Merge mode:
1. Regular SMVPs (e.g. $A_1$, $B_1$, $B_0$, $A_0$, $B_2$) → NA-SMVPs ---
Sequence 5
---
Insertion order for Affine AMVP mode:
1. Extrapolated affine MVP → Left SMVPs (e.g. $A_0$, $A_1$)→ Scaled Left SMVPs (e.g. $A_0$, $A_1$) → Above SMVPs (e.g. $B_0$, $B_1$, $B_2$) → Scaled Above SMVPs (e.g. $B_0$, $B_1$, $B_2$) → NA-SMVPs→ Scaled NA-SMVPs → TMVP →Synthetic Candidates A competitive spatial-temporal motion candidate scheme may include a system in which a motion predictor is selected from a set of available motion predictors. When a competitive spatial-temporal motion candidate scheme is used, such as the AMVP mode in HEVC or the JEM or other video codecs, non-adjacent MVP candidates are derived and inserted into the candidate list according to a pre-defined order. In one example, a video coder inserts the 11 non-adjacent MVP of FIG. 16 into the AMVP candidate list after the conventional spatial MVPs, temporal MVPs and before any synthetic zero candidates. The NA-SMVP derivation can follow the same derivation rules as HEVC or any other rules applied to the SMVP derived from adjacent blocks.

The order of NA-SMVP candidates can be determined either by a certain pre-defined rule or may be determined in an adaptive way. For example, the video coder may arrange M candidates from N non-adjacent blocks in the same order that the N NA-blocks are selected in accordance with any of the examples provided elsewhere in this disclosure. Alternatively, in one example, the video coder reorders the M candidates according to frequencies of those candidates (i.e., the number of occurrences of the candidates among all the MV candidates) and/or distances between a NA-block and the current block. Thus, in this example, the video coder may place more frequent candidates and/or candidates from NA-blocks closer to the current block ahead in an NA-SMVP candidate list (i.e., the candidate list which includes NA-SMVP candidates and possibly other candidates). In addition, the video coder may insert all the NA-SMVP candidates in a fixed position in the candidate list as described in Sequence 2 through Sequence 5, above, which are allowed to be re-ordered among only NA-SMVP candidates. In another example, the video coder may reorder all the candidates in the list (including NA-SMVP and other candidates) according to certain criteria such as the frequency of motion information (i.e., the number of occurrences of the motion vector among all the MV candidates) or any available motion statistics from the current picture and/or previously-coded pictures. The order of the NA-SMVPs in a candidate list can be different for certain coding modes, e.g. the merge and/or AMVP mode, and are not necessarily limited to the disclosed candidate orders. For instance, a video coder may insert NA-SMVP candidates into a merge candidate list according to a first order and may insert NA-SMVP candidates into an AMVP candidate list according to a second order different from the first order.

In some examples, the pruning process is adaptive to the block size. In one example, a threshold value can be used to define what needs to be pruned. For example, if the block size is large (i.e., larger than a predefined block size), then the video coder may increase the threshold value accordingly. Consider two candidates with motion vectors MV0 (added to the list earlier) and MV1, in one example, if the L1 or L2 norm of the distance between MV0 and MV1 is smaller than the threshold value, the video coder prunes the candidate of MV1. Video encoder 20 may signal the threshold value signaled through an SPS, a PPS, a slice header, or in another syntax structure.

In another example, the threshold value is adaptive based on the current block size. For instance, in this example, a first threshold value applies for blocks having sizes less than a predefined block size and a second, different threshold value applies for blocks having sizes greater than the predefined block size. In this example, when generating a candidate list for a block having a size less than the predefined block size, the video coder may prune a candidate from the list if an L1 or L2 norm of the distance between the motion vector of the candidate and a motion vector of another candidate in the list is less than the first threshold value. In this example, when generating a candidate list for a block having a size greater than the predefined block size, the video coder may prune a candidate from the list if an L1 or L2 norm of the distance between the motion vector of the candidate and a motion vector of another candidate in the list is less than the second threshold value.

In another example pruning process, the threshold value is adaptive based on a distance between a candidate's spatial position and a spatial position of the current block. The video coder may use a larger threshold value if the candidate is located farther away from the current block. For example, when generating a candidate list for the current block, a video coder may determine a first NA-SMVP based on a particular non-adjacent block. In this example, the video coder may prune the first NA-SMVP candidate from the list if an L1 or L2 norm of the distance between a motion vector of the first NA-SMVP candidate and a motion vector of a second candidate in the list is less than a particular threshold. In this example, the particular threshold may be dependent on a distance between the particular non-adjacent block and the current block.

In some examples, classification of motion vectors can be done using methods including but not limited to K-mean or support vector machine, and only the first $M_c$ candidates from each of the $N_c$ classes should be kept in the candidate list, where $M_c$ and the number of classes $N_c$ can be pre-defined or signaled in high-level syntax.

In schemes where only a single MVP is used, such as the affine merge mode in the JEM, a video coder (e.g., video encoder 20 or video decoder 30) may also include one or more non-adjacent SMVPs (NA-SMVP) in a candidate set along with the other MVPs. The final MVP is then selected as the first available MVP according to a pre-defined order. In one example, when a CU is applied in affine merge (AF_MERGE) mode, it gets the first block coded with affine mode from the valid neighbor reconstructed blocks based on the visiting order: A1→B1→B0→A0→B2→NA-blocks. Thus, in this example, if none of blocks A1, B1, B0, A0, or B2 are coded with affine mode, the video coder may determine that the MVP for the CU is a first one of the non-adjacent blocks that is coded in the affine mode.

As briefly discussed above, the motion derivation process in FRUC merge mode includes two steps. In particular, a CU-level motion search is first performed, followed by sub-CU level motion refinement. At the CU level, a video coder derives an initial motion vector for the whole CU based on bilateral matching or template matching. To derive the initial motion vector for the whole CU, the video coder may first generate a list of MV candidates (FRUC CU level MV candidates set) and the video coder selects the candidate which leads to the minimum matching cost as the starting point for further CU level refinement. Then, the video coder performs a local search based on bilateral matching or template matching around the starting point. The video coder then takes the MV that results in the minimum matching cost as the MV for the whole CU. Subsequently, the video coder may further refine the motion information at the sub-CU level with a FRUC sub-CU level MV candidates set which contains the derived CU motion vectors.

This disclosure proposes to add one or more NA-SMVPs into the FRUC CU level MV candidates set, FRUC sub-CU level MV candidates set or both. Thus, a video coder (e.g., video encoder 20 or video decoder 30) may determine a set of CU-level FRUC motion vector candidates. In accordance with a technique of this disclosure, the set of CU-level FRUC motion vector candidates may include one or more NA-SMVPs. Additionally, the video coder may select a CU-level FRUC motion vector candidate from the set of CU-level FRUC motion vector candidates. The video coder may then determine a CU-level motion vector at least in part by performing a local search starting from a selected CU-level FRUC motion vector candidate. The video coder may also refine the CU-level motion vector at a sub-CU level with a set of FRUC sub-CU level motion vector candidates. In this example, at least one of the set of CU-level FRUC motion vector candidates and the set of FRUC sub-CU level motion vector candidates may include a NA-SMVP that specifies a motion vector of a non-adjacent block. The NA-SMVP may be determined in accordance with any of the examples provided elsewhere in this disclosure.

The high-level syntax related to the non-adjacent MVPs can be pre-determined or explicitly signaled into the bit-streams. The high-level syntax includes, but is not limited to, the following control parameters:

1. The number of adjacent blocks N. In some examples, the number is adaptive according to the coding information such as block size. In some examples, the number N is dependent on the coded mode (e.g., Skip/merge/AMVP) or the maximum allowed number of candidates for the merge/AMVP/skip mode.
2. The distance s/t (signal multiple parameters s/t if they exist), where s is the horizontal displacement and t is the vertical displacement for the NA blocks as shown in FIGS. 20-23.
3. The size of the parent block for NA-blocks determination.
4. The enabling/disabling of the non-adjacent MVPs.
5. The number of levels for locating NA-blocks as discussed above with respect to FIGS. 20-22.

In HEVC, the merging candidate list size ranges from 1 to 5, while the AMVP candidate list size is fixed to 2. In the JEM, the merging candidate list size ranges from 1 to 7 while the AMVP candidate list size is fixed to 2. When NA-SMVPs are included in the MVP or merging candidates list, the maximum candidate list size may be increased accordingly. For example, the merging candidate list size may be increased to N (where N is a positive integer and N>7) when one or more NA-SMVPs are inserted into the merging candidate list size. In this example, the AMVP candidate list size may be increased to M (M is a positive integer and M>2) when one or more NA-SMVPs are inserted into the merging candidate list size.

This disclosure also proposes to use synthetic MV candidates in addition to those provided in HEVC. The utilization of the additional synthetic MV candidates can also follow the examples provided elsewhere in this disclosure with respect to use of non-adjacent MVPs. That is, synthetic MV candidates can be generated based on motion parameters of non-adjacent blocks, where the non-adjacent blocks are determined according to any of the examples provided above.

In some examples, a video coder (e.g., video encoder 20 or video decoder 30) generates synthetic uni-prediction candidates by splitting the available bi-prediction MV candidates into two separate uni-prediction candidates according to a pre-defined order, such as $A_1$, $B_1$, $B_0$, $A_0$, $B_2$ (see FIG. 2). The video coder may then insert the created synthetic uni-prediction candidates into the candidate list.

Furthermore, in some examples, when integer MVD (i.e., an MVD specified to a precision of one luma sample) or four luma samples MVD (i.e., an MVD specified to a precision of four luma samples) is enabled, a video coder may generate synthetic integer MV candidates (i.e., MV candidates having motion vectors with a precision of one luma sample) or four luma samples MV candidates (i.e., MV candidates having motion vectors with a precision of four luma samples) by rounding or truncating the available MV candidates into integer MV or four luma samples MV candidates. The video coder may then insert the generated synthetic integer MV candidates or 4 luma samples MV candidates into the candidate list.

This disclosure also proposes ways to include multiple TMVP candidates in a merge candidate list or an AMVP candidate list. In one example, following the HEVC design wherein one co-located picture is signaled, a video coder uses more temporal neighboring blocks to derive more TMVP candidates. For instance, in addition to just checking the H and C blocks (depicted in FIG. 2) in order and picking one of them, the video coder may check more blocks (e.g., the co-located blocks of spatial neighboring blocks of the current block). In one example, the spatial neighboring blocks checked by the video coder may include only adjacent blocks, e.g. $A_0$, $A_1$, $B_0$, $B_1$ and $B_2$ as shown in FIG. 16. Thus, in this example, the video coder considers up to five co-located blocks of the adjacent blocks (including or in addition to the H and C blocks). In another example, the video coder may also consider co-located blocks of NA-blocks (e.g., the 11 NA-blocks ($NA_{1,1}$, $NA_{1,2}$, $NA_{1,3}$, $NA_{1,4}$, $NA_{1,5}$, $NA_{1,6}$, $NA_{1,7}$, $NA_{1,8}$, $NA_{1,9}$, $NA_{1,10}$, $NA_{1,11}$) in FIG. 16).

In some examples, the video coder considers co-located blocks located at the opposite side of the current block. For example, for the NA-block $NA_{1,6}$ (located at (−4, −4) position) in FIG. 16, the video coder may select the corresponding NA-col-block (i.e., a block that is collocated with a non-adjacent block and that is a reference picture) as the block located at (W+3, H+3), where W and H are the width and height of the current block in basic units of block size of motion information (e.g., 4×4). This creates a set of NA-col-blocks which lie in the bottom and right positions of the current block. In some examples, the video coder adds this set of MV candidates (i.e., the MV candidates defined from NA-col-blocks) in an interleaving fashion to the NA-SMVP. Alternatively, in some examples, the video coder may insert this set of MV candidates as the set of TMVP candidates as in the existing AMVP or merge derivation processes described elsewhere in this disclosure.

In some examples, the video coder may select more than one co-located picture. In other words, the video coder may select more than one reference picture from which to derive TMVP candidates. In such examples, the selected pictures may be defined as all the reference pictures included in the reference picture lists or the selected pictures may be signaled. In one example, for each selected reference picture, the video coder may check the H and C blocks within the selected reference picture in the same order as used in HEVC (i.e., bottom-right, then center). Alternatively, in one example, for each selected picture, the video coder checks more blocks (e.g., the co-located blocks of spatially adjacent and/or NA-blocks of the current block).

Furthermore, when the video coder derives multiple TMVP candidates, the video coder may apply a pruning process to remove identical ones among them. Alternatively, in some examples, the video coder may apply a limited pruning process, which means one of the TMVP candidates may be only compared to a certain number of candidates instead of all of others. In one example, furthermore, the video coder may further apply a pruning process between one TMVP candidate and other candidates (such as spatial merging candidates). The proposed techniques for using additional TMVPs may be applied to certain coding modes, such as the merge and/or AMVP mode.

As described in G. J. Sullivan, J.-R. Ohm, W.-J. Han, and T. Wiegand, "Overview of the High Efficiency Video Coding (HEVC) Standard," IEEE Transactions on Circuits and Systems for Video Technology, vol. 22, no. 12, pp. 1649-1668, December 2012, due to the increased number of intra prediction directions as compared to H.264/MPEG-4 AVC, HEVC considers three most probable modes (MPMs) when coding the luma intra prediction mode predictively, rather than the one most probable mode considered in H.264/MPEG-4 AVC. The MPM is derived from the intra modes of spatially adjacent blocks. In the case that the current luma prediction mode is one of three MPMs, only the MPM index is transmitted to the decoder. Otherwise, the index of the current luma prediction mode excluding the three MPMs is transmitted to the decoder by using a 5-bit fixed length code. The JEM also follows the same intra mode prediction schemes. However, the JEM may include more than three MPMs.

This disclosure proposes techniques to use the intra modes of non-adjacent blocks to derive one or more MPMs to achieve better prediction efficiency. The techniques described in previous sections can be applied to MPM derivations. Examples of deriving MPMs from non-adjacent blocks are provided with respect to FIG. 35 and FIG. 36, below.

Figure 24:
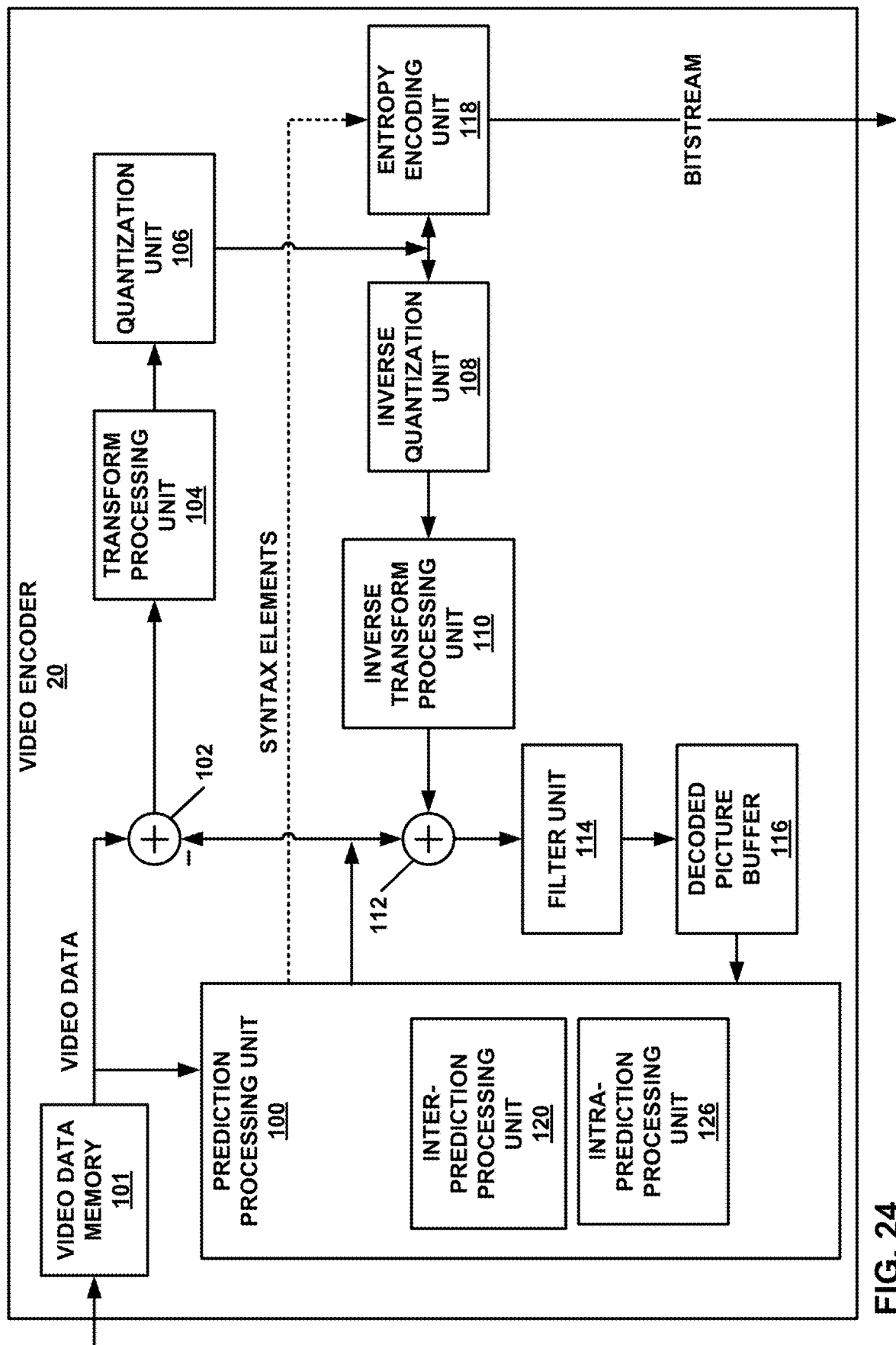
FIG. 24 is a block diagram illustrating an example video encoder that may implement one or more techniques described in this disclosure.

FIG. 24 is a block diagram illustrating an example video encoder 20 that may implement the techniques of this disclosure. FIG. 24 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 24 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 24 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 24, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Inter-prediction processing unit 120 may perform particular techniques of this disclosure. For example, inter-prediction processing unit 120 may determine a motion vector of a non-adjacent block of a current picture of the video data, the non-adjacent block being non-adjacent to a current block of the current picture. Additionally, inter-prediction processing unit 120 may determine, based on the motion vector of the non-adjacent block, an MVP for the current block. Additionally, inter-prediction processing unit 120 may determine a motion vector of the current block, wherein the motion vector is equal to a motion vector of the MVP for the current block or is equal to the motion vector of the MVP for the current block plus a MVD signaled in a bitstream.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks. Intra-prediction processing unit 126 may perform the techniques of this disclosure related to the MPMs.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may partition the residual blocks of a CU into transform blocks of TUs of the CU. For instance, transform processing unit 104 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

Figure 25:
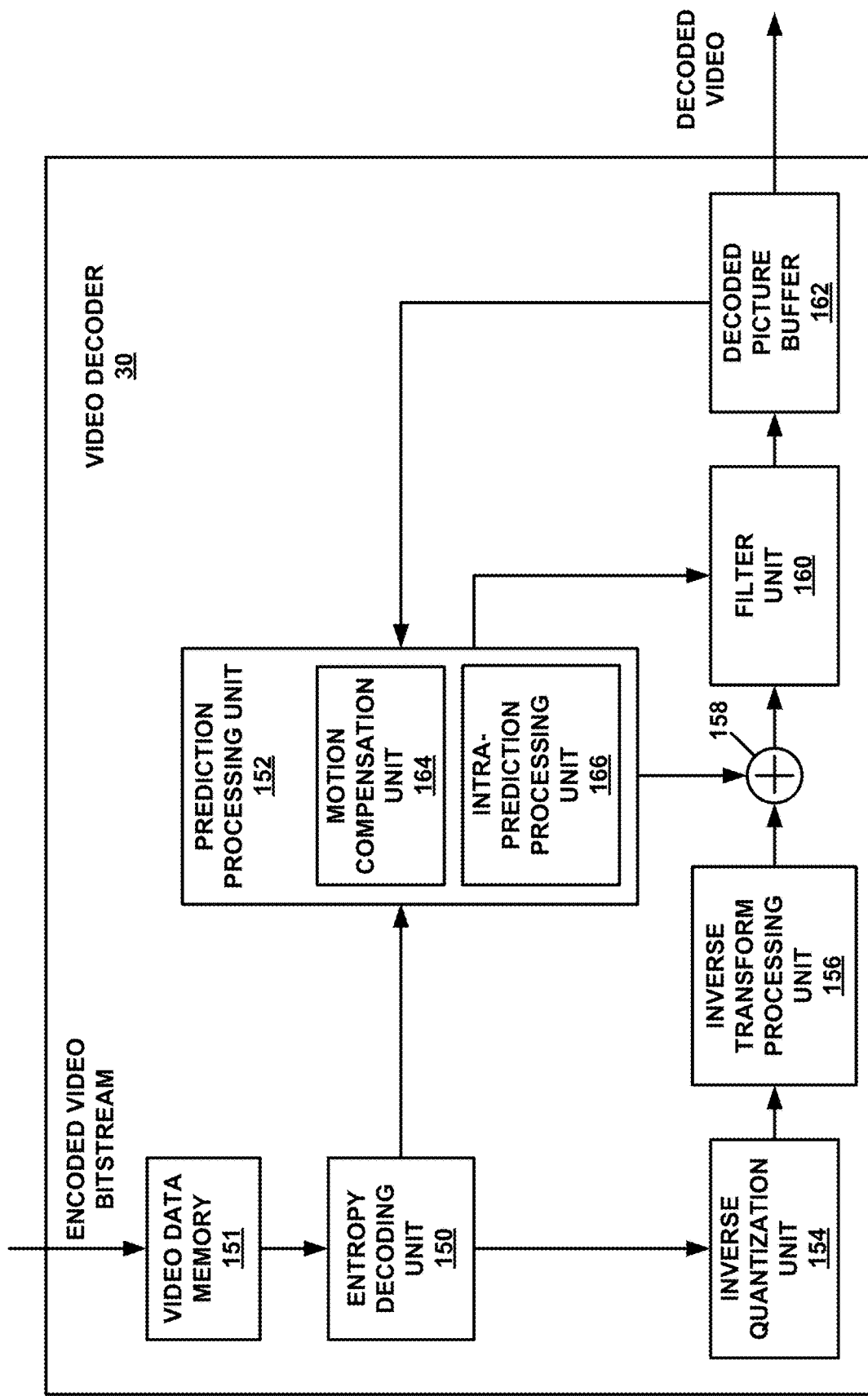
FIG. 25 is a block diagram illustrating an example video decoder that may implement one or more techniques described in this disclosure.

FIG. 25 is a block diagram illustrating an example video decoder 30 that is configured to implement the techniques of this disclosure. FIG. 25 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 25 may be formed as hardware circuit blocks that are interconnected with a circuit bus. These hardware circuit blocks may be separate circuit blocks or two or more of the units may be combined into a common hardware circuit block. The hardware circuit blocks may be formed as a combination of electronic components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 25 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 25, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream. Intra-prediction processing unit 166 may perform the techniques of this disclosure related to the MPMs.

If a PU is encoded using inter prediction, entropy decoding unit 150 and/or motion compensation unit 164 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

In accordance with a technique of this disclosure, motion compensation unit 164 may determine a motion vector of a non-adjacent block of a current picture of the video data, the non-adjacent block being non-adjacent to a current block of the current picture. Additionally, motion compensation unit 164 may determine, based on the motion vector of the non-adjacent block, a motion MVP for the current block. Motion compensation unit 164 may also determine, based on the MVP for the current block, a motion vector of the current block.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

Figure 26:
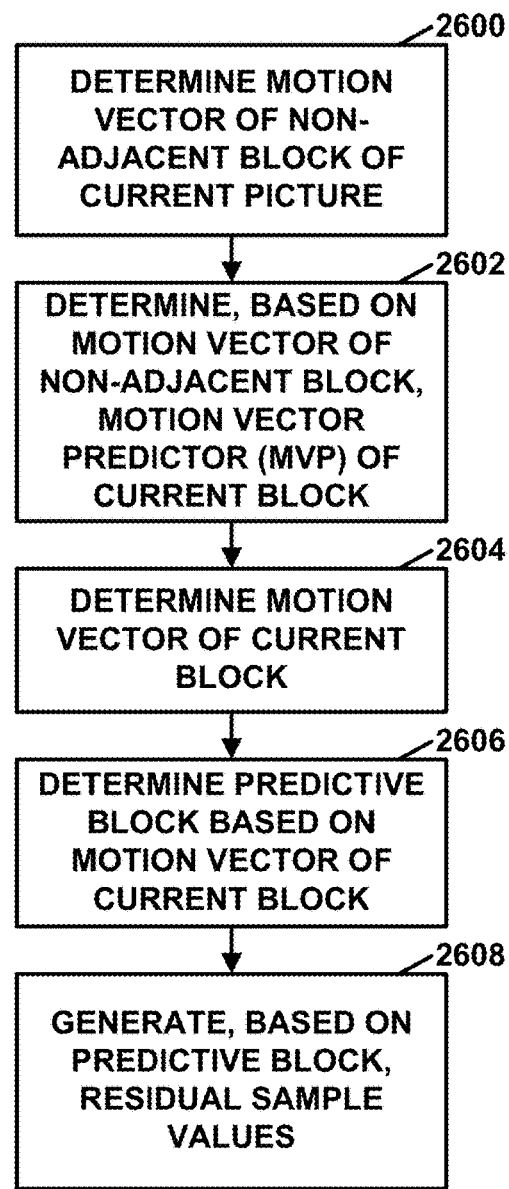
FIG. 26 is a flowchart illustrating an example operation of a video encoder to encode video data, in accordance with one or more techniques of this disclosure.

FIG. 26 is a flowchart illustrating an example operation of a video encoder to encode video data, in accordance with one or more techniques of this disclosure. In the example of FIG. 26, video encoder 20 may determine a motion vector of a non-adjacent block of a current picture of the video data (2600). The non-adjacent block is non-adjacent to a current block of the current picture.

Furthermore, video encoder 20 may determine, based on the motion vector of the non-adjacent block, an MVP for the current block (2602). In some examples, the MVP for the current block is in affine mode. In other words, motion vectors are specified for control points in the MVP. In some examples, the non-adjacent block is a block in a template that defines a fixed pattern of non-adjacent blocks relative to a position of the current block.

In one example, as part of determining the MVP for the current block, video encoder 20 may generate, based in part on the motion vector of the non-adjacent block, a list of MVP candidates. In this example, the list of MVP candidates includes an MVP candidate that specifies the motion vector of the non-adjacent block. Furthermore, in this example, video encoder 20 may determine, from among the MVP candidates in the list of MVP candidates, the MVP for the current block. For instance, video encoder 20 may use a RD cost analysis to determine the MVP for the current block.

In some examples, video encoder 20 orders a plurality of NA-SMVP candidates in the list of MVP candidates. In such examples, for each respective NA-SMVP candidate of the plurality of NA-SMVP candidates, the respective NA-SMVP candidate corresponds to a respective non-adjacent block of a plurality of non-adjacent blocks and the respective NA-SMVP specifies a motion vector of the respective non-adjacent block. The plurality of non-adjacent blocks includes the first non-adjacent block. Furthermore, in this example, video encoder 20 may order the plurality of NA-SMVP candidates in the list according to distance of corresponding non-adjacent blocks from the current block. The distance may be in the L1 or L2 sense.

In some examples, video encoder 20 determines a first plurality of NA-SMVP candidates. For each respective NA-SMVP candidate of the first plurality of NA-SMVP candidates, the respective NA-SMVP candidate corresponds to a respective non-adjacent block of a plurality of non-adjacent blocks. The respective NA-SMVP specifies a motion vector of the respective non-adjacent block. The first plurality of non-adjacent blocks includes the first non-adjacent block. In this example, video encoder 20 may include a second plurality of NA-SMVP candidates in the list, the second plurality of NA-SMVP candidates comprises non-duplicative NA-SMVP candidates in the first plurality of NA-SMVP candidates. In this way, video encoder 20 may perform a pruning process that removes duplicate NA-SMVP candidates from the list. The second plurality of NA-SMVP candidates may be ordered in the list according to a frequency with which motion vectors specified by the NA-SMVP candidates in the second plurality of NA-SMVP candidates are specified by NA-SMVP candidates in the first plurality of NA-SMVP candidates.

In some examples, the list of MVP candidates is a global motion vector candidate list. The global motion vector candidate list comprises MVP candidates specifying a motion vector for each block that is in the current picture and that is encoded prior to the current block. In such examples, the video coder may determine the motion vector of the non-adjacent block from a MVP candidate in the global motion vector candidate list.

Furthermore, in some examples, video encoder 20 stores a plurality of non-adjacent MVP candidates in a FIFO buffer. The plurality of non-adjacent MVP candidates includes a non-adjacent MVP candidate specifying the motion vector of the non-adjacent block. In such examples, video encoder 20 updates the FIFO buffer to remove an earliest-added non-adjacent MVP candidate from the FIFO buffer and adds an MVP candidate to the FIFO buffer.

In some examples, video encoder 20 applies a pruning process to the list. The pruning process is adaptive to a block size of the current block. For example, a full motion pruning process or a partial motion pruning process may be applied, as described elsewhere in this disclosure.

Video encoder 20 may also determine a motion vector of the current block (2604). In some examples, such as where merge mode is used, the motion vector of the current block is equal to a motion vector of the MVP. In some examples, such as when AMVP is used, the motion vector of the current block is equal to the motion vector of the MVP plus an MVD that is signaled in a bitstream.

Additionally, video encoder 20 may determine a predictive block based on the motion vector of the current block (2606). Video encoder 20 may generate, based on the predictive block, residual sample values (2608). Video encoder 20 may determine the predictive block and generate the residual sample values in accordance with any of the examples provided elsewhere in this disclosure.

Figure 27:
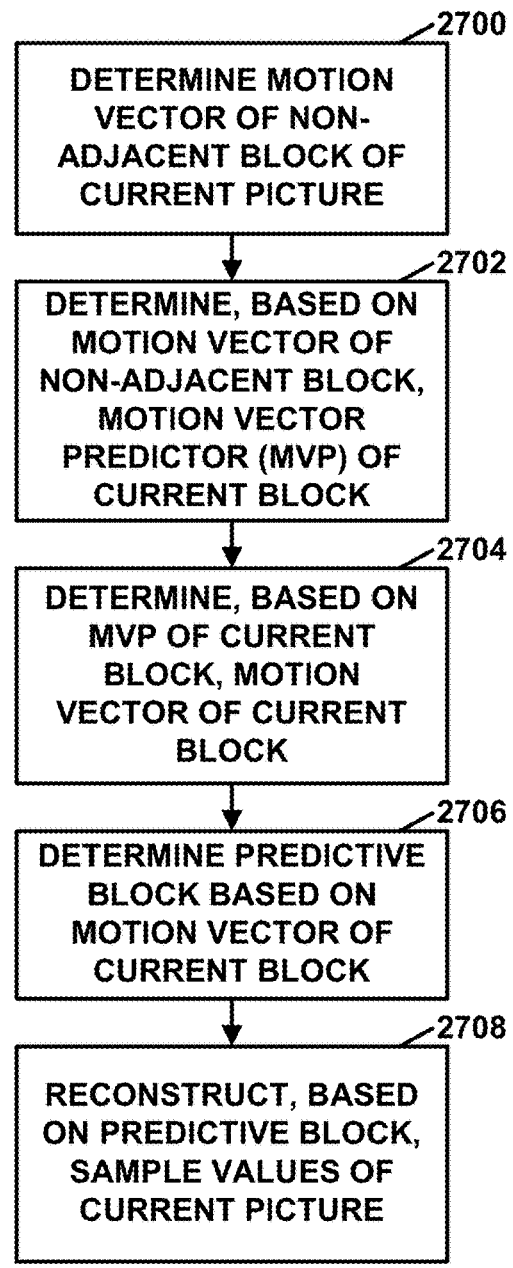
FIG. 27 is a flowchart illustrating an example operation of a video decoder for decoding video data in accordance with one or more techniques of this disclosure.

FIG. 27 is a flowchart illustrating an example operation of video decoder 30 for decoding video data in accordance with one or more techniques of this disclosure. In the example of FIG. 27, video decoder 30 may determine a motion vector of a non-adjacent block of a current picture of the video data (2700). The non-adjacent block is non-adjacent to a current block of the current picture. In some examples, the non-adjacent block is a block in a template that defines a fixed pattern of blocks relative to a position of the current block.

In some examples, the list of MVP candidates is a global motion vector candidate list. The global motion vector candidate list comprises MVP candidates specifying a motion vector for each block that is in the current picture and that is encoded prior to the current block. In such examples, the video coder may determine the motion vector of the non-adjacent block from a MVP candidate in the global motion vector candidate list.

Furthermore, in some examples, video decoder 30 stores a plurality of non-adjacent MVP candidates in a FIFO buffer. The plurality of non-adjacent MVP candidates includes a non-adjacent MVP candidate specifying the motion vector of the non-adjacent block. In such examples, video encoder 20 updates the FIFO buffer to remove an earliest-added non-adjacent MVP candidate from the FIFO buffer and adds an MVP candidate to the FIFO buffer.

Furthermore, video decoder 30 may determine, based on the motion vector of the non-adjacent block, an MVP for the current block (2702). In some examples, the MVP for the current block may be in affine mode, a non-affine mode, or another mode of motion compensated prediction. In one example, as part of determining the MVP for the current block, video decoder 30 may generate, based in part on the motion vector of the non-adjacent block, a list of MVP candidates. In this example, the list of MVP candidates includes an MVP candidate that specifies the motion vector of the non-adjacent block. Furthermore, in this example, video decoder 30 may determine, from among the MVP candidates in the list of MVP candidates, the MVP for the current block. For instance, video decoder 30 may use a rate-distortion analysis to identify a best MVP in the list of MVP candidates.

In some examples, the non-adjacent block is a first non-adjacent block and video decoder 30 orders a plurality of NA-SMVP candidates in the list. In other words, video decoder 30 inserts the plurality of NA-SMVP candidates into the list according to a particular order. In such examples, for each respective NA-SMVP candidate of the plurality of NA-SMVP candidates, the respective NA-SMVP candidate corresponds to a respective non-adjacent block of a plurality of non-adjacent blocks. The respective NA-SMVP specifies a motion vector of the respective non-adjacent block. In some examples, video decoder 30 orders the plurality of NA-SMVP candidates in the list according to distance (e.g., in terms of L1 or L2) of the corresponding non-adjacent blocks from the current block. In some examples, video decoder 30 orders the plurality of NA-SMVP candidates in accordance with any of the examples provided elsewhere in this disclosure.

In some examples, the non-adjacent block is a first non-adjacent block and video decoder 30 further determines a first plurality of NA-SMVP candidates. For instance, in such examples, for each respective NA-SMVP candidate of the first plurality of NA-SMVP candidates, the respective NA-SMVP candidate corresponds to a respective non-adjacent block of a plurality of non-adjacent blocks. The respective NA-SMVP specifies a motion vector of the respective non-adjacent block. The first plurality of non-adjacent blocks includes the first non-adjacent block. Furthermore, in such examples, video decoder 30 may order a second plurality of NA-SMVP candidates in the list. In other words, video decoder 30 may include the second plurality of NA-SMVP candidates in the list according to a particular order. The second plurality of NA-SMVP candidates comprises non-duplicative NA-SMVP candidates in the first plurality of NA-SMVP candidates. In some examples, the second plurality of NA-SMVP candidates are ordered in the list according to a frequency with which motion vectors specified by the NA-SMVP candidate in the second plurality of NA-SMVP candidates are specified by NA-SMVP candidates in the first plurality of NA-SMVP candidates.

In some examples, video decoder 30 may apply a pruning process to the list. In some such examples, the pruning process is adaptive to a block size of the current block. In some examples, video decoder 30 applies a full motion pruning process to the NA-SMVPs and the other merging candidates, as described elsewhere in this disclosure. In some examples, video decoder 30 applies only a partial motion pruning process to the NA-SMVPs and the other merging candidates, as described elsewhere in this disclosure.

Additionally, video decoder 30 may determine, based on the MVP for the current block, a motion vector of the current block (2704). In some examples, if the list of MVP candidates is a merge candidate list, video decoder 30 may determine the MVP for the current block such that the MVP for the current block specifies a motion vector of an MVP candidate in the list of MVP candidates. In some examples, if the list of MVP candidates is an AMVP candidate list, video decoder 30 may determine the MVP for the current block such that a motion vector of the MVP for the current block is equal to a motion vector of an MVP candidate in the list of MVP candidates plus an MVD.

Video decoder 30 may also determine a predictive block based on the motion vector of the current block (2706). For instance, video decoder 30 may determine the predictive block based on samples of a reference picture at a location indicated by the motion vector, as described in detail elsewhere in this disclosure. Video decoder 30 may then reconstruct, based on the predictive block, sample values of the current picture (2708). For instance, video decoder 30 may reconstruct sample values of the current picture by adding samples values in the predictive block to residual sample values.

Figure 28:
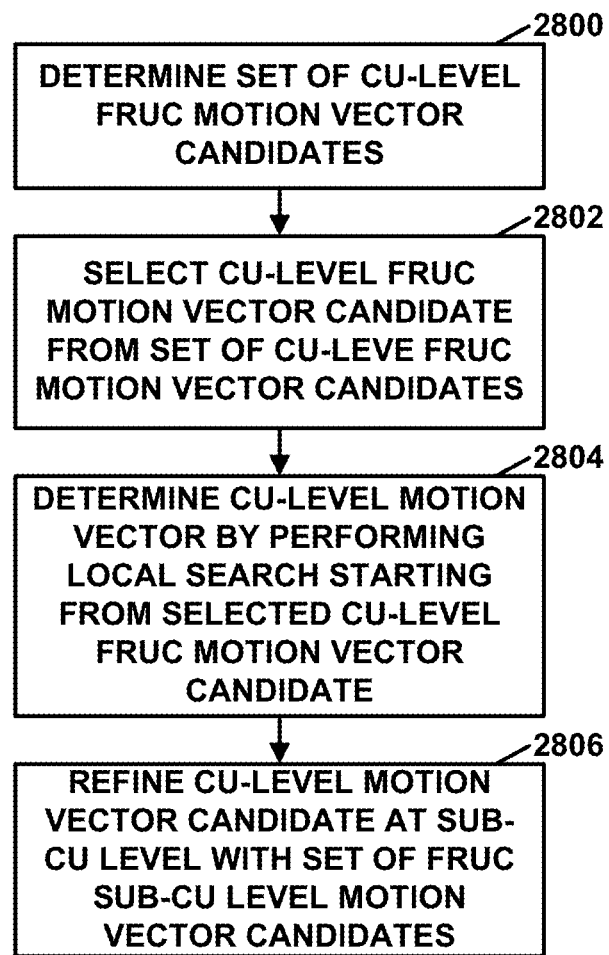
FIG. 28 is a flowchart illustrating an example operation for determining a NA-SMVP using Frame Rate Up-Conversion (FRUC) motion vector candidates, in accordance with a technique of this disclosure.

FIG. 28 is a flowchart illustrating an example operation for determining a NA-SMVP using FRUC motion vector candidates, in accordance with a technique of this disclosure. In the example of FIG. 28, a video coder (e.g., video encoder 20 or video decoder 30) may determine a set of CU-level frame-rate up conversion (FRUC) motion vector candidates (2800). Additionally, the video coder may select a CU-level FRUC motion vector candidate from the set of CU-level FRUC motion vector candidates (2802). The video coder may determine a CU-level motion vector at least in part by performing a local search starting from a selected CU-level FRUC motion vector candidate (2804). Furthermore, the video coder may refine the CU-level motion vector at a sub-CU level with a set of FRUC sub-CU level motion vector candidates (2806). In accordance with a technique of this disclosure, at least one of the set of CU-level FRUC motion vector candidates and the set of FRUC sub-CU level motion vector candidates includes a NA-SMVP that specifies the motion vector of the non-adjacent block of FIG. 26 and FIG. 27. The FRUC process may otherwise be consistent with the examples provided elsewhere in this disclosure.

Figure 29:
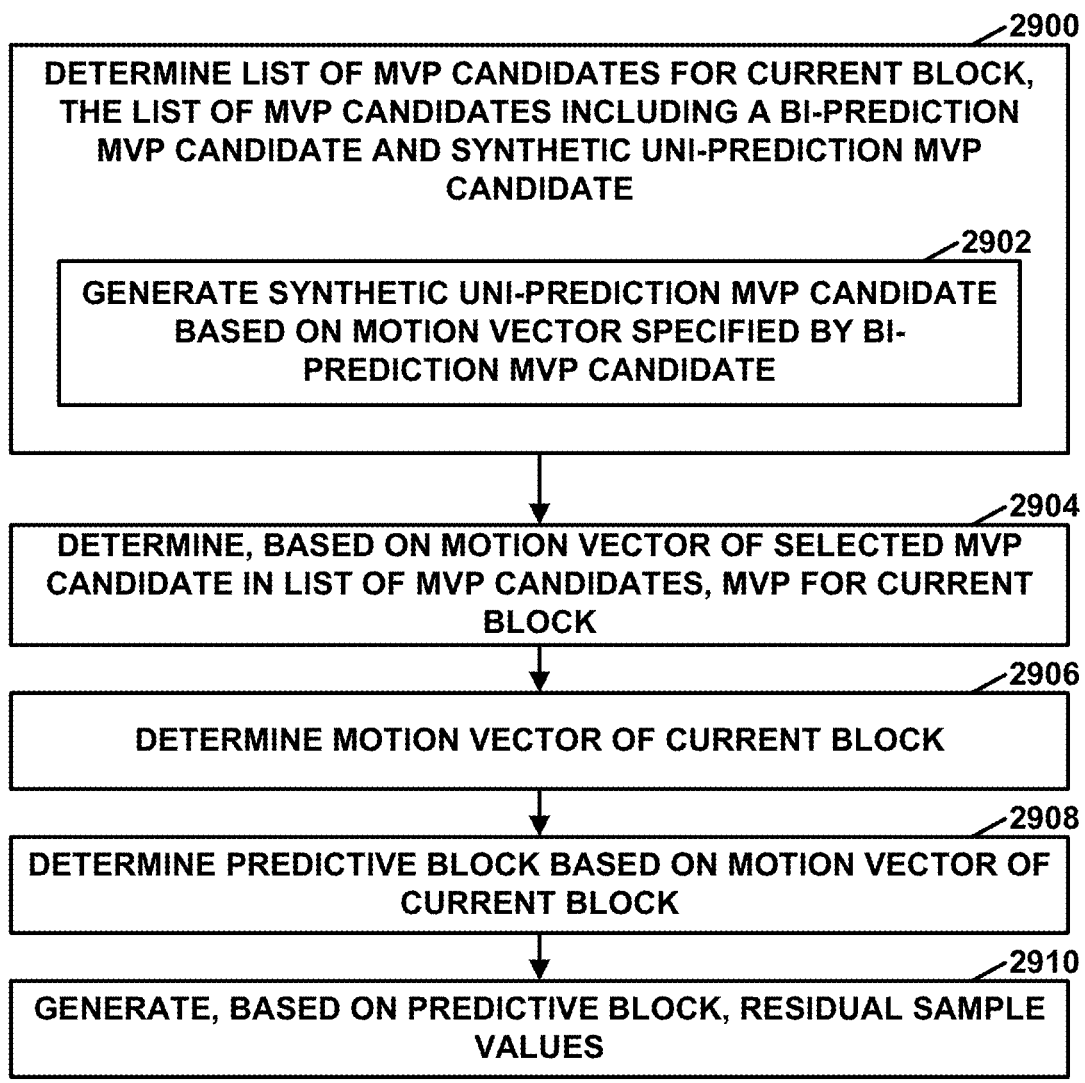
FIG. 29 is a flowchart illustrating an example operation of a video encoder that includes synthetic candidates in a list of MVP candidates for a current block, in accordance with one or more techniques of this disclosure.

FIG. 29 is a flowchart illustrating an example operation of video encoder 20 that includes synthetic candidates in a list of MVP candidates for a current block, in accordance with one or more techniques of this disclosure. In the example of FIG. 29, video encoder 20 may determine a list of MVP candidates for a current block of a current picture of the video data (2900). The list of MVP candidates includes a bi-prediction MVP candidate and a synthetic uni-prediction MVP candidate. Furthermore, in the example of FIG. 29 and in accordance with a technique of this disclosure, video encoder 20 generates, as part of determining the list of MVP candidates, the synthetic uni-prediction MVP candidate based on a motion vector specified by the bi-prediction MVP candidate (2902). In one example, video encoder 20 generates the synthetic uni-prediction candidates by splitting the available bi-prediction MV candidates into two separate uni-prediction candidates according to a pre-defined order. In this example, video encoder 20 may then insert the created synthetic uni-prediction candidates into the candidate list. In some examples, when integer MVD or four luma samples MVD is enabled, video encoder 20 may generate synthetic integer or four luma samples MV candidates by rounding or truncating the available MV candidates into integer MV or four luma samples MV candidates. In such examples, video encoder 20 inserts the synthetic integer MV candidates or 4 luma samples MV candidates into the candidate list.

Furthermore, in the example of FIG. 29, video encoder 20 may determine, based on a motion vector of a selected MVP candidate in the list of MVP candidates, an MVP for the current block (2904). Additionally, video encoder 20 may determine a motion vector of the current block (2906). In some examples, such as where merge mode is used, the motion vector of the current block is equal to a motion vector of the MVP. In some examples, such as when AMVP is used, the motion vector of the current block is equal to the motion vector of the MVP plus an MVD that is signaled in a bitstream.

Video encoder 20 may also determine a predictive block based on the motion vector of the current block (2908). Furthermore, video encoder 20 may generate, based on the predictive block, residual sample values (2910). Video encoder 20 may determine the predictive block and generate the residual sample values in accordance with any of the examples provided elsewhere in this disclosure.

Figure 30:
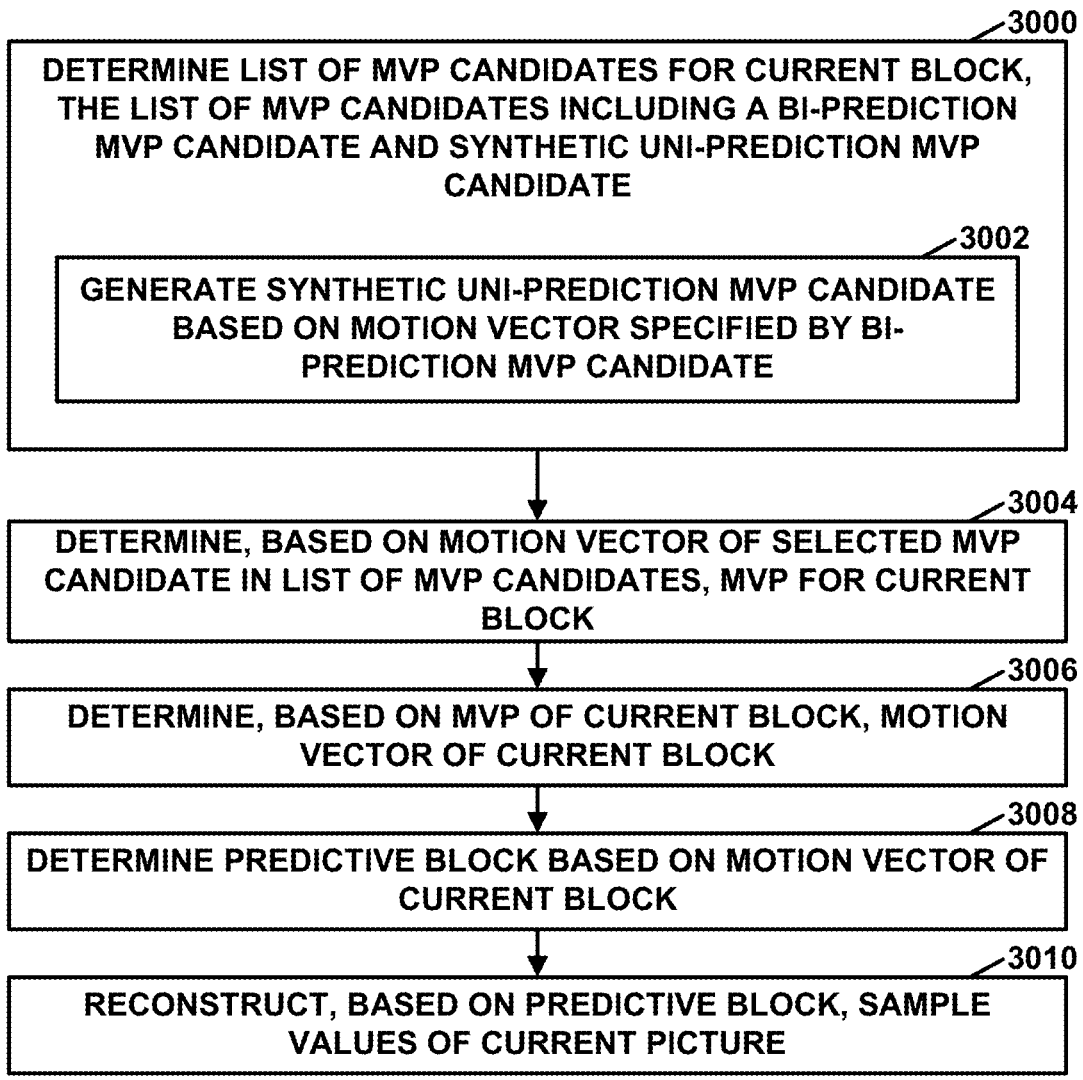
FIG. 30 is a flowchart illustrating an example operation of a video decoder that includes synthetic candidates in a list of MVP candidates for a current block, in accordance with one or more techniques of this disclosure.

FIG. 30 is a flowchart illustrating an example operation of video decoder 30 that includes synthetic candidates in a list of MVP candidates for a current block, in accordance with one or more techniques of this disclosure. In the example of FIG. 30, video decoder 30 may determine a list of MVP candidates for a current block of a current picture of the video data (3000). The list of MVP candidates includes a bi-prediction MVP candidate and a synthetic uni-prediction MVP candidate. Furthermore, in the example of FIG. 30 and in accordance with a technique of this disclosure, video decoder 30 generates, as part of determining the list of MVP candidates, the synthetic uni-prediction MVP candidate based on a motion vector specified by the bi-prediction MVP candidate (3002). In one example, video decoder 30 generates the synthetic uni-prediction candidates by splitting the available bi-prediction MV candidates into two separate uni-prediction candidates according to a pre-defined order. In this example, video decoder 30 may then insert the created synthetic uni-prediction candidates into the candidate list. In some examples, when integer MVD or four luma samples MVD is enabled, video decoder 30 generates synthetic integer or four luma samples MV candidates by rounding or truncating the available MV candidates into integer MV or four luma samples MV candidates. In such examples, video decoder 30 inserts the synthetic integer MV candidates or 4 luma samples MV candidates into the candidate list.

In the example of FIG. 30, video decoder 30 may then determine, based on a motion vector of a selected MVP candidate in the list of MVP candidates, an MVP for the current block (3004). Additionally, video decoder 30 determines, based on the MVP for the current block, a motion vector of the current block (3006). Video decoder 30 may determine a predictive block based on the motion vector of the current block (3008). Furthermore, video decoder 30 may reconstruct, based on the predictive block, sample values of the current picture (3010). Video decoder 30 may select the MVP candidate, determine the motion vector, determine the predictive block, and reconstruct the value values of the current picture in accordance with any of the examples provided elsewhere in this disclosure.

Figure 31:
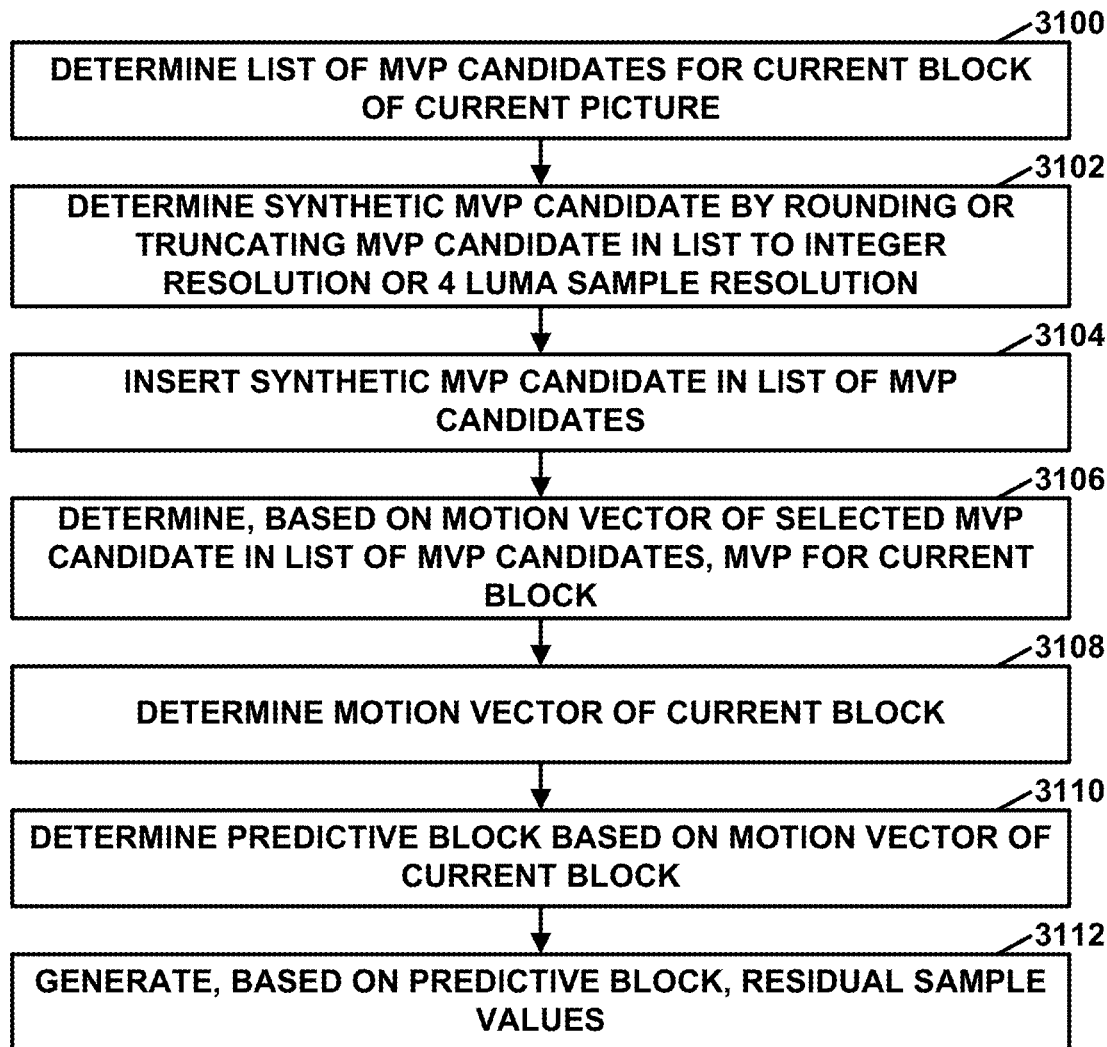
FIG. 31 is a flowchart illustrating an example operation of a video encoder for encoding video data, in accordance with a technique of this disclosure.

FIG. 31 is a flowchart illustrating an example operation of video encoder 20 for encoding video data, in accordance with a technique of this disclosure. In the example of FIG. 31, video encoder 20 determines a list of MVP candidates for a current block of a current picture of the video data (3100). Video encoder 20 may determine the list of MVP candidates in accordance with any of the examples provided elsewhere in this disclosure. Additionally, in accordance with a technique of this disclosure, video encoder 20 determines a synthetic MVP candidate by rounding or truncating an MVP candidate in the list to integer resolution or 4 luma sample resolution (3102). Video encoder 20 may then insert the synthetic MVP candidate in the list of MVP candidate (3104).

Video encoder 20 may then determine, based on a motion vector of a selected MVP candidate in the list of MVP candidates, a motion vector predictor (MVP) for the current block (3106). For instance, video encoder 20 may use a rate-distortion test to select the MVP for the current block. Furthermore, video encoder 20 may determine a motion vector of the current block (3108). In some examples, such as where merge mode is used, the motion vector of the current block is equal to a motion vector of the MVP. In some examples, such as when AMVP is used, the motion vector of the current block is equal to the motion vector of the MVP plus an MVD that is signaled in a bitstream.

Video encoder 20 may determine, a predictive block based on the motion vector of the current block (3110). Next, video encoder 20 may generate, based on the predictive block, residual sample values (3112). Video encoder 20 may determine the predictive block and generate the residual sample values in accordance with any of the examples provided elsewhere in this disclosure.

Figure 32:
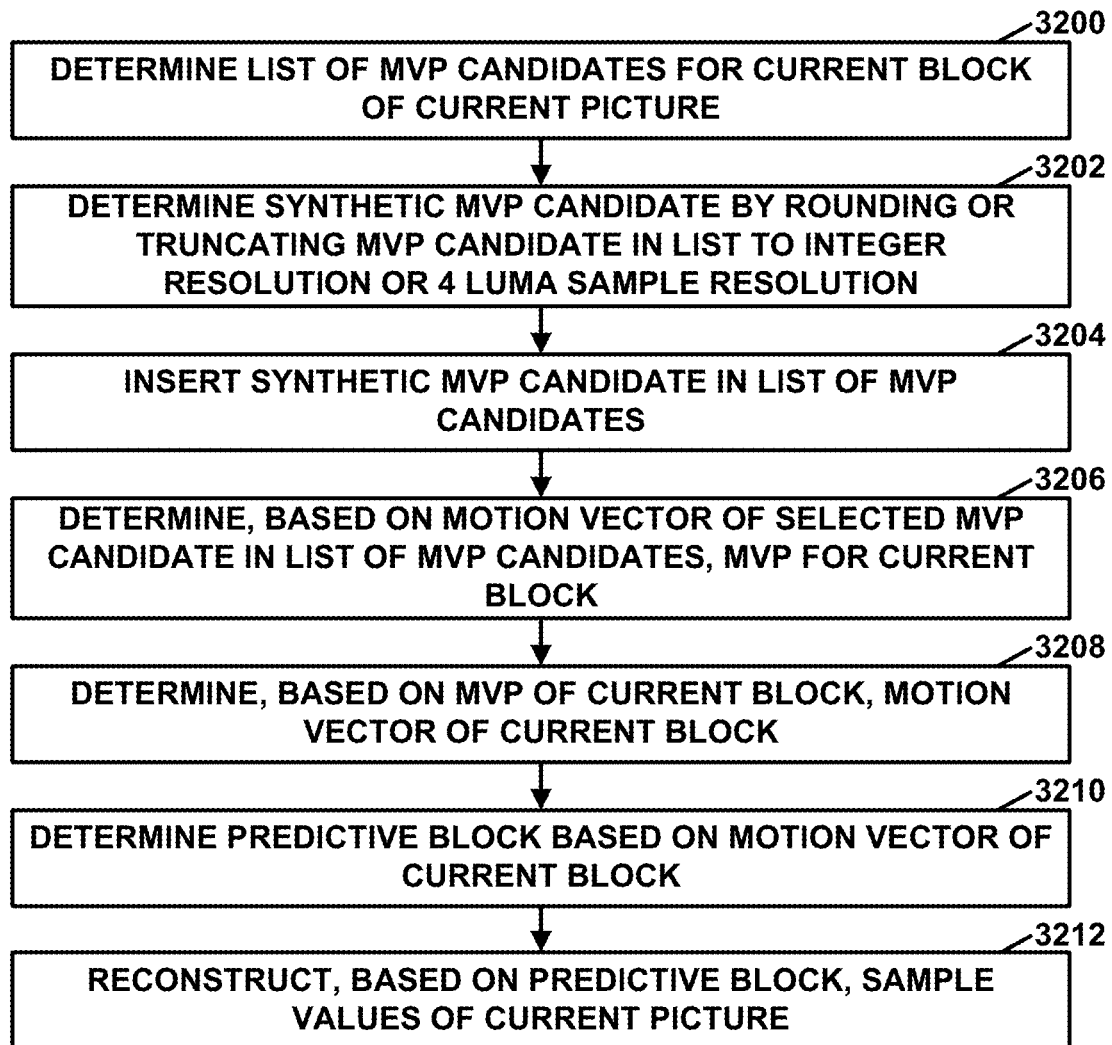
FIG. 32 is a flowchart illustrating an example operation of a video decoder for decoding video data, in accordance with a technique of this disclosure.

FIG. 32 is a flowchart illustrating an example operation of video decoder 30 for decoding video data, in accordance with a technique of this disclosure. In the example of FIG. 32, video decoder 30 determines a list of MVP candidates for a current block of a current picture of the video data (3200). Video decoder 30 may determine the list of MVP candidates in accordance with any of the examples provided elsewhere in this disclosure. Additionally, in accordance with a technique of this disclosure, video decoder 30 may determine a synthetic MVP candidate by rounding or truncating an MVP candidate in the list to integer resolution or 4 luma sample resolution (3202). Video decoder 30 may then insert the synthetic MVP candidate in the list of MVP candidates (3204).

Subsequently, video decoder 30 may determine, based on a motion vector of a selected MVP candidate in the list of MVP candidates, an MVP for the current block (3206). Additionally, video decoder 30 may determine, based on the MVP for the current block, a motion vector of the current block (3208). Video decoder 30 may also determine a predictive block based on the motion vector of the current block (3210). Furthermore, video decoder 30 may reconstruct, based on the predictive block, sample values of the current picture (3212). Video decoder 30 may select the MVP candidate, determine the motion vector, determine the predictive block, and reconstruct the value values of the current picture in accordance with any of the examples provided elsewhere in this disclosure.

Figure 33:
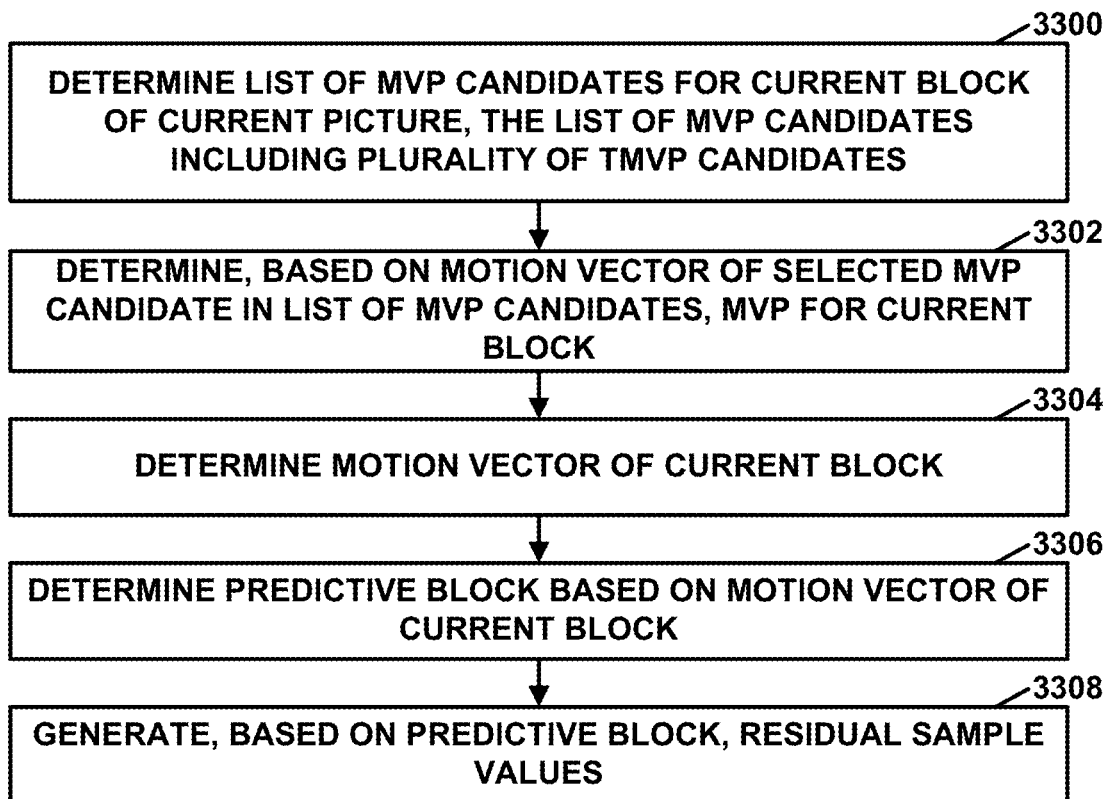
FIG. 33 is a flowchart illustrating an example operation of a video encoder for encoding video data, in accordance with a technique of this disclosure.

FIG. 33 is a flowchart illustrating an example operation of video encoder 20 for encoding video data, in accordance with a technique of this disclosure. In the example of FIG. 33, video encoder 20 may determine a list of MVP candidates for a current block of a current picture of the video data (3300). In general, video encoder 20 may determine the list of MVP candidates in accordance with any of the examples provided elsewhere in this disclosure. However, in accordance with a technique of this disclosure, the list of MVP candidates includes a plurality of TMVP candidates. Each respective MVP candidate in the list of MVP candidates specifies a respective motion vector. Respective TMVP candidates of the plurality of TMVP candidates specify motion vectors of one or more blocks in one or more reference pictures (e.g., a single reference picture, a plurality of reference pictures, etc.).

In some examples, the plurality of TMVP candidates includes two or more TMVP candidate specifying motion vectors of reference blocks collocated with locations in the current picture (e.g., locations adjacent to the current block, locations not adjacent to the current block). In such examples, the reference blocks are blocks of one or more reference pictures.

In some examples, video encoder 20 applies a pruning process to the list of MVP candidates. For instance, video encoder 20 may apply a pruning process to the list of MVP candidates to remove all or some identical MVP candidates in the list of MVP candidates.

Furthermore, in the example of FIG. 33, video encoder 20 may determine, based on a motion vector of a selected MVP candidate in the list of MVP candidates, an MVP for the current block (3302). For instance, video encoder 20 may use a rate-distortion test to determine the MVP for the current block. Video encoder 20 may also determine a motion vector of the current block (3304). In some examples, such as where merge mode is used, the motion vector of the current block is equal to a motion vector of the MVP. In some examples, such as when AMVP is used, the motion vector of the current block is equal to the motion vector of the MVP plus an MVD that is signaled in a bitstream.

Furthermore, video encoder 20 may use the motion vector of the current block to determine a predictive block (3306). Additionally, video encoder 20 may generate, based on the predictive block, residual sample values (3308). Video encoder 20 may determine the predictive block and generate the residual sample values in accordance with any of the examples provided elsewhere in this disclosure.

Figure 34:
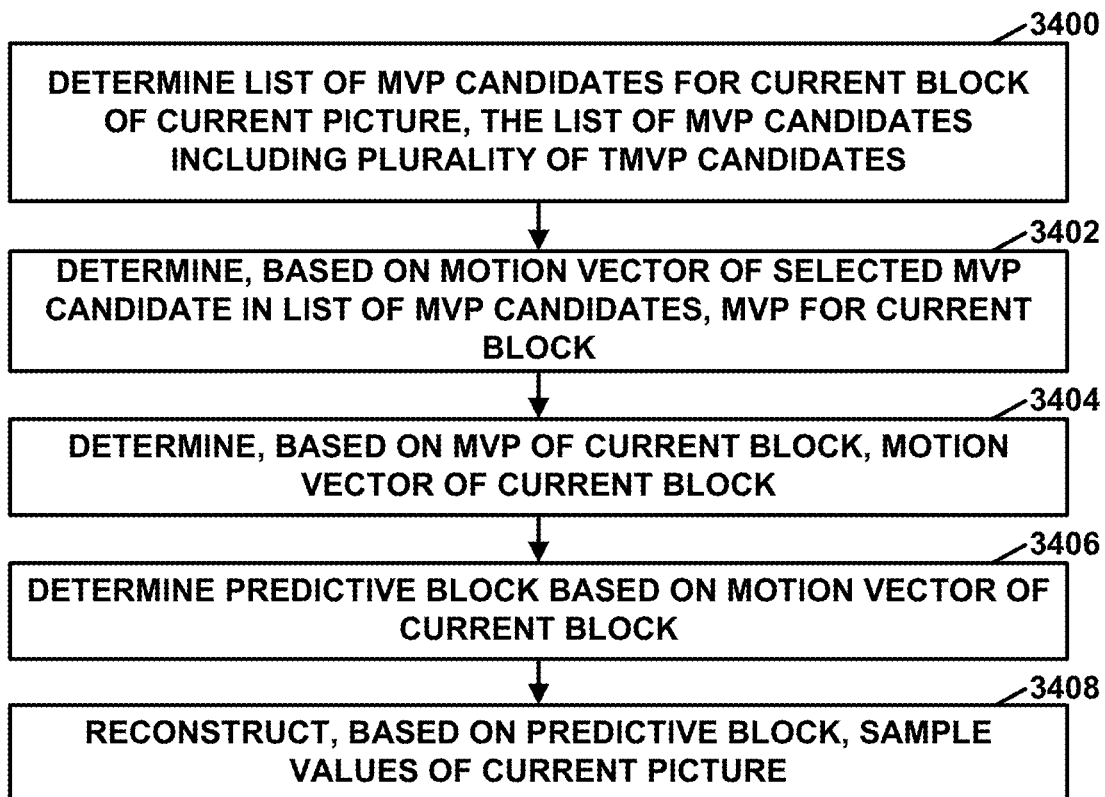
FIG. 34 is a flowchart illustrating an example operation of a video decoder for decoding video data, in accordance with a technique of this disclosure.

FIG. 34 is a flowchart illustrating an example operation of video decoder 30 for decoding video data, in accordance with one or more examples of this disclosure. In the example of FIG. 34, video decoder 30 may determine a list of MVP candidates for a current block of a current picture of the video data (3400). In general, video decoder 30 may determine the list of MVP candidates in accordance with any of the examples provided elsewhere in this disclosure. However, in accordance with a technique of this disclosure, the list of MVP candidates includes a plurality of TMVP candidates. Each respective MVP candidate in the list of MVP candidates specifies a respective motion vector. Respective TMVP candidates of the plurality of TMVP candidates specifies a motion vector of one or more blocks in one or more reference pictures (e.g., a single reference picture, a plurality of reference pictures, etc.).

In one example, the plurality of TMVP candidates includes two or more TMVP candidates specifying motion vectors of reference blocks collocated with locations in the current picture. In this example, the reference blocks are blocks of one or more reference pictures (e.g., a single reference picture, a plurality of reference pictures, etc.). In some instances of this example, the locations are adjacent to the current block. In some instances of this example, the locations are not adjacent to the current block.

In some examples, video decoder 30 may apply a pruning process to the list of MVP candidates. For instance, video decoder 30 may apply a pruning process to the list of MVP candidates to remove all or some identical MVP candidates in the list of MVP candidates.

Furthermore, in the example of FIG. 34, video decoder 30 may determine, based on a motion vector of a selected MVP candidate in the list of MVP candidates, an MVP for the current block (3402). Video decoder 30 may determine, based on the MVP for the current block, a motion vector of the current block (3404). Additionally, video decoder 30 may determine a predictive block based on the motion vector of the current block (3406). Video decoder 30 may reconstruct, based on the predictive block, sample values of the current picture (3408). Video decoder 30 may select the MVP candidate, determine the motion vector, determine the predictive block, and reconstruct the value values of the current picture in accordance with any of the examples provided elsewhere in this disclosure.

Figure 35:
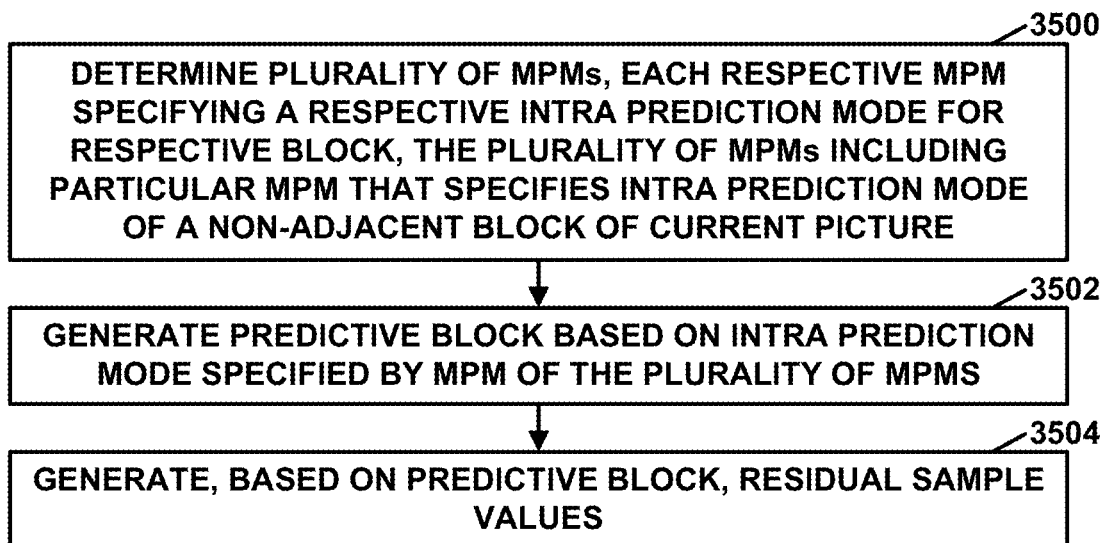
FIG. 35 is a flowchart illustrating an example operation of a video encoder for encoding video data, in accordance with a technique of this disclosure.

FIG. 35 is a flowchart illustrating an example operation of video encoder 20 for encoding video data, in accordance with a technique of this disclosure. In the example of FIG. 35, video encoder 20 may determine a plurality of Most Probable Modes (MPMs) (3500). Each respective MPM of the plurality of MPMs specifies a respective intra prediction mode of a respective block. In the example of FIG. 35, the plurality of MPMs includes a particular MPM that specifies an intra prediction mode of a non-adjacent block of a current picture of the video data. The non-adjacent block is non-adjacent to a current block of the current picture. In some examples, the non-adjacent block is a block in a template that defines a fixed pattern of non-adjacent blocks relative to a position of the current block. In other examples, the non-adjacent blocks are blocks that are within a particular distance of the current block. The non-adjacent block may be determined in accordance with any of the examples provided elsewhere in this disclosure.

In some examples, as part of determining the plurality of MPMs, video encoder 20 may determine an ordered list of the MPMs. In such examples, the MPMs based on non-adjacent blocks are ordered in the list according to a frequency with which intra prediction modes are specified by non-adjacent blocks in a plurality of non-adjacent blocks. In other examples, the MPMs based on the non-adjacent blocks are not ordered in the list according to such a frequency.

In some examples, to determine the plurality of MPMs, video encoder 20 may determine a global MPM list that comprises MPMs specifying motion information for each block that is in the current picture and that is encoded prior to the current block. In such examples, video encoder 20 may determine an MPM from the MPMs in the global motion vector candidate list. In some examples, video encoder 20 may store a plurality of non-adjacent MPMs in a FIFO buffer. In such examples, the plurality of non-adjacent MPMs includes a non-adjacent MPM specifying the intra prediction mode of the non-adjacent block. Furthermore, in such examples, video encoder 20 may update the FIFO buffer to remove an earliest-added non-adjacent MPM from the FIFO buffer and may add an MPM to the FIFO buffer. The plurality of MPMs may include the MPMs in the FIFO buffer.

Furthermore, in the example of FIG. 35, video encoder 20 may generate a predictive block based on an intra prediction mode specified by an MPM of the plurality of MPMs (3502). Additionally, video encoder 20 may generate, based on the predictive block, residual sample values (3504). Video encoder 20 may determine the predictive block and generate the residual sample values in accordance with any of the examples provided elsewhere in this disclosure.

Figure 36:
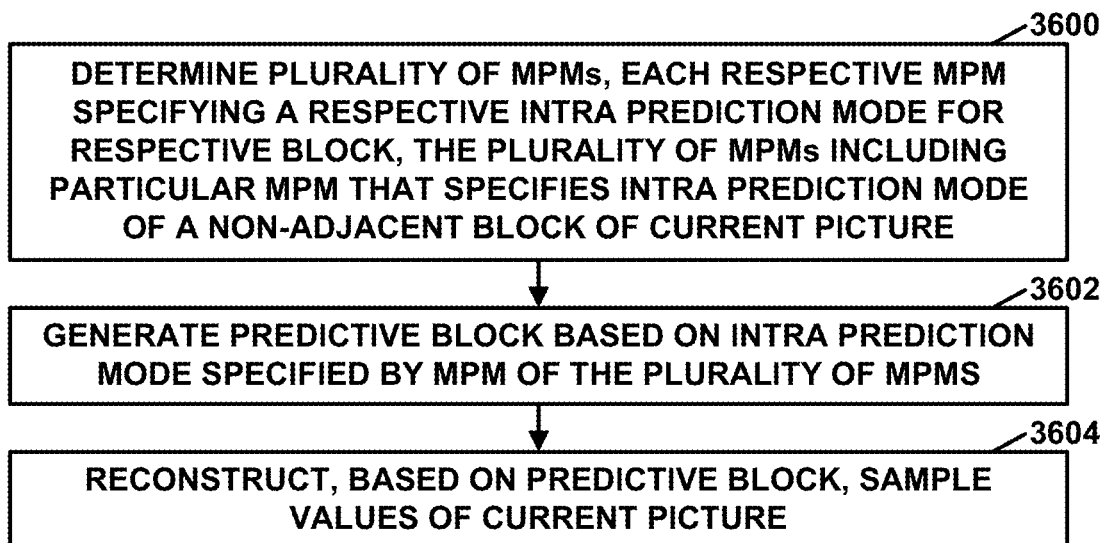
FIG. 36 is a flowchart illustrating an example operation of a video decoder for decoding video data, in accordance with a technique of this disclosure.

FIG. 36 is a flowchart illustrating an example operation of video decoder 30 for decoding video data, in accordance with a technique of this disclosure. In the example of FIG. 36, video decoder 30 may determine a plurality of MPMs (3600). Each respective MPM of the plurality of MPMs specifies a respective intra prediction mode of a respective block. In accordance with a technique of this disclosure, the plurality of MPMs includes a particular MPM that specifies an intra prediction mode of a non-adjacent block of a current picture of the video data. The non-adjacent block is non-adjacent to a current block of the current picture. In some examples, the non-adjacent block is a block in a template that defines a fixed pattern of non-adjacent blocks relative to a position of the current block. In other examples, the non-adjacent block is a fixed distance from the current block. The non-adjacent block may be determined in accordance with any of the examples provided elsewhere in this disclosure.

In some examples, as part of determining the plurality of MPMs, video decoder 30 may determine an ordered list of the MPMs. In such examples, the MPMs based on non-adjacent blocks are ordered in the list according to frequency with which intra prediction modes are specified by non-adjacent blocks in a plurality of non-adjacent blocks. In other examples, the MPMs based on the non-adjacent blocks are not ordered in the list according to such a frequency.

In some examples, the plurality of MPMs is a global MPM list that comprises MPMs specifying motion information for each block that is in the current picture and that is encoded prior to the current block. In such examples, video decoder 30 may determine an MPM from the MPMs in the global motion vector candidate list. In some examples, video decoder 30 may store a plurality of non-adjacent MPMs in a first-in, first-out (FIFO) buffer. In such examples, the plurality of non-adjacent MPMs includes a non-adjacent MPM specifying the intra prediction mode of the non-adjacent block. Furthermore, in such examples, video decoder 30 may update the FIFO buffer to remove an earliest-added non-adjacent MPM from the FIFO buffer and adding an MPM to the FIFO buffer. The plurality of MPMs may include the MPMs in the FIFO buffer.

Furthermore, in the example of FIG. 36, video decoder 30 may generate a predictive block based on an intra prediction mode specified by an MPM of the plurality of MPMs (3602). Additionally, video decoder 30 may reconstruct, based on the predictive block, sample values of the current picture (3604). Video decoder 30 may generate the predictive block and reconstruct the sample values in accordance with any of the techniques provided elsewhere in this disclosure.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

In this disclosure, ordinal terms such as "first," "second," "third," and so on, are not necessarily indicators of positions within an order, but rather may simply be used to distinguish different instances of the same thing.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    deriving, by a video decoder, a plurality of non-adjacent spatial motion vector predictors (NA-SMVPs) from motion information of spatially non-adjacent blocks located within a same current picture as a current block of the current picture,
        wherein, for each respective NA-SMVP of the plurality of NA-SMVPs, the respective NA-SMVP corresponds to a respective non-adjacent block in a fixed pattern of non-adjacent blocks of the current picture, the respective NA-SMVP specifying a motion vector of the respective non-adjacent block;
    determining, by the video decoder, a motion vector predictor (MVP) for the current block based on a NA-SMVP in the plurality of NA-SMVPs, wherein determining the MVP for the current block comprises:
        generating, by the video decoder, a list of MVP candidates, wherein the list of MVP candidates includes the plurality of NA-SMVPs;
        ordering, by the video decoder, the plurality of NA-SMVPs in the list of MVP candidates according to distances of corresponding non-adjacent blocks of the NA-SMVPs from the current block; and
        determining, by the video decoder, from among the MVP candidates in the list of MVP candidates, the MVP for the current block;
    determining, by the video decoder, based on the MVP for the current block, a motion vector of the current block;
    determining, by the video decoder, a predictive block based on the motion vector of the current block; and
    reconstructing, by the video decoder, based on the predictive block, sample values of the current picture.

2. The method of claim 1, further comprising applying, by the video decoder, a pruning process to the list of MVP candidates, wherein the pruning process is adaptive to a block size of the current block.

3. The method of claim 1, wherein determining the motion vector of the current block comprises:
  determining, by the video decoder, the motion vector of the current block such that the motion vector of the current block is equal to a motion vector of the MVP for the current block.

4. The method of claim 1, wherein determining the motion vector of the current block comprises:
  determining, by the video decoder, the motion vector of the current block such that the motion vector of the current block is equal to a motion vector of the MVP for the current block plus a motion vector difference (MVD).

5. A method of encoding video data, the method comprising:
  deriving, by a video encoder, a plurality of non-adjacent spatial motion vector predictors (NA-SMVPs) from motion information of spatially non-adjacent blocks located within a same current picture as a current block of the current picture,
    wherein, for each respective NA-SMVP of the plurality of NA-SMVPs, the respective NA-SMVP corresponds to a respective non-adjacent block in a fixed pattern of non-adjacent blocks of the current picture, the respective NA-SMVP specifying a motion vector of the respective non-adjacent block;
  determining, by the video encoder, a motion vector predictor (MVP) for the current block based on a NA-SMVP in the plurality of NA-SMVPs, wherein determining the MVP for the current block comprises:
    generating, by the video encoder, a list of MVP candidates, wherein the list of MVP candidates includes the plurality of NA-SMVPs;
    ordering, by the video encoder, the plurality of NA-SMVPs in the list of MVP candidates according to distances of corresponding non-adjacent blocks of the NA-SMVPs from the current block; and
    determining, by the video encoder, from among the MVP candidates in the list of MVP candidates, the MVP for the current block;
  determining, by the video encoder, a motion vector of the current block, wherein the motion vector is equal to a motion vector of the MVP for the current block or is equal to the motion vector of the MVP for the current block plus a motion vector difference (MVD) signaled in a bitstream;
  determining, by the video encoder, a predictive block based on the motion vector of the current block; and
  generating, by the video encoder, based on the predictive block, residual sample values.

6. The method of claim 5, further comprising applying, by the video encoder, a pruning process to the list of MVP candidates, wherein the pruning process is adaptive to a block size of the current block.

7. An apparatus for decoding video data, the apparatus comprising:
  one or more storage media configured to store video data; and
  one or more processors implemented in circuitry, the one or more processors configured to:
    derive a plurality of non-adjacent spatial motion vector predictors (NA-SMVPs) from motion information of spatially non-adjacent blocks located within a same current picture as a current block of the current picture,
      wherein, for each respective NA-SMVP of the plurality of NA-SMVPs, the respective NA-SMVP corresponds to a respective non-adjacent block in a fixed pattern of non-adjacent blocks of the current picture, the respective NA-SMVP specifying a motion vector of the respective non-adjacent block;
    determine a motion vector predictor (MVP) for the current block based on a NA-SMVP in the plurality of NA-SMVPs, wherein the one or more processors are configured such that, as part of determining the MVP for the current block, the one or more processors:
      generate a list of MVP candidates, wherein the list of MVP candidates includes the plurality of NA-SMVPs;
      order the plurality of NA-SMVPs in the list of MVP candidates according to distances of corresponding non-adjacent blocks of the NA-SMVPs from the current block; and
      determine, from among the MVP candidates in the list of MVP candidates, the MVP for the current block;
    determine, based on the MVP for the current block, a motion vector of the current block;
    determine a predictive block based on the motion vector of the current block; and
    reconstruct, based on the predictive block, sample values of the current picture.

8. The apparatus of claim 7, wherein the one or more processors are further configured to apply a pruning process to the list of MVP candidates, wherein the pruning process is adaptive to a block size of the current block.

9. The apparatus of claim 7, wherein the one or more processors are configured such that, as part of determining the motion vector of the current block, the one or more processors:
  determine the motion vector of the current block such that the motion vector of the current block is equal to a motion vector of the MVP candidate for the current block.

10. The apparatus of claim 7, wherein the one or more processors are configured such that, as part of determining the motion vector of the current block, the one or more processors:
  determine the motion vector of the current block such that the motion vector of the current block is equal to a motion vector of the MVP for the current block plus a motion vector difference (MVD).

11. The apparatus of claim 7, wherein the apparatus comprises:
  an integrated circuit,
  a microprocessor, or
  a wireless communication device.

12. An apparatus for encoding video data, the apparatus comprising:
  one or more storage media configured to store video data; and
  one or more processors implemented in circuitry, the one or more processors configured to:
    derive a plurality of non-adjacent spatial motion vector predictors (NA-SMVPs) from motion information of spatially non-adjacent blocks located within a same current picture as a current block of the current picture,
    wherein, for each respective NA-SMVP of the plurality of NA-SMVPs, the respective NA-SMVP corresponds to a respective non-adjacent block in a fixed pattern of non-adjacent blocks of the current picture, the respective NA-SMVP specifying a motion vector of the respective non-adjacent block;
  determine a motion vector predictor (MVP) for the current block based on a NA-SMVP in the plurality of NA-SMVPs, wherein the one or more processors are configured such that, as part of determining the MVP for the current block, the one or more processors:
    generate a list of MVP candidates, wherein the list of MVP candidates includes the plurality of NA-SMVPs;
    order the plurality of NA-SMVPs in the list of MVP candidates according to distances of corresponding non-adjacent blocks of the NA-SMVPs from the current block; and
    determine, from among the MVP candidates in the list of MVP candidates, the MVP for the current block;
  determine a motion vector of the current block, wherein the motion vector is equal to a motion vector of the MVP for the current block or is equal to the motion vector of the MVP for the current block plus a motion vector difference (MVD) signaled in a bitstream;
  determine a predictive block based on the motion vector of the current block; and
  generate, based on the predictive block, residual sample values.

13. The apparatus of claim 12, wherein the one or more processors are further configured to apply a pruning process to the list of MVP candidates, wherein the pruning process is adaptive to a block size of the current block.

14. The apparatus of claim 12, wherein the apparatus comprises:
  an integrated circuit,
  a microprocessor, or
  a wireless communication device.

15. An apparatus for decoding video data, the apparatus comprising:
  means for deriving a plurality of non-adjacent spatial motion vector predictors (NA-SMVPs) from motion information of spatially non-adjacent blocks located within a same current picture as a current block of the current picture,
    wherein, for each respective NA-SMVP of the plurality of NA-SMVPs, the respective NA-SMVP corresponds to a respective non-adjacent block in a fixed pattern of non-adjacent blocks of the current picture, the respective NA-SMVP specifying a motion vector of the respective non-adjacent block;
  means for determining a motion vector predictor (MVP) for the current block based on a NA-SMVP in the plurality of NA-SMVPs, wherein the means for determining the MVP for the current block comprises:
    means for generating a list of MVP candidates, wherein the list of MVP candidates includes the plurality of NA-SMVPs;
    means for ordering the plurality of NA-SMVPs in the list of MVP candidates according to distances of corresponding non-adjacent blocks of the NA-SMVPs from the current block; and
    means for determining, from among the MVP candidates in the list of MVP candidates, the MVP for the current block;
  means for determining, based on the MVP for the current block, a motion vector of the current block;
  means for determining a predictive block based on the motion vector of the current block; and
  means for reconstructing, based on the predictive block, sample values of the current picture.

16. An apparatus for encoding video data, the apparatus comprising:
  means for deriving a plurality of non-adjacent spatial motion vector predictors (NA-SMVPs) from motion information of spatially non-adjacent blocks located within a same current picture as a current block of the current picture,
    wherein, for each respective NA-SMVP of the plurality of NA-SMVPs, the respective NA-SMVP corresponds to a respective non-adjacent block in a fixed pattern of non-adjacent blocks of the current picture, the respective NA-SMVP specifying a motion vector of the respective non-adjacent block;
  means for determining a motion vector predictor (MVP) for the current block based on a NA-SMVP in the plurality of NA-SMVPs, wherein the means for determining the MVP for the current block comprises:
    means for generating a list of MVP candidates, wherein the list of MVP candidates includes the plurality of NA-SMVPs;
    means for ordering the plurality of NA-SMVPs in the list of MVP candidates according to distances of corresponding non-adjacent blocks of the NA-SMVPs from the current block; and
    means for determining, from among the MVP candidates in the list of MVP candidates, the MVP for the current block;
  means for determining a motion vector of the current block, wherein the motion vector is equal to a motion vector of the MVP for the current block or is equal to the motion vector of the MVP for the current block plus a motion vector difference (MVD) signaled in a bitstream;
  means for determining a predictive block based on the motion vector of the current block; and
  means for generating, based on the predictive block, residual sample values.

17. A computer-readable storage medium storing instructions that, when executed, cause one or more processors to:
  derive a plurality of non-adjacent spatial motion vector predictors (NA-SMVPs) from motion information of spatially non-adjacent blocks located within a same current picture as a current block of the current picture,
    wherein, for each respective NA-SMVP of the plurality of NA-SMVPs, the respective NA-SMVP corresponds to a respective non-adjacent block in a fixed pattern of non-adjacent blocks of the current picture, the respective NA-SMVP specifying a motion vector of the respective non-adjacent block;
  determine a motion vector predictor (MVP) for the current block based on a NA-SMVP in the plurality of NA-SMVPs, wherein the instructions that cause the one or more processors to determine the MVP for the current block comprise instructions that, when executed, cause the one or more processors to:

generate a list of MVP candidates, wherein the list of MVP candidates includes the plurality of NA-SMVPs;

order the plurality of NA-SMVPs in the list of MVP candidates according to distances of corresponding non-adjacent blocks of the NA-SMVPs from the current block; and determine, from among the MVP candidates in the list of MVP candidates, the MVP for the current block;

determine, based on the MVP for the current block, a motion vector of the current block;

determine a predictive block based on the motion vector of the current block; and reconstruct, based on the predictive block, sample values of the current picture.

18. A computer-readable storage medium storing instructions that, when executed, cause one or more processors to:

derive a plurality of non-adjacent spatial motion vector predictors (NA-SMVPs) from motion information of spatially non-adjacent blocks located within a same current picture as a current block of the current picture, wherein, for each respective NA-SMVP of the plurality of NA-SMVPs, the respective NA-SMVP corresponds to a respective non-adjacent block in a fixed pattern of non-adjacent blocks of the current picture, the respective NA-SMVP specifying a motion vector of the respective non-adjacent block;

determine a motion vector predictor (MVP) for the current block based on a NA-SMVP in the plurality of NA-SMVPs, wherein the instructions that cause the one or more processors to determine the MVP for the current block comprise instructions that, when executed, cause the one or more processors to:

generate a list of MVP candidates, wherein the list of MVP candidates includes the plurality of NA-SMVPs;

order the plurality of NA-SMVPs in the list of MVP candidates according to distances of corresponding non-adjacent blocks of the NA-SMVPs from the current block; and determine, from among the MVP candidates in the list of MVP candidates, the MVP for the current block;

determine a motion vector of the current block, wherein the motion vector is equal to a motion vector of the MVP for the current block or is equal to the motion vector of the MVP for the current block plus a motion vector difference (MVD) signaled in a bitstream;

determine a predictive block based on the motion vector of the current block; and generate, based on the predictive block, residual sample values.

* * * * *